US005642520A

United States Patent [19]

Takeshita et al.

[11] Patent Number: 5,642,520
[45] Date of Patent: Jun. 24, 1997

[54] METHOD AND APPARATUS FOR RECOGNIZING TOPIC STRUCTURE OF LANGUAGE DATA

[75] Inventors: Atsushi Takeshita, Yokosuka; Takafumi Inoue, Yokohama; Kazuo Tanaka; Toru Nakagawa, both of Yokosuka, all of Japan

[73] Assignee: Nippon Telegraph and Telephone Corporation, Tokyo, Japan

[21] Appl. No.: 354,120

[22] Filed: Dec. 6, 1994

[30]  Foreign Application Priority Data

Dec. 7, 1993  [JP]  Japan ................................. 5-306288
Dec. 7, 1993  [JP]  Japan ................................. 5-306289
Dec. 7, 1993  [JP]  Japan ................................. 5-306290
Oct. 12, 1994  [JP]  Japan ................................. 6-245934

[51] Int. Cl.$^6$ ................................................. G06F 17/27
[52] U.S. Cl. ................................. 395/759; 395/793
[58] Field of Search ........................ 364/419.08, 419.01, 364/419.19, 419.1; 395/759, 751, 793, 792

[56]  References Cited

U.S. PATENT DOCUMENTS

| 5,056,021 | 10/1991 | Ausborn ................................ 395/759 |
| 5,257,186 | 10/1993 | Ukita et al. ........................... 395/793 |
| 5,384,703 | 1/1995 | Withgott et al. ...................... 395/793 |

OTHER PUBLICATIONS

Atsushi Takeshita et al., "A Study on Topic Structure Recognition and Human Communication", Proceedings of the Institute of Electronics, Information and Communication Engineers (IEICE), Fall 1993 Conference.

William C. Mann et al., "Rhetorical Structure Theory: Description and Construction of Text Structures", Natural Language Generation, Martinus Nijhof, 1990, pp. 85–96.

Marti A. Hearst, et al., "Subtopic Structuring for Full-Length Document Access", SIGIR '93 (Proceedings of the 16th Annual International ACM SIGIR Conference on Research and Development in Information Retrieval, pp. 59–68.

Marti A. Hearst, "Multi-Paragraph Segmentation of Expository Text", ACL-94 (Proceedings of the 32nd Annual Meeting of the Association of Computational Linguistics), pp. 9–16.

(List continued on next page.)

*Primary Examiner*—Jeffery Hofsass
*Assistant Examiner*—Andrew Hill
*Attorney, Agent, or Firm*—Finnegan, Henderson, Farabow, Garrett & Dunner, L.L.P.

[57]  ABSTRACT

A method and apparatus for recognizing the topic structure of language. Language data is divided into simple sentences and a prominent noun portion (PNP) extracted from each. The simple sentences are divided into blocks of data dealing with a single subject. A starting point of at least one topic is detected and a topic introducing region of each topic is determined from block information and language data characteristics. A PNP satisfying a predetermined condition is chosen from the PNPs in each determined topic intro. region as the topic portion (TP) of the topic in the topic intro. region. A topic level indicating a depth of nesting of each topic and a topic scope indicating a region over which the topic continues is determined from the TP and sentences before and after the TP. Sub-topic intro. regions in the remaining area where no topic intro. regions are recognized are determined from block information and language data characteristics. A PNP satisfying a predetermined condition is chosen from the PNPs in each determined sub-topic intro. region as the sub-topic portion (STP) of the sub-topic in the sub-topic intro. region. A temporary topic level indicating a depth of nesting of each sub-topic and a sub-topic scope indicating a region over which the sub-topic continues is determined from the STP and sentences before and after the STP. All determined topics and sub-topics are unified by revising the temporary topic level of each sub-topic according to the topic level of each topic. These topics and their levels are output as a topic structure.

35 Claims, 90 Drawing Sheets

OTHER PUBLICATIONS

Udo Hahn, "On Text Coherence Parsing", COLING-92 (Proceedings of the 14th International Conference on Computational Linguistics), pp. 25-31.

Sadao Kurohashi et al., "Automatic Detection of Discourse Structure by Checking Surface Information in Sentences", COLING-94 (Proceedings of the 15th International Conference on Computational Linguistics), pp. 1123-1127.

Shin'ya Nakajima et al., "Prosody as a Cue for Discourse Structure", ICSLP-92 (Proceedings of International Conference on Spoken Language Processing), pp. 425-428.

Barbara Grosz et al., "Some International Characteristics of Discourse Structure", ICSLP-92 (Proceedings of International Conference on Spoken Language Processing), pp. 429-432.

Jane Morris et al., "Lexical Cohesion Computed by Thesaural Relations as an Indicator of the Structure of Text", Computational Linguistics, vol. 17, No. 1, pp. 21-48, Association for Computational Linguistics, 1991.

Robin Cohen, "Analyzing the Structure of Argumentative Discourse", Computational Linguistics, vol. 13, Nos. 1-2, Jan.-Jun., pp. 11-24, 1987.

Barbara J. Grosz et al., "Attention, Intentions, and the Structure of Discourse", Computational Linguistics, vol. 12, No. 3, Jul.-Sep., pp. 175-204, 1986.

FIG.4

| |
|---|
| (1) Cut at period<br>ex.  Kore wa hana desu./ Sore wa, zouka desu.<br>   <This is a flower.  That is an artificial flower.> |
| (2) Cut just after a "relating part" as a general rule<br>ex.  Kare ga shuppatsu suru/ koto wa shitte ita.<br>   <I knew that he would be leaving.> |

| EXCEPTIONS TO (2) | |
|---|---|
| | (2-1) If the relating part is an adjective or adjective verb<br>     having adnominal form<br>ex.  Kirei-na hana ga saku.<br>   <Beautiful flowers blossom.><br><br>(2-2) If the relating part is an adjective or adjective verb<br>     having adverbial form<br>ex.  Sabishi-ku hohoemu.<br>   <(I) smile sadly.> |

| |
|---|
| (3) Not cut at comma; however, cut after this mark<br> if a relating part is included in a simple sent. before the mark<br>ex.  Watashi wa,Yamada Taro desu.<br>   <I am Taro Yamada.><br>ex.  Kaki-no-ki ni nobottara,/ ochite shimatta.<br>   <When I climbed the persimmon tree, I fell down.> |
| (4) Cut before case post positional particle 'to' if the particle<br> follows a sentence final particle<br>ex.  Umi de wa omoikiri asobu-wa/ to itte ita.<br>   <She said that she would play hard at the beach.> |

FIG.5A

| PRIORITY RANKING | MARKER TYPE | EXAMPLE |
|---|---|---|
| 1 | EXPLICIT | "ni tsuite", "ni kanshite", <about> |
| 2 | IMPLICIT | "ga", "o", "ni" |

FIG.5B

| PRIORITY RANKING | MARKER TYPE | EXAMPLE |
|---|---|---|
| 1 | EXPLICIT: except 'wa' | "ni tsuite", "ni kanshite" |
| 2 | EXPLICIT: 'wa' | |
| 3 | IMPLICIT | "ga", "o", "ni" |

FIG.5C

| PRIORITY RANKING | MARKER TYPE | EXAMPLE |
|---|---|---|
| 1 | EXPLICIT: with ',' | "ni tsuite", "ni kanshite" |
| 2 | EXPLICIT: except 'wa' | "ni tsuite", "ni kanshite" |
| 3 | EXPLICIT: 'wa' | |
| 4 | IMPLICIT | "ga", "o", "ni" |

FIG.6

| SENTENCE PATTERN | EXPRESSION EXAMPLE |
|---|---|
| QUESTION | ~ desu ka |
| REQUEST | ~ itadake masu ka |
| CONFIRMATION | ~ su ne |
| ...... | ...... |

FIG.7

| TYPE | CUE INDICATOR EXAMPLES |
|---|---|
| NEST START | mazu, daiichi ni, saisho ni, ... <first (of all)> |
| TOPIC CHANGE | tsugi ni <next>, tokorode <now>, daini ni <second(ly)>, daisan ni <third(ly)>, ... |
| NEST END | saigo ni, owari ni, ... <lastly> |

| ITEM MARKER | STARTING POINT OF ITEM AREA | END POINT OF ITEM AREA |
|---|---|---|
| (1), (2), ···, (n) | item marker | min ( next ',', next item marker) |

| PRIORITY RANKING | WORDING |
|---|---|
| 1 | [a] prominent NP included in title<br>[b] prominent NP including proper noun<br>[c] prominent NP indicated by explicit marker |
| 2 | prominent NP indicated by implicit marker |

FIG.20

| PRIORITY RANKING | WORDING |
|---|---|
| 1 | [a] prominent NP included in chap. title just before intro. region<br>[b] prominent NP including proper noun<br>[c] prominent NP indicated by explicit marker |
| 2 | prominent NP indicated by implicit marker |

FIG.21

THIS TIME

|  |  | NEST START | TOPIC CHANGE | NEST END |
|---|---|---|---|---|
| LAST TIME | NEST START | +1 | 0 | 0 |
|  | TOPIC CHANGE | +1 | 0 | 0 |
|  | NEST END | +1 | −1 | −1 |

FIG.22

| (1) BEGINNING OF TEXT | 1 | | |
|---|---|---|---|
| (2) CHAPTER TYPE | CHANGE TYPE | EXAMPLE | LEVEL CHANGE |
| | SAME | section → section | 0 |
| | MORE DETAIL | chapter → section | +1 |
| | MORE ABSTRACT | section → chapter | −1 |
| (3) INDIVIDUAL ITEM TYPE | TOPIC KIND | | LEVEL CHANGE |
| | TOPIC OF FIRST ITEM | | +1 |
| | TOPIC OF EACH SUBSEQUENT ITEM | | 0 |
| (4) ITEM TYPE | +1 | | |

FIG.26

| PRIORITY RANKING | WORDING |
|---|---|
| 1 | prominent NP with the expression of a question such as "tazuneru", or "tou", <ask> |
| 2 | (a) prom. NP included in the title or in an abs. region just before the topic intro. region<br>(b) prom. NP including proper noun<br>(c) prom. NP indicated by explicit marker |

FIG.28

| PRIORITY RANKING | WORDING |
|---|---|
| 1 | prominent NP with the expression of a question |
| 2 | (a) prom. NP included in chapter title or abs. region just before the topic intro. region<br>(b) prom. NP including proper noun<br>(c) prom. NP indicated by explicit marker besides 'wa' |

FIG.34A

| UTTERANCE NO. | SPEAKER | SENTENCE |
|---|---|---|
| 1 | A : | Min'eika-go, kaisha A no tsuushin saabisu wa samagawari shite kiteru n desu kedo. |
| 2 | B : | Ee. |
| 3 | A : | Gozonji desu ka? |
| 4 | B : | Mazu, samazama na shinki saabisu ga teikyoo sarete imasu yo ne. |
| 5 | A : | Soo desu ne. Saabisu B toka, Saabisu C nado ga soo desu yo ne. |
| 6 | B : | Hai. Saabisu A mo desu yo ne. |
| 7 | A : | Aa, soo desu ne. CF nanka no senden o sekkyokuteki ni yatte masu yo ne. |
| 8 | B : | Nanse doogyoo-tasha e no taikoo saku desu kara ne. |
| 9 | A : | Ee. ...... |

FIG.34B

| | | |
|---|---|---|
| 1 0 | B : | Tsugi ni desu ne. |
| 1 1 | A : | Hai. |
| 1 2 | B : | Juurai kara no saabisu mo samagawari shite imasu yo ne. |
| 1 3 | A : | Ee.<br>Maa ippanteki ni wa yoku natte masu kedo. |
| 1 4 | B : | Ee. |
| 1 5 | A : | Bangoo-annai no yuuryooka no jisshi toka, kooshuu-denwa no ryookin-neage no kentoo toka mitai ni, riyoosha e no futan ga zooka suru mono mo aru n desu yo. |
| 1 6 | B : | Naruhodo. |
| 1 7 | A : | Toku ni bangoo-annai no yuuryooka wa shakaiteki nimo ookiku chuumoku sare mashita kedo. |
| 1 8 | B : | Hai. |
| 1 9 | A : | Goku ichibu no hito dake ga bangoo-annai o hinpan ni riyoo suru koto ga ichiban ookina riyuu desu ka ? |
| 2 0 | B : | Tsugi ni ookina riyuu ga ··· |

FIG.34C

| UTTERANCE NO. | SPEAKER | SENTENCE |
| --- | --- | --- |
| 1 | A : | Since (its) privatization, company A's communication services have been changing . . . |
| 2 | B : | Uh-huh. |
| 3 | A : | Are you aware (of this)? |
| 4 | B : | Well, a lot of new services are being offered. |
| 5 | A : | That's true. Service B and service C are examples. |
| 6 | B : | Yeah. Sevice A too. |
| 7 | A : | Oh, that's right. They're advertising (it) pretty heavily in the commercials. |
| 8 | B : | That's because they need to keep up with their rival companies. |
| 9 | A : | Uh-huh. |

FIG.34D

| | | |
|---|---|---|
| 1 0 | B : | Also, . . . |
| 1 1 | A : | Yes? |
| 1 2 | B : | (Their) old services have also changed. |
| 1 3 | A : | Yeah. For the most part (they) have gotten better, but . . . |
| 1 4 | B : | Uh-huh (, go on). |
| 1 5 | A : | . . . some have increased the burdens on users, such as the introduction of a toll on directory assistance, or the price increase for public telephones. |
| 1 6 | B : | I see. |
| 1 7 | A : | In particular the introduction of the toll on directory assistance received a lot of public attention . . . |
| 1 8 | B : | Yes (, I agree). |
| 1 9 | A : | (Do you believe that) the biggest reason (for the introduction of the toll) is that only a certain group of people frequently use directory assistance? |
| 2 0 20 | B: | (Yes, and) the next biggest reason is . . . |

FIG. 35A

| UTTERANCE NO. | SPEAKER | SENTENCE |
|---|---|---|
| 1 | A : | Min'eika-go, kaisha A no tsuushin saabisu wa samagawari shite kiteru n desu kedo. |
| 2 | B : | Ee. |
| 3 | A : | Gozonji desu ka? |
| 4 | B : | Mazu, samazama na shinki saabisu ga teikyoo sarete imasu yo ne. |
| 5 | A : | Soo desu ne. Saabisu B toka, Saabisu C nado ga soo desu yo ne. |
| 6 | B : | Hai. Saabisu A mo desu yo ne. |
| 7 | A : | Aa, soo desu ne. CF nanka no senden o sekkyokuteki ni yatte masu yo ne. |
| 8 | B : | Nanse doogyoo-tasha e no taikoo saku desu kara ne. |
| 9 | A : | Ee. ...... |

FIG.35B

```
10    B:   Tsugi ni desu ne.

11    A:   Hai.

12    B:   Juurai kara no saabisu mo samagawari
           shite imasu yo ne.

13    A:   Ee.
           Maa ippanteki ni wa yoku natte masu kedo.

14    B:   Ee.

15    A:   Bangoo-annai no yuuryooka no jisshi toka,
           kooshuu-denwa no ryookin-neage no kentoo
           toka mitai ni, riyoosha e no futan ga zooka
           suru／mono mo aru n desu yo.

16    B:   Naruhodo.

17    A:   Toku ni bangoo-annai no yuuryooka wa
           shakaiteki nimo ookiku chuumoku sare
           mashita kedo.

18    B:   Hai.

19    A:   Goku ichibu no hito dake ga bangoo-annai o
           hinpan ni riyoo suru／koto ga ichiban
           ookina riyuu desu ka?

20    B:   Tsugi ni ookina riyuu ga ···
```

FIG.36A

| UTTERANCE NO. | SPEAKER | SENTENCE |
|---|---|---|
| 1 | A : | Min'eika-go, <u>kaisha A no tsuushin saabisu</u> wa samagawari shite kiteru n desu kedo. |
| 2 | B : | Ee. |
| 3 | A : | Gozonji desu ka? |
| 4 | B : | Mazu, <u>samazama na shinki saabisu</u> ga teikyoo sarete imasu yo ne. |
| 5 | A : | Soo desu ne. <u>Saabisu B toka, Saabisu C</u> nado ga soo desu yo ne. |
| 6 | B : | Hai. <u>Saabisu A</u> mo desu yo ne. |
| 7 | A : | Aa, soo desu ne. <u>CF nanka no senden</u> o sekkyokuteki ni yatte masu yo ne. |
| 8 | B : | Nanse doogyoo-tasha e no taikoo saku desu kara ne. |
| 9 | A : | Ee. ...... |

FIG.36B

10  B: Tsugi ni desu ne.

11  A: Hai.

12  B: <u>Juurai kara no saabisu</u> mo samagawari shite imasu yo ne.

13  A: Ee.

Maa ippanteki ni wa yoku natte masu kedo.

14  B: Ee.

15  A: <u>Bangoo-annai no yuuryooka no jisshi toka, kooshuu-denwa no ryookin-neage no kentoo toka</u> mitai ni, <u>riyoosha e no futan ga zooka suru</u>／mono mo aru n desu yo.

16  B: Naruhodo.

17  A: Toku ni <u>bangoo-annai no yuuryooka</u> wa shakaiteki nimo ookiku chuumoku sare mashita kedo.

18  B: Hai.

19  A: Goku ichibu no hito dake ga <u>bangoo-annai</u> o hinpan ni riyoo suru／koto ga ichiban ookina riyuu desu ka?

20  B: Tsugi ni <u>ookina riyuu</u> ga ···

FIG.37A

| UTTERANCE NO. | SPEAKER | SENTENCE |
|---|---|---|

1  A : Min'eika-go, <u>kaisha A no tsuushin saabisu</u>  ～1a
       wa samagawari shite kiteru n desu kedo.

2  B : Ee.

3  A : Gozonji desu ka?

4  B : Mazu, <u>samazama na shinki saabisu</u> ga
       teikyoo sarete imasu yo ne.

5  A : Soo desu ne.
       <u>Saabisu B</u> toka, <u>Saabisu C</u> nado ga soo
       desu yo ne.

6  B : Hai.

<u>Saabisu A</u> mo desu yo ne.

7  A : Aa, soo desu ne.                              ～1b
       <u>CF nanka no senden</u> o sekkyokuteki ni yatte
       masu yo ne.

8  B : Nanse doogyoo-tasha e no taikoo saku desu
       kara ne.

```
10    B :  Tsugi ni desu ne.
11    A :  Hai.
12    B :  Juurai kara no saabisu mo samagawari
           shite imasu yo ne.
13    A :  Ee.
           Maa ippanteki ni wa yoku natte masu kedo.
14    B :  Ee.
```
— 1c

```
15    A :  Bangoo-annai no yuuryooka no jisshi toka,
           kooshuu-denwa no ryookin-neage no kentoo
           toka mitai ni, riyoosha e no futan
           ga zooka suru/ mono mo aru n desu yo.
16    B :  Naruhodo.
```
— 1d

```
17    A :  Toku ni bangoo-annai no yuuryooka wa
           shakaiteki nimo ookiku chuumoku sare
           mashita kedo.
18    B :  Hai.
```
— 1e

```
19    A :  Goku ichibu no hito dake ga bangoo-annai o
           hinpan ni riyoo suru/ koto ga ichiban
           ookina riyuu desu ka?
20    B :  Tsugi ni ookina riyuu ga ···
```
— 1f

FIG. 38A

| UTTERANCE NO. | SPEAKER | SENTENCE |
|---|---|---|
| 1 | A : | Min'eika-go, kaisha A no tsuushin saabisu wa samagawari shite kiteru n desu kedo. |
| 2 | B : | Ee. |
| 3 | A : | Gozonji desu ka? |
| 4 | B : | Mazu, samazama na shinki saabisu ga teikyoo sarete imasu yo ne. |
| 5 | A : | Soo desu ne. Saabisu B toka, Saabisu C nado ga soo desu yo ne. |
| 6 | B : | Hai. Saabisu A mo desu yo ne. |
| 7 | A : | Aa, soo desu ne. CF nanka no senden o sekkyokuteki ni yatte masu yo ne. |
| 8 | B : | Nanse doogyoo-tasha e no taikoo saku desu kara ne. |
| 9 | A : | Ee. ...... |

Utterances 1–3 are grouped as G11, utterances 4–5 as G12 (group 1a covers 1–6; group 1b begins with "Saabisu A mo desu yo ne." through 9).

FIG.38B

Ic — 10 B : Tsugi ni desu ne.

11 A : Hai.

12 B : <u>Juurai kara no saabisu</u> mo samagawari shite imasu yo ne.

13 A : Ee.

Maa ippanteki ni wa yoku natte masu kedo.

14 B : Ee.

G13

Id — 15 A : <u>Bangoo-annai no yuuryooka no jisshi toka, kooshuu-denwa no ryookin-neage no kentoo toka</u> mitai ni, <u>riyoosha e no futan</u> ga zooka suru / mono mo aru n desu yo.

16 B : Naruhodo.

Ie — 17 A : Toku ni <u>bangoo-annai no yuuryooka</u> wa shakaiteki nimo ookiku chuumoku sare mashita kedo.

18 B : Hai.

If — 19 A : Goku ichibu no hito dake ga <u>bangoo-annai</u> o hinpan ni riyoo suru / koto ga ichiban ookina riyuu desu ka?

20 B : Tsugi ni <u>ookina riyuu</u> ga ···

FIG.40A

| UTTERANCE NO. | SPEAKER | SENTENCE |
|---|---|---|

1a ⎧ 1   A :   Min'eika-go, <u>kaisha A no tsuushin saabisu</u> wa samagawari shite kiteru n desu kedo.

2   B :   Ee.

3   A :   Gozonji desu ka?

4   B :   Mazu, <u>samazama na shinki saabisu</u> ga teikyoo sarete imasu yo ne.

5   A :   Soo desu ne. <u>Saabisu B</u> toka, <u>Saabisu C</u> nado ga soo desu yo ne.

6   B :   Hai.   — PSEUDO-BLOCK

1b ⎧ <u>Saabisu A</u> mo desu yo ne.

7   A :   Aa, soo desu ne. <u>CF nanka no senden</u> o sekkyokuteki ni yatte masu yo ne.

8   B :   Nanse doogyoo-tasha e no taikoo saku desu kara ne.

Ic — 10 B : Tsugi ni desu ne.

11 A : Hai.

12 B : Juurai kara no saabisu mo samagawari shite imasu yo ne.  — PSEUDO-BLOCK

13 A : Ee. Maa ippanteki ni wa yoku natte masu kedo.

14 B : Ee.

Id — 15 A : Bangoo-annai no yuuryooka no jisshi toka, kooshuu-denwa no ryookin-neage no kentoo toka mitai ni, riyoosha e no futan ga zooka suru／mono mo aru n desu yo.

16 B : Naruhodo.

Ie — 17 A : Toku ni bangoo-annai no yuuryooka wa shakaiteki nimo ookiku chuumoku sare mashita kedo.

18 B : Hai.    ⎫ L12

If — 19 A : Goku ichibu no hito dake ga bangoo-annai o hinpan ni riyoo suru／koto ga ichiban ookina riyuu desu ka?

20 B : Tsugi ni ookina riyuu ga ···

FIG.43A

Kaisha A no tsuushin saabisu no dookoo

Min'eika-go, kaisha A no tsuushin saabisu wa samagawari shite imasu ga, ima kara sorera o gaikan shimashoo.

Mazu, shinki saabisu desu ga, samazama na shinki saabisu ga teikyoo sarete imashite, saabisu A ya saabisu B, saabisu C nado wa sono daihyooteki na mono desu. Shinki saabisu no naka demo saabisu A wa kyoogoo-tasha ni taikoo suru tame no saabisu desite, ···

CF nado no senden toiu men demo saabisu A wa sekkyokuteki ni apiiru shite ori-mashite, kaisha A no chikara no ireguai ga ukagae masu.

FIG.43B

Tsugi ni, jyuurai kara no saabisu ni tsuite desu ga, korera mo samagawari shite imasu. kore wa iu mademo naku saabisu wa ippanteki ni koojoo shite imasu ga, bangoo-annai no yuuryooka no jisshi ya kooshuu-denwa no ryookin-neage no kentoo nado, riyoosha e no futan no zooka o tomonau mono de arimasu.

Shakaiteki ni ookiku tyuumoku sare mashita bangoo-annai no yuuryooka wa, bangoo-annai o hinpan ni riyoo suru hito ga goku ichibu no hito ni kagirarete iru koto ya, sorera no hito ga eiri-mokuteki ni shiyoo shite iru koto, nado o riyuu ni···

FIG.43C

Trends in the Communication Services of Company A

Since (its) privatization, company A's communication services have been changing; (I) will now describe them.

First, concerning new services, various new services are being offered; service A, service B, and service C are representative of these. Among the new services service A is [a service] for keeping pace with our competitors, . . .

Service A is being heavily promoted in the form of commercials, and (we) can see how much company A has invested (in it).

FIG.43D

Next, concerning the old services, these have been changed as well. Needless to say (,) these services have generally improved, but these are (services which) impose greater burdens on their users, such as the introduction of a toll on directory assistance and the price increase on public telephones. The introduction of a toll on directory assistance (,) which received a lot of public attention; (the introduction of the toll being) due to the fact that the people who frequently use directory assistance are limited to a certain group [of people], and to the fact that those people are using (it) for profit. . . .

FIG.44A

Kaisha A no tsuushin saabisu no dookoo

Min'eika-go, kaisha A no tsuushin saabisu wa samagawari shite imasu ga,／ima kara sorera o gaikan shimashoo.

Mazu, shinki saabisu desu ga,／samazama na shinki saabisu ga teikyoo sarete imashite,／saabisu A ya saabisu B, saabisu C nado wa sono daihyooteki na mono desu.／

Shinki saabisu no naka demo saabisu A wa kyoogoo-tasha ni taikoo suru tame no saabisu desite,／・・・

CF nado no senden toiu men demo saabisu A wa sekkyokuteki ni apiiru shite ori-mashite,／kaisha A no chikara no ireguai ga ukagae masu.／

FIG.44B

Tsugi ni, juurai kara no saabisu ni tsuite desu ga,／korera
mo samagawari shite imasu.／ kore wa iu mademo naku／saabisu wa ippanteki ni koojoo shite
imasu ga,／bangoo-annai no yuuryooka no jisshi ya kooshuu-denwa
no ryookin-neage no kentoo nado, riyoosha e no futan no zooka o
tomonau／mono de arimasu.

Shakaiteki ni ookiku cyuumoku sare mashita／bangoo-annai no
yuuryooka wa, bangoo-annai o hinpan ni riyoo suru／hito ga goku
ichibu no hito ni kagirarete iru／koto ya, sorera no hito ga
eiri-mokuteki ni shiyoo shite iru／koto, nado o riyuu ni···

FIG.45A

Kaisha A no tsuushin saabisu no dookoo (1-1) Min'eika-go, <u>kaisha A no tsuushin saabisu</u> wa samagawari shite imasuga,／(1-2) ima kara sorera o gaikan shimashoo.

(2-1) Mazu, shinki saabisu desu ga,／(2-2) <u>samazama na shinki saabisu</u> ga teikyoo sarete imashite,／(2-3) <u>saabisu A ya saabisu B, saabisu C nado</u> wa sono daihyooteki na mono desu.／

(3-1) Shinki saabisu no naka demo <u>saabisu A</u> wa kyoogoo-tasha ni taikoo suru tame no saabisu desite,／...

(4-1) CF nado no senden toiu men demo <u>saabisu A</u> wa sekkyokuteki ni apiiru shite ori-mashite,／(4-2) <u>kaisha A no chikara no ireguai</u> ga ukagae masu.／

FIG.45B (5-1) Tsugi ni, <u>juurai kara no saabisu</u> ni tsuite desu ga, ／
(5-2) korera mo samagawari shite imasu.／

(6-1) kore wa iu mademo naku／(6-2) <u>saabisu</u> wa ippanteki ni koojoo shite imasu ga,／(6-3) bangoo-annai no yuuryooka no jisshi ya kooshuu-denwa no ryookin-neage no kentoo nado, <u>riyoosha e no futan no zooka</u> o tomonau／(6-4) mono de arimasu.

(7-1) Shakaiteki ni ookiku cyuumoku sare mashita／(7-2) <u>bangoo-annai no yuuryooka</u> wa, bangoo-annai o hinpan ni riyoo suru／(7-3) hito ga goku ichibu no hito ni kagirarete iru／(7-4) koto ya, sorera no hito ga <u>eiri-mokuteki</u> ni shiyoo shite iru／(7-5) koto, nado o riyuu ni···

FIG.46A

Kaisha A no tsuushin saabisu no dookoo

*2a*

(1) Min'eika-go, kaisha A no tsuushin saabisu wa samagawari shite imasu ga, ima kara sorera o gaikan shimashoo.

*2b*

(2) Mazu, shinki saabisu desu ga, samazama na shinki saabisu ga teikyoo sarete imashite, saabisu A ya saabisu B, saabisu C nado wa sono daihyooteki na mono desu.

*2c*

(3) Shinki saabisu no naka demo saabisu A wa kyoogoo-tasha ni taikoo suru tame no saabisu desite, ...

*2d*

(4) CF nado no senden toiu men demo saabisu A wa sekkyokuteki ni apiiru shite ori-mashite, kaisha A no chikara no ireguai ga ukagae masu.

FIG. 46B (5) Tsugi ni, juurai kara no saabisu ni tsuite desu ga,／korera no samagawari shite imasu.

(6) kore wa iu mademo naku saabisu wa ippanteki ni koojoo shite imasu ga, bangoo-annai no yuuryooka no jisshi ya kooshuu-denwa no ryookin-neage no kentoo nado, riyoosha e no futan no zooka o tomonau mono de arimasu.

(7) Shakaiteki ni ookiku cyuumoku sare mashita bangoo-annai no yuuryooka wa, bangoo-annai o hinpan ni riyoo suru hito ga goku ichibu no hito ni kagirarete iru koto ya, sorera no hito ga eiri-mokuteki ni shiyoo shite iru koto, nado o riyuu ni···

FIG. 47A

Kaisha A no tsuushin saabisu no dookoo

*2a* — Min'eika-go, kaisha A no tsuushin saabisu wa samagawari shite imasu ga, ima kara sorera o gaikan shimashoo. ⎫ G21

*2b* — Mazu, shinki saabisu desu ga, samazama na shinki saabisu ga teikyoo sarete imashite, saabisu A ya saabisu B, saabisu C nado wa sono daihyooteki na mono desu. ⎫ G22

*2c* — Shinki saabisu no naka demo saabisu A wa kyoogoo-tasha ni taikoo suru tame no saabisu desite,···

*2d* — CF nado no senden toiu men demo saabisu A wa sekkyokuteki ni apiiru shite ori-mashite, kaisha A no chikara no ireguai ga ukagae masu.

Tsugi ni, juurai kara no saabisu ni tsuite desu ga,／korera no samagawari shite imasu.

kore wa iu mademo naku saabisu wa ippanteki ni koojoo shite imasu ga, bangoo-annai no yuuryooka no jisshi ya kooshuu-denwa no ryookin-neage no kentoo nado, riyoosha e no futan no zooka o tomonau mono de arimasu.

2f

Shakaiteki ni ookiku cyuumoku sare mashita bangoo-annai no yuuryooka wa, bangoo-annai o hinpan ni riyoo suru hito ga goku ichibu no hito ni kagirarete iru koto ya, sorera no hito ga eiri-mokuteki ni shiyoo shite iru koto, nado o riyuu ni・・・

FIG.48B

```
                                              ╱-2e
┌────────────────────────────────────────────╱──────────┐
│ Tsugi ni, juurai kara no saabisu ni tsuite desu ga,╱ korera │
│ mo samagawari shite imasu.                                  │
│                                                             │
│  kore wa iu mademo naku saabisu wa ippanteki ni koojyoo shite │
│ imasu ga, bangoo-annai no yuuryooka no jisshi ya kooshuu-denwa │
│ no ryookin-neage no kentoo nado, riyoosha e no futan no zooka o │
│ tomonau mono de arimasu.                                    │
└─────────────────────────────────────────────────────────────┘
                                     ╱-2f        L22
┌──────────────────────────────────╱──────────────────┐
│ Shakaiteki ni ookiku cyuumoku sare mashita bangoo-annai no │
│ yuuryooka wa, bangoo-annai o hinpan ni riyoo suru hito ga goku │
│ ichibu no hito ni kagirarete iru koto ya, sorera no hito ga │
│ eiri-mokuteki ni shiyoo shite iru koto, nado o riyuu ni··· │
└─────────────────────────────────────────────────────┘
```

FIG. 49 A

Kaisha A no tsuushin saabisu no dookoo

Min'eika-go, kaishaA no tsuushinn saabisu wa samagawari shite kite iru. Sorera o gaikan suru.

1. Shinki saabisu

Samazama na shinki saabisu ga teikyoo sarete iru. Saabisu A ya saabisu B, saabisu C nado ga daihyooteki na mono de aru.

Sinki saabisu no naka demo saabisu A wa kyoogoo-tasha ni taikoo suru tame no saabisu de ari,···

CF nado no senden toiu men demo saabisu A wa sekkyokuteki ni apiiru shite ori, kaisha A no chikara no ireguai ga ukagaeru.

FIG. 49 B

2. Juurai kara no saabisu no minaoshi

Juurai kara no saabisu mo samagawari shite iru. Iu mademo naku saabisu wa ippanteki ni koojoo shite iru ga, bangoo-annai no yuuryooka no jisshi ya kooshuu-denwa no ryookin-neage no kentoo nado, riyoosha e no futan no zooka o tomonau mono mo aru.

Shakaiteki ni ookiku cyuumoku sareta bangoo-annai no yuuryooka wa, bangoo-annai o hinpan ni riyoo suru hito ga goku ichibu no hito ni kagirarete iru koto, sorera no hito ga eiri-mokuteki ni riyoo shite iru koto, nado o riyuu ni···

FIG. 49 C

Trends in the Communication Services of Company A

Since (its) privatization, company A's communication services have been changing. They are listed (below).

1. New Services

Various new services are being offered. Service A, Service B, and Service C are representative of these.

Among the new services service A is [a service] for keeping pace with our competitors. . . .

Service A has been heavily promoted in the form of commercials, and the amount company A has invested (in it) is apparent.

FIG.49 D

The old services have been changed as well. Needless to say (,) the services have generally improved, but there are some which impose greater burdens on the users, such as the introduction of a toll on directory assistance and the price increase on public telephones.

The introduction of a toll on directory assistance (,) which received a lot of public attention; (the introduction of the toll being) due to the fact that the people who frequently use directory assistance are limited to a certain group [of people], and to the fact that those people are using (it) for profit, . . .

FIG.50 A

Kaisha A no tsuushin saabisu no dookoo

Min'eika-go, kaishaA no tsuushinn saabisu wa samagawari shite kite iru./ Sorera o gaikan suru./

1. Shinki saabisu

Samazama na shinki saabisu ga teikyoo sarete iru./ Saabisu A ya saabisu B, saabisu C nado ga daihyooteki na mono de aru./

Sinki saabisu no naka demo saabisu A wa kyoogoo-tasha ni taikoo suru tame no saabisu de ari,/···

CF nado no senden toiu men demo saabisu A wa sekkyokuteki ni apiiru shite ori,/ kaisha A no chikara no ireguai ga ukagaeru./

FIG.50 B

2. Juurai kara no saabisu no minaoshi

Juurai kara no saabisu mo samagawari shite iru.／ Iu mademo naku／ saabisu wa ippanteki ni koojoo shite iru ga,／ bangoo-annai no yuuryooka no jisshi ya kooshuu-denwa no ryookin-neage no kentoo nado, riyoosha e no futan no zooka o tomonau／ mono mo aru.

Shakaiteki ni ookiku cyuumoku sareta／ bangoo-annai no yuuryooka wa, bangoo-annai o hinpan ni riyoo suru／ hito ga goku ichibu no hito ni kagirarete iru／ koto, sorera no hito ga eiri-mokuteki ni riyoo shite iru／koto, nado o riyuu ni・・・

FIG.51 A

Kaisha A no tsuushin saabisu no dookoo (1-1) Min'eika-go, <u>kaishaA no tsuushinn saabisu</u> wa samagawari shite kite iru./(1-2) Sorera o gaikan suru./

1. Shinki saabisu (2-1) <u>Samazama na shinki saabisu</u> ga teikyoo sarete iru./ (2-2) <u>Saabisu A ya saabisu B, saabisu C nado</u> ga daihyooteki na mono de aru./

(3-1) Sinki saabisu no naka demo <u>saabisu A</u> wa kyoogoo-tasha ni taikoo suru tame no saabisu de ari,/···

(4-1) CF nado no senden toiu men demo <u>saabisu A</u> wa sekkyokuteki ni apiiru shite ori,/(4-2) <u>kaisha A no chikara no ireguai</u> ga ukagaeru./

FIG. 51 B

2. Juurai kara no saabisu no minaoshi (5-1) <u>Juurai kara no saabisu</u> mo samagawari shite iru. ∕(5-2) Iu mademo naku∕(5-3) <u>saabisu</u> wa ippanteki ni koojoo shite iru ga, ∕(5-4) bangoo-annai no yuuryooka no jisshi ya kooshuu-denwa no ryookin-neage no kentoo nado, <u>riyoosha e no futan no zooka</u> o tomonau∕(5-5) mono mo aru.

(6-1) Shakaiteki ni ookiku cyuumoku sareta∕(6-2) <u>bangoo-annai no yuuryooka</u> wa, bangoo-annai o hinpan ni riyoo suru∕(6-3) hito ga goku ichibu no hito ni kagirarete iru∕(6-4) koto, sorera no hito ga <u>eiri-mokuteki</u> ni riyoo shite iru∕(6-5)koto, nado o riyuu ni···

FIG.53A

Kaisha A no tsuushin saabisu no dookoo

G31  /3a

Min'eika-go, kaishaA no tsuushinn saabisu wa samagawari shite kite iru. Sorera o gaikan suru.

1. Shinki saabisu

G32  /3b

Samazama na shinki saabisu ga teikyoo sarete iru. Saabisu A ya saabisu B, saabisu C nado ga daihyooteki na mono de aru.

/3c

Sinki saabisu no naka demo saabisu A wa kyoogoo-tasha ni taikoo suru tame no saabisu de ari, ···

/3d

CF nado no senden toiu men demo saabisu A wa sekkyokuteki ni apiiru shite ori, kaisha A no chikara no ireguai ga ukagaeru.

FIG.53B

2. Jyuurai kara no saabisu no minaoshi    G33

/3e

Jyuurai kara no saabisu mo samagawari shite iru. Iu mademo
naku saabisu wa ippanteki ni koojoo shite iru ga,
bangoo-annai no yuuryooka no jisshi ya kooshuu-denwa no
ryookin-neage no kentoo nado, riyoosha e no futan no zooka o
tomonau mono mo aru.

/3f

Shakaiteki ni ookiku cyuumoku sareta bangoo-annai no yuuryooka
wa, bangoo-annai o hinpan ni riyoo suru hito ga goku ichibu no
hito ni kagirarete iru koto, sorera no hito ga eiri-mokuteki ni
riyoo shite iru koto, nado o riyuu ni···

FIG.54A

Kaisha A no tsuushin saabisu no dookoo

Min'eika-go, kaishaA no tsuushinn saabisu wa samagawari shite kite iru. Sorera o gaikan suru.

— 3A

1. Shinki saabisu

3B

Samazama na shinki saabisu ga teikyoo sarete iru. Saabisu A ya saabisu B, saabisu C nado ga daihyooteki na mono de aru.

L31

3c

Sinki saabisu no naka demo saabisu A wa kyoogoo-tasha ni taikoo suru tame no saabisu de ari,···

3d

CF nado no senden toiu men demo saabisu A wa sekkyokuteki ni apiiru shite ori, kaisha A no chikara no ireguai ga ukagaeru.

FIG. 54B

2. Juurai kara no saabisu no minaoshi

3E

Juurai kara no saabisu mo samagawari shite iru. Iu mademo naku saabisu wa ippanteki ni koojoo shite iru ga, bangoo-annai no yuuryooka no jisshi ya kooshuu-denwa no ryookin-neage no kentoo nado, riyoosha e no futan no zooka o tomonau mono mo aru.

L32　　　　　　　　　　　3f

Shakaiteki ni ookiku cyuumoku sareta bangoo-annai no yuuryooka wa, bangoo-annai o hinpan ni riyoo suru hito ga goku ichibu no hito ni kagirarete iru koto, sorera no hito ga eiri-mokuteki ni riyoo shite iru koto, nado o riyuu ni···

FIG.55A

KaishaA no tsuushin saabisu no dookoo

Min'eika-go, kaisha A no tsuushinn saabisu wa samagawari shite kite imasu ga, ima kara sorera o gaikan shimashoo.

Mazu, shinki saabisu desu ga, samazama na shinki saabisu ga teikyoo sarete imasu.

Tatoe-ba, kan'igata no keitai-denwa to iu no ga ari mashite, kore wa tsuujoo no keitai-denwa to kotonari, doko de mo tsukaeru wake de wa naku, riyoo dekiru basho ga gentei sarete imasu ga, sono kawari nedan ga yasuku nari masu.

Kore ni yotte, keitai-denwa wa yori issoo, fukyuu suru mono to omoware masu.

FIG.55B

Kan'igata keitai-denwa wa soto de tsukau mono desu ga, katei de tsukau maruchimedia·saabisu ni tsuite no jikken mo sakan ni okonawarete imashite, tatoeba, bideo·on·demando ga age rare masu.

Kore wa, katei ni itemo sukina toki ni sukina bideo o miru koto ga dekiru saabisu desu.

Tsugi ni, juurai kara no saabisu ni tsuite desu ga, korera mo samagawari shite imasu.

Tatoe-ba, bangoo-annai no yuuryooka ga okonaware mashita ga, kore wa bangoo-annai o hinpan ni riyoo suru hito ga goku ichibu no hito ni kagirarete iru koto ya, sorera no hito ga eiri mokuteki ni shiyoo shite iru koto, nado o riyuu ni okonaware mashita.

FIG.55C

Trends in the Communication Services of Company A

Since (its) privatization, company A's communication services have been changing, so these will now be listed.

First, concerning new services, various new services are being offered.

For example, there are simplified cellular telephones, which are different from ordinary cellular telephones, (since they) are not able to be used anywhere (one wishes), (and) the area (in which they) may be used is limited, (but) in return the price becomes low.

Due to this, it is believed that cellular telephones will become more common.

FIG.55D

Simplified cellular telephones are [things] to be used outside, but many experiments are being conducted for multimedia services used in the home, for example (,) video-on-demand [may be given].

This is a service allowing the viewing of any desired video at any desired time even while [one is] at home.

Next, [it is] concerning the old services, [but] these have changed as well.

For example, a toll on directory assistance has been introduced, but (it) was introduced due to the fact that the people who frequently use directory assistance are limited to a certain group [of people], and to the fact that those people are using (it) for profit.

FIG.56

1 kaisha A no tsuushin saabisu 1.1 shinki saabisu 1.1.1 kan'igata keitai-denwa 1.1.2 kan'igata keitai-denwa 1.2 juurai kara no saabisu 1.2.1 bangoo-annai no yuuryooka

| TOPIC No. | SIMPLE SENT. No. | LEVEL | SCOPE | |
|---|---|---|---|---|
| | | | START | END |
| 0 | 0 | 1 | 0 | 23 |
| 1 | 3 | 2 | 2 | 16 |
| 2 | 4 | 3 | 4 | 9 |
| 3 | 10 | 3 | 10 | 16 |
| 4 | 17 | 2 | 17 | 23 |
| 5 | 19 | 3 | 19 | 23 |

Table 315:

| SIMPLE SENT No. | PROMINENT NP | TYPE | SCOPE START | SCOPE END |
|---|---|---|---|---|
| 0 | 2, 3, 4, 5 | explicit | 0 | 15 |
| 1 | ... | ... | 16 | 25 |
| 2 | ... | ... | ... | ... |
| 3 | ... | ... | ... | ... |
| 4 | 44, 45, 46, 47 | explicit | 42 | 55 |
| 5 | ... | ... | ... | ... |
| ... | ... | ... | ... | ... |
| 10 | 121, 122, 123, 124 | explicit | 121 | 132 |
| 11 | ... | ... | ... | ... |
| ... | ... | ... | ... | ... |

Table 316:

| WORD No. | WORD | PART OF SPEECH |
|---|---|---|
| 0 | mineika | noun |
| 1 | go, | suffix |
| ... | ... | ... |
| 14 | ga | ... |
| 15 |  | punc. mark |
| 16 | ima | noun |
| ... | ... | ... |
| 44 | kan'i | noun |
| 45 | gata | suffix |
| 46 | keitai | noun |
| 47 | denwa | noun |
| ... | to | case p.p. particle |
| ... | ... | ... |
| 121 | kan'i | noun |
| 122 | gata | suffix |
| 123 | keitai | noun |
| 124 | denwa | noun |
| ... | wa | particle |
| ... | ... | ... |

FIG.63

| SIMPLE SENT. No. | PROMINENT NP | TYPE | SCOPE START | END |
|---|---|---|---|---|
| 0 | 2, 3, 4, 5 | explicit | 0 | 15 |
| 1 | ... | ... | 16 | 25 |
| 2 | ... | ... | ... | ... |
| 3 | ... | ... | ... | ... |
| 4 | 44, 45, 46, 47 | explicit | 42 | 55 |
| 5 | ... | ... | ... | ... |
| ... | ... | ... | ... | ... |
| 10 | -1 | -1 | 121 | 132 |
| 11 | ... | ... | ... | ... |
| ... | ... | ... | ... | ... |

```
1   kaisha A no tsuushin saabisu 1.1  shinki saabisu 1.1.1  kan'igata keitai-denwa 1.1.2  maruchimedia・saabisu 1.2  juurai kara no saabisu 1.2.1  bangoo-annai no yuuryooka
```

FIG.68

| UTTERANCE NO. | SPEAKER | SENTENCE |
|---|---|---|
| 1 | A | Hello. |
| | | I'd like to ask a question about mail delivery. |
| 2 | B | Yes, sir. |
| 3 | A | I want to send an express letter. |
| 4 | B | Special delivery? |
| 5 | A | Will the letter reach Kyoto by tomorrow? |
| 6 | B | I think it will because the next letter collection is at noon. |
| 7 | A | Can I use that mailbox? |
| 8 | B | Yes. |
| 9 | A | Yes. The next question is about a postal deposit. |

FIG.69

| UTTER-ANCE NO. | SPEAKER | SENTENCE |
|---|---|---|
| 1 | A | Hello. |
|   |   | I'd like to ask a question about mail delivery. |
| 2 | B | Yes, sir. |
| 3 | A | I want to send an express letter. |
| 4 | B | Special delivery? |
| 5 | A | Will the letter reach Kyoto by tomorrow? |
| 6 | B | I think it will / |
|   |   | because the next letter collection is at noon. |
| 7 | A | Can I use that mailbox? |
| 8 | B | Yes. |
| 9 | A | The next question is about a postal deposit. |
|   |   | .................... |

FIG. 70

| UTTERANCE NO. | SPEAKER | SENTENCE |
|---|---|---|
| 1 | A | Hello. |
| | | I'd like to ask a question about *mail delivery*. |
| 2 | B | Yes, sir. |
| 3 | A | I want to send *an express letter*. |
| 4 | B | Special delivery? |
| 5 | A | Will *the letter* reach Kyoto by tomorrow? |
| 6 | B | I think it will / |
| | | because *the next letter collection* is at noon. |
| 7 | A | Can I use *that mailbox*? |
| 8 | B | Yes. |
| 9 | A | The next question is about *a postal deposit*. |

FIG.71

| UTTER-ANCE NO. | SPEAKER | SENTENCE |
|---|---|---|
| 1 | A | Hello. |
|   |   | I'd like to ask a question about *mail delivery*. |
| 2 | B | Yes, sir. |
| 3 | A | I want to send *an express letter*. |
| 4 | B | Special delivery? |
| 5 | A | Will *the letter* reach Kyoto by tomorrow? |
| 6 | B | I think it will / |
|   |   | because *the next letter collection* is at noon. |
| 7 | A | Can I use *that mailbox*? |
| 8 | B | Yes. |
| 9 | A | The next question is about *a postal deposit*. |

FIG.72

| UTTERANCE NO. | SPEAKER | SENTENCE | |
|---|---|---|---|
| 1 | A | Hello. | ⎤ |
|   |   | I'd like to ask a question about *mail delivery*. | ⎦ G41 |
| 2 | B | Yes, sir. | |
| 3 | A | I want to send *an express letter*. | |
| 4 | B | Special delivery? | |
| 5 | A | Will *the letter* reach Kyoto by tomorrow? | |
| 6 | B | I think it will / | |
|   |   | because *the next letter collection* is at noon. | |
| 7 | A | Can I use *that mailbox*? | |
| 8 | B | Yes. | |
| 9 | A | The next question is about *a postal deposit*. | ⎤ G42 |

FIG. 74

| UTTERANCE NO. | SPEAKER | SENTENCE |
|---|---|---|
| 1 | A | Hello. |
|   |   | I'd like to ask a question about _mail delivery_. |
| 2 | B | Yes, sir. |
| 3 | A | I want to send _an express letter_. |
| 4 | B | Special delivery? |
| 5 | A | Will _the letter_ reach Kyoto by tomorrow? |
| 6 | B | I think it will / |
|   |   | because _the next letter collection_ is at noon. |
| 7 | A | Can I use _that mailbox_? |
| 8 | B | Yes. |
| 9 | A | The next question is about _a postal deposit_. |

L41 brackets utterances 3–6.

METHOD AND APPARATUS FOR RECOGNIZING TOPIC STRUCTURE OF LANGUAGE DATA

BACKGROUND OF THE INVENTION

1. Field of the Invention

The present invention relates to a method and an apparatus for recognizing a topic structure of language data in the field of the analysis of natural language.

2. Technical Background

It has been experimentally proven that when a number of subjects are presented with language (or lingual) data in both written and spoken form and are asked to "determine the blocks within the data having the same content and this 'content', they tend to refer to an identical structure. The following reference describes an example of such an experiment: Takeshita et al., "Wadai-kouzou-ninshiki no Kanten kara no Hyuuman-komyunikeishon no Kenkyuu (A Study of Human Communication Based on Topic Structure Recognition), Proceedings of the Institute of Electronics, Information and Communication Engineers (IEICE) Fall 1993 Conference".

Such a structure recognized by humans is called "topic (or skimming) structure" and recognizing the topic structure by a computer is called "topic structure recognition". Generally, the topic structure consists of a nest structure; thus, each topic is represented by a "topic portion" (i. e., corresponding word or phrase) indicating a topic, a "topic level" indicating the depth of nesting, and a "topic scope" indicating the beginning and the end of the topic.

In recent years, the circulation of electronic language data has increase; however, it cannot always be said that the best advantage has been taken of such language data. This tendency especially increases if the information includes foreign language texts, or transcripts of spoken data such as minutes of meetings or lectures.

Until now, various models related to topics and their structure have been proposed. The following reference gives an example: B. J. Grosz and C. L. Sidner, "Attention, Intention, and the Structure of Discourse", Computational Linguistics, Vol. 12, No. 3, pp. 175–204, 1986". In the document, the expansion of topics are modeled by using "stacks" because of the nest structure of the topics. In addition, the changing of the nest structure, that is, the operation of "pushing" or "popping" into or from the stack, is decided by the change of intention of the speaker or writer. Moreover, a kind of common knowledge, called as "domain knowledge", is used for determining the topics of extension in the language data.

The domain knowledge includes taxonomical relationships, such as the relationship between upper and lower classes, for example, "Company A is a telecommunication company", and the relationship between an action and its objects, for example, "Company A presents service A and advertises for it".

However, in the above model for topics and their structure, no method is given for recognizing the intention of the speaker; thus, an accurate topic structure cannot be obtained. In addition, a method sufficient for examining what kind of domain knowledge is needed for the expansion of topics and how such knowledge should be used is not given. Even if such methods were given, it would be nearly impossible to prepare the necessary domain knowledge because of its incalculable amount.

SUMMARY OF THE INVENTION

Therefore, the purpose of the present invention is to provide a method and an apparatus for recognizing the topic structure of the language data by which humans can more easily receive language information.

Therefore, the present invention provides (I) a method for recognizing a topic structure of language data, the method comprising steps of: (a) dividing the language data into plural simple sentences and extracting a prominent NP (noun portion) from each simple sentence; (b) dividing the simple sentences into blocks each of which is a unit of data dealing with a single subject and outputting information about the blocks; (c) detecting a starting point of at least one topic and determining a topic introducing region of each topic based on the information about the blocks and the characteristics of the language data; (d) choosing a prominent NP which satisfies a predetermined condition from the prominent NPs included in each determined topic intro. region and recognizing the chosen prominent NP as a topic portion of the topic in the topic intro. region; (e) determining, based on the topic portion and sentences before and after the topic portion, a topic level indicating a depth of nesting of each topic and a topic scope indicating a region over which the topic continues; (f) determining any sub-topic intro. regions In the remaining area in which no topic intro. regions are recognized based on the information about the blocks and the characteristics of the language data; (g) choosing a prominent NP which satisfies a predetermined condition from the prominent NPs Included in each determined sub-topic intro. region and recognizing the chosen prominent NP as a sub-topic portion of the sub-topic in the sub-topic intro. region; (h) determining a temporary topic level indicating a depth of nesting of each sub-topic and a subtopic scope indicating a region over which the sub-topic continues based on the sub-topic portion and sentences before and after the sub-topic portion; and (i) unifying all determined topics and sub-topics as the topics in the language data by revising the temporary topic level of each sub-topic according to the topic level of each topic and outputting these topics and their levels as a topic structure, and (II) a topic structure recognizing apparatus comprising: a pre-process memory for storing rules and a dictionary to recognize a unit of data dealing with a single subject in language data; a global expansion process memory for storing rules for recognizing any topics which extend explicitly in the language data; a local expansion process memory for storing rules for recognizing any sub-topics which extend implicitly in the global expansion; a unification process memory for storing a rule for unifying the topics and the sub-topics; a data input section for inputting the language data; a pre-processor for dividing the language data into units of data, each unit dealing with a single subject, with reference to the contents of the pre-process memory; a global expansion processor for recognizing the topics in the language data based on results outputted from the pre-processor with reference to contents of the global expansion process memory; a local expansion processor for recognizing the sub-topics in the language data based on results outputted from both the pre-processor and the global expansion processor with reference to contents of the local expansion process memory; and a unification processor for integrating the topics and the sub-topics as topics in order to determine a topic structure of the language data with reference to the contents of the unification process memory, and outputting the topic structure.

According to the method and apparatus for recognizing the topic structure, it is possible to recognize the topics, not by using domain knowledge, but by using knowledge of methods relating to the expansion of topics or linguistic knowledge.

By presenting the recognized topics and their structure to users, users can skim language data such as documents, foreign language data and minutes of the meeting, and can grasp the outline. Moreover, the users can use the topic structure as an index or a table of contents; thus, it is easy to use the language data again. As a result, the present method aids the intellectual activities of humans, such as examinations, collection of information, and so on.

In addition, it is preferable to add the following steps to the above method, that is: (j) detecting whether or not a duplicated topic portion is included in the output topic structure; (k) judging whether or not a re-extraction of topics of the language data is needed in accordance with the detection of a duplicated topic portion; and (h) performing a pre-process so as not to extract the duplicated topic portion from the language data if it is Judged that re-extraction is needed, and repeating the steps from the step (b).

In this case, if any duplicated topic portion is detected, the pre-process is performed only if it is judged that a re-extraction is needed; therefore, a more appropriate topic structure is recognized and results which are clearer to humans can be obtained.

BRIEF EXPLANATION OF THE DRAWINGS

FIG. 4 shows some examples of rules for dividing (compound sentences) into simple sentences.

FIG. 5A, 5B and 5C show examples of the priority rankings for prominent NPs as markers for dialogue, monologue, and text data, respectively.

FIG. 6 shows some examples of sentence patterns for topic continuing expressions.

FIG. 7 shows an example of classification of cue indicators.

FIG. 20 shows an example of the priority ranking for topic candidates in the global expansion.

FIG. 21 shows an example of rules for increase or decrease of the topic level in accordance with the indicator type.

FIG. 22 shows an example of rules for applying the level for each topic in the case of text data.

FIG. 26 shows an example of the priority ranking for topic candidates in the local expansion.

FIG. 28 shows an example of the priority ranking for topic candidates in the local expansion.

FIGS. 34A and 34B concrete examples of Japanese dialogue data. FIGS. 34C and 34D are their English translations.

FIGS. 35A and 35B the results of the simple sentence division process applied to the Japanese dialogue data.

FIGS. 36A and 36B show the results of the prominent NP extraction process applied to the Japanese dialogue data.

FIGS. 37A and 37B show the results of the block division process applied the Japanese dialogue data.

FIGS. 38A and 38B show the results determined in the decision process for the topic intro. region in the global expansion.

FIGS. 40A and 40B show the results determined in the decision process for the topic intro. region in the local expansion.

FIGS. 43A and 43B show a concrete example of Japanese monologue data. FIGS. 48C and 43D are their English translations.

FIGS. 44A and 44B the results of the simple sentence division process applied the Japanese monologue data.

FIGS. 45A and 45B show the results of the prominent NP extraction profs applied to the Japanese monologue data.

FIGS. 46A and 46B show the results of the block division process applied the Japanese monologue data.

FIGS. 47A and 47B show the results determined in the decision process for the topic intro. region in the global expansion.

FIGS. 48A and 48B show the results determined in the decision process for the topic intro. region in the local expansion.

FIGS. 49A and 49B show a concrete example of Japanese text data. FIGS. 49C and 49D are their English translations.

FIGS. 50A and 50B show the results of the simple sentence division process applied to the Japanese text data.

FIGS. 51A and 51B show the results of the prominent NP extraction process applied to the Japanese text data.

FIGS. 53A and 53B show the results determined in the decision process for the topic intro. region in the global expansion.

FIGS. 54A and 54B show the results determined in the decision process for the topic intro. region in the local expansion.

FIGS. 55A and 55B show a concrete example of Japanese monologue data in the second embodiment of the present invention. FIGS. 55C and 55D are their English translations.

FIG. 56 shows the result of the topic recognition process of the first embodiment applied to the monologue data shown in FIG. 55A.

FIG. 59 shows the structures of simple sentence information table and word information table, and the relationships between these tables.

FIG. 63 shows the contents of the word information table after the recalculation preparation.

FIG. 64 shows the result of the topic recognition process of the second embodiment applied to the monologue data shown in FIG. 55A.

FIG. 68 shows an example of English dialogue data.

FIG. 69 shows the result of the simple sentence division process applied to the English dialogue data based on the syntactic analysis.

FIG. 70 shows the result of the prominent NP extraction process applied to the English dialogue data.

FIG. 71 shows the result of the block division process applied to the English dialogue data.

FIG. 72 shows the result determined in the decision process for the topic intro. region in the global expansion.

FIG. 74 shows the result determined in the decision process for the topic intro. region in the local expansion.

DESCRIPTION OF PREFERRED EMBODIMENTS

Hereinafter, preferred embodiments of the present invention will be presented with reference to the drawings.

[First Embodiment]

Figure 1:
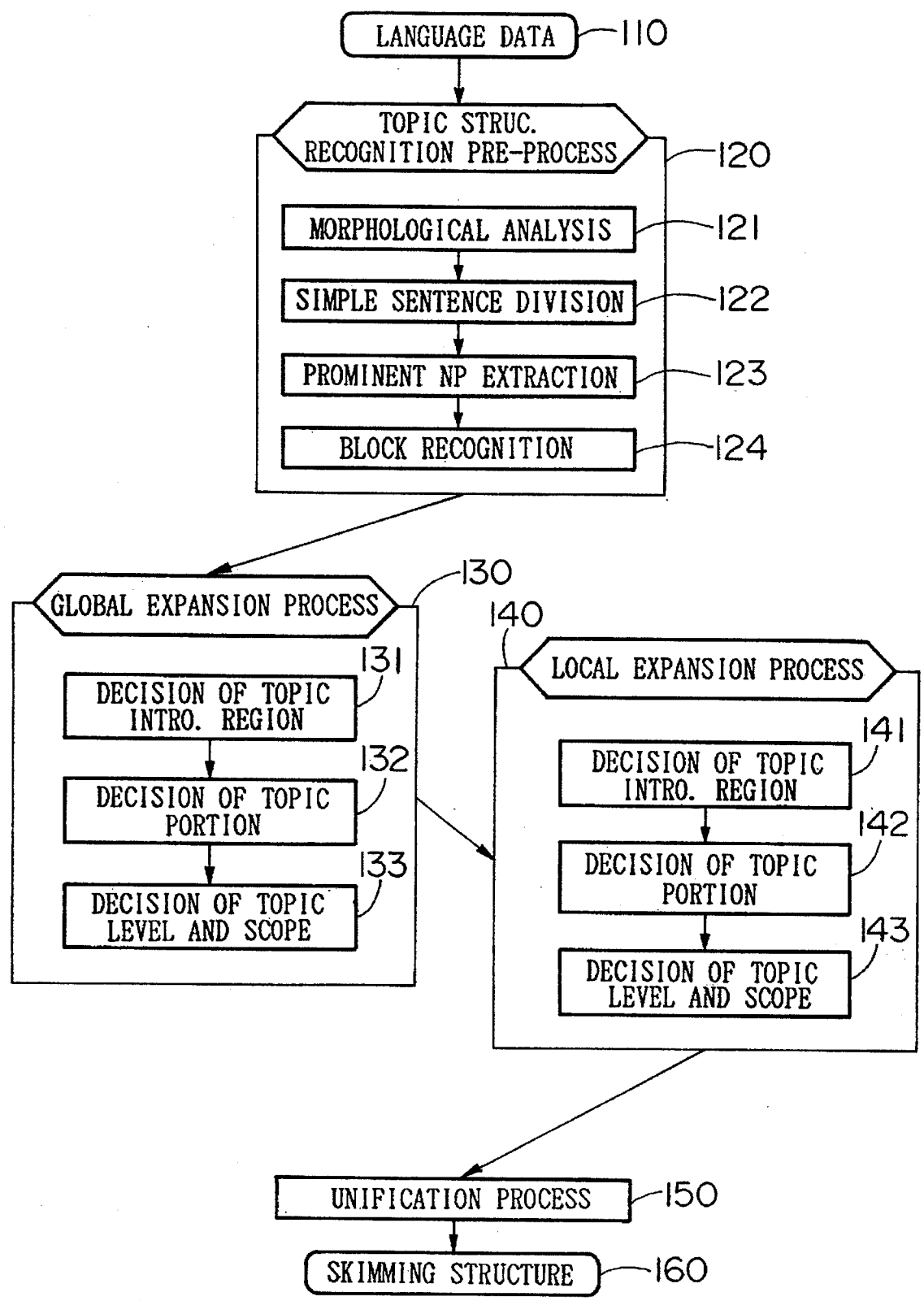
FIG. 1 is a general diagram for explaining the method for recognizing the topic structure in the first embodiment according to the present invention.
Figure 2:
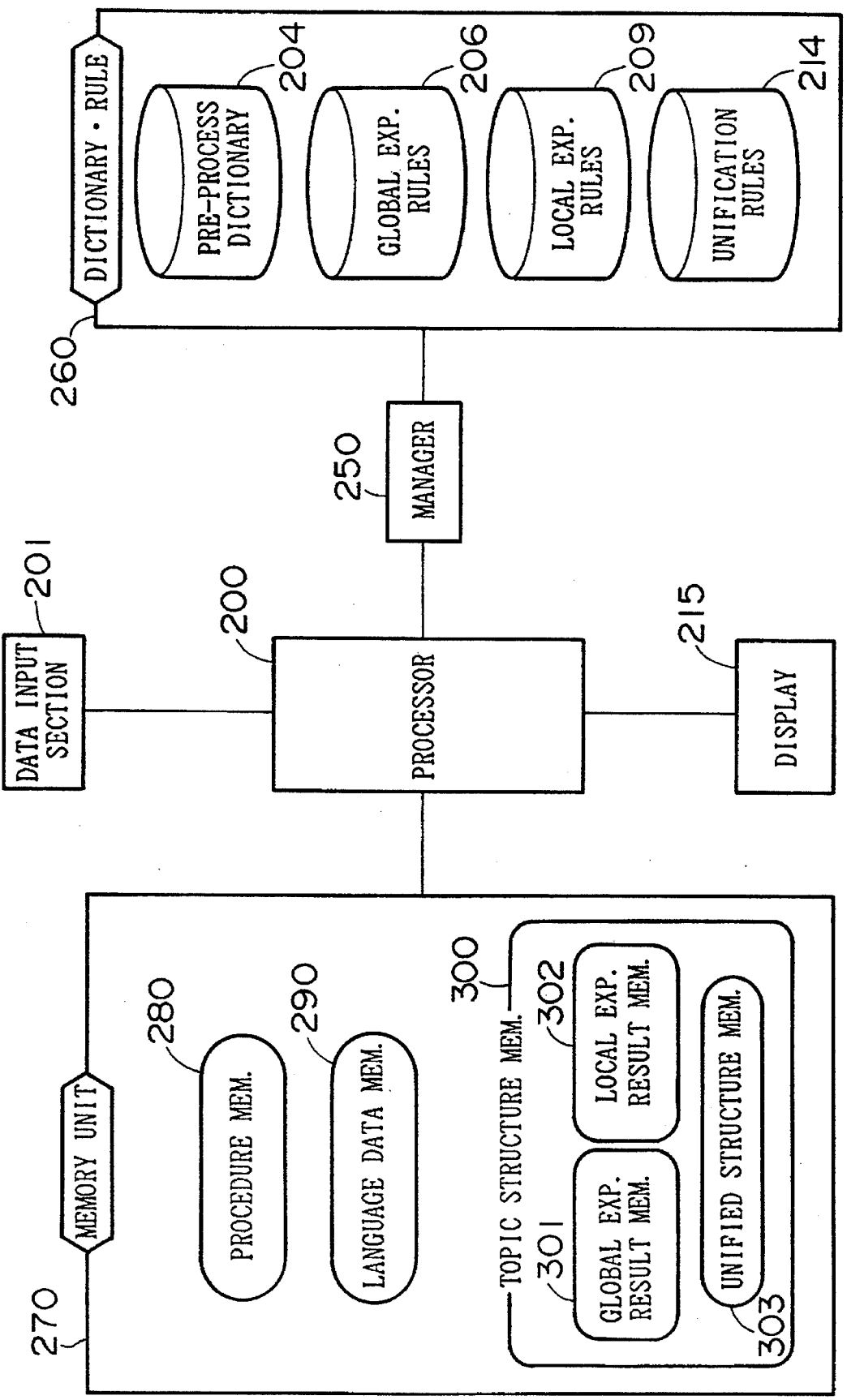
FIG. 2 is a block diagram of a topic structure recognizing apparatus for implementing the process shown in FIG. 1.
Figure 3:
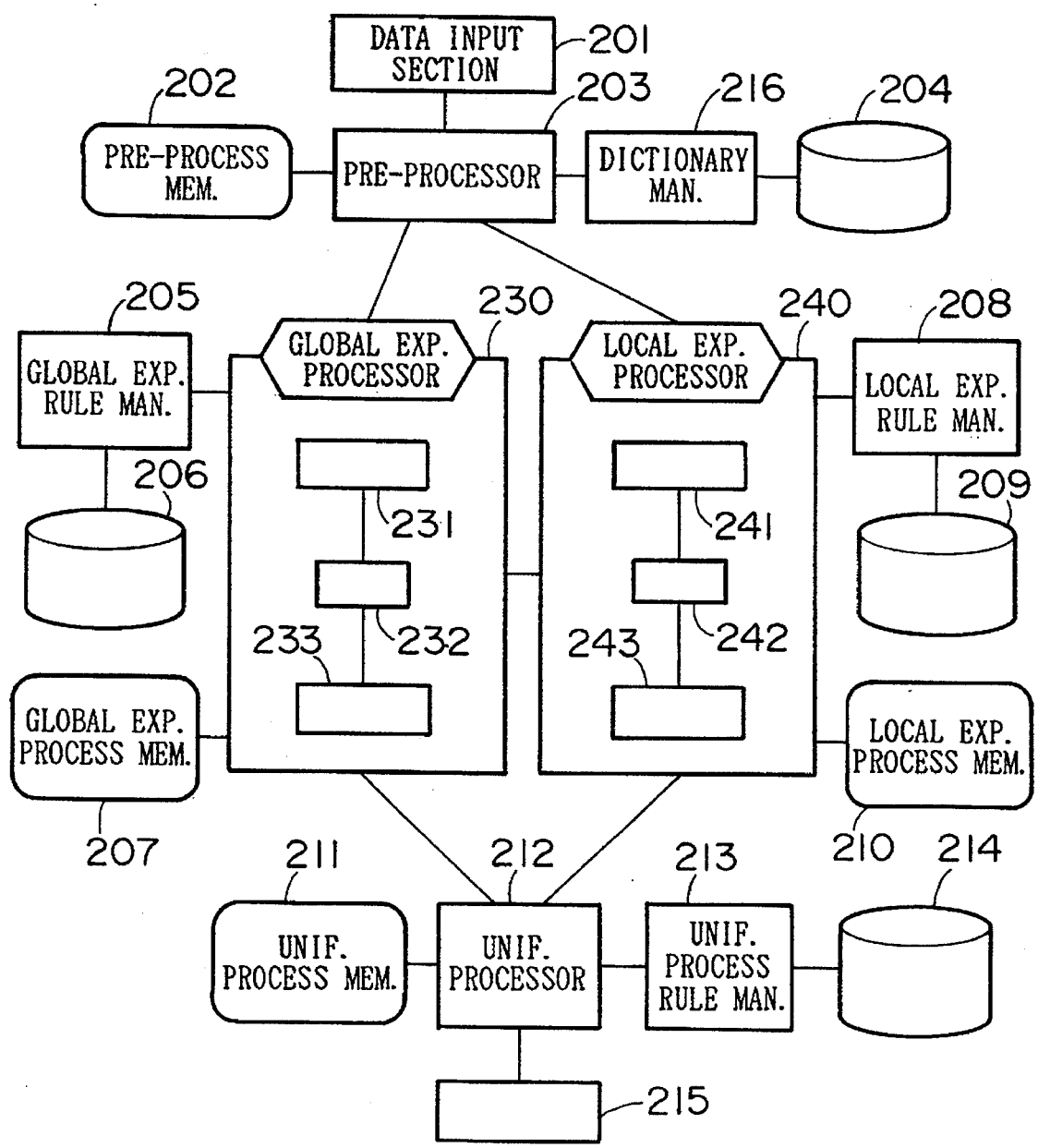
FIG. 3 is a block diagram of the apparatus shown in FIG. 2 from the viewpoint of practical procedure.

FIG. 1 is a general diagram for explaining an example of the method for recognizing the topic (or skimming) structure in the present invention. FIG. 2 is a block diagram of a topic structure recognizing apparatus for implementing the process shown in FIG. 1. FIG. 3 is also a block diagram of the apparatus from the viewpoint of practical procedure. Hereinbelow, the method and apparatus for recognizing the topic structure according to the present invention will be generally explained with reference to these drawings.

In FIG. 1, reference numeral 1 indicates language data as language information, of a kind such as dialogue data (i. e., conversational style), monologue data (i. e., long speech style by one person), or text data (i. e., written language style).

The general flow of the process will be explained below.

Topic structure recognition pre-process 120 is conducted for the input language data 110 so as to divide the language data into blocks. Then, global expansion process 130 is conducted for the blocks. The process identifies the topic portions, the level and the scope of the global topics. Then, local expansion process 140 identifies the topic portions, the level and the scope of local topics. Subsequently, based on the topic portions and their levels determined in the processes 130 and 140, the unification process 150 of the global and local expansions is conducted in order to determine a total topic structure, i. e., skimming structure 160.

The apparatus shown in FIGS. 2 and 3 comprise data input section 201 for inputting language data, which may be a key board or scanner, processor 200 which performs many kinds of processes, display 215 for indicating the result of the processes, memory unit 270 which stores the result of each process and data necessary for each process, dictionary-rule section 260 for storing dictionaries and rules necessary for some processes, and manager 250 which manages the access of processor 200 to dictionary-rule section 260 and the contents of dictionary-rule section 260.

In processor 200, topic structure recognition preprocessor 203, global expansion processor 230, local expansion processor 240, and unification processor 212 are provided. In global and local expansion processors 230 and 240, decision sections 231 and 241 for determining the topic intro. regions, decision sections 232 and 242 for determining the topic portions, and, decision sections 233 and 243 for determining the topic level and scope of each topic portion are provided respectively.

Memory unit 270 includes procedure memory 280 for storing the procedure for each process, language data memory 290 for storing results of the pre-process, and topic structure memory 300 for storing intermediate or final results of the process. Procedure memory 280 further includes pre-process memory 202, global expansion process memory 207, local expansion process memory 210, and unification process memory 211. Additionally, topic structure memory 300 further includes global expansion result memory 301, local expansion result memory 302, and unified structure memory 303.

In addition, dictionary-rule section 260 provides pre-process dictionary 204, global expansion rules 206, local expansion rules 209, and unification rules 214. Manager 250 provides dictionary manager 216, global expansion rule manager 205, local expansion rule manager 208, and unification process rule manager 213.

Next, each process will be explained in detail.

§1. TOPIC STRUCTURE RECOGNITION PRE-PROCESS (120)

This pre-process is conducted by topic structure recognition pre-processor 203 according to procedures stored in pre-process memory 202, referring to pre-process dictionary 204 via dictionary manager 216. The result is stored in language data memory 290.

§1-1. MORPHOLOGICAL ANALYSIS (121)

In Japanese notation, words are not separated by spaces, but are connected. In this process, a row of letters in language data 110 are divided at every word in order to make a row of words, and the part of speech of each word, the conjugation of each conjugational word, and the like are recognized.

For example, when a row of Japanese characters, "tokkyo o kaku <drafting patent specifications>" is input to be analyzed, the divided Japanese words "tokkyo <patent>", "o", and "kaku <draft or write>" and information indicating the part of speech and the conjugation (in the case of a verb) such as ⌈"tokkyo"=noun⌋, ⌈"o"=case post positional particle⌋, and, ⌈"kaku"=sentence closing verb form⌋ are obtained as outputs. Here, a sentence or a word put in angle brackets "<>" represents the corresponding English meaning. It should be noted that words are not separated by spaces in normal Japanese sentences with chinese characters and hiragana, as described above.

The word dictionary storing the part of speech of each word and the connection matrix dictionary memorizing the tendency of any two parts of speech to be located side by side are stored in pre-process dictionary 204 for the morphological analysis. In the connection matrix dictionary, for example, information to the effect that case post positional particles tend to succeed nouns such as in "tokkyo o" but not tend to succeed verbs such as in "kaku o" is registered.

Generally, when dividing Japanese characters in to words some ambiguity exists, such as to whether the characters "tokkyo" compose a single noun "tokkyo" or the characters compose two words (two chinese characters) "toku" and "kyo". In the morphological analysis, the optimum results can be obtained by using both the word and connection matrix dictionaries. The method of morphological analysis is described in detail in the following reference: "Yoshimura, Hidaka, Yoshida, "Bunsetsu-suu Saishoo-hoo o Mochiita Betagaki Nihongo-bun no Keitaiso-kaiseki (Morphological Analysis of Japanese Sentences by Minimizing the Number of Clauses)", Transactions of Information Processing Society of Japan (IPSJ), Vol. 24, No. 1, pp 40–46, 1983".

§1-2. SIMPLE SENTENCE DIVISION (122)

In this process, sentences having plural predicates, such as compound sentences or sentences embedding other sentences, are divided into one or more simple sentences having only one predicate in accordance with the result of the morphological analysis.

For example, the sentence "Watashi wa tokkyo o kaku <I draft a patent specification>" includes one predicate "kaku <draft>"; thus, this is a simple sentence. In contrast, the sentence "Hatsumeishi tara, tokkyo o kaku <If I invent (it), I (will) draft a patent specification>" includes two predicates "hatsumeishi <invent>" and "kaku <draft>"; thus, the sentence is divided into two simple sentences, "Hatsumei shi tara," and "tokkyo o kaku".

Rules for dividing into simple sentences and into words are stored in pre-process dictionary 204. Some examples of rules for dividing (compound sentences) into simple sentences used in the present embodiment is shown in FIG. 4. The possibility of applying each rule to a given sentence is examined and if an effective rule is found, then the sentence is processed in accordance with the corresponding rule.

§1-3. PROMINENT NOUN PORTION (NP) EXTRACTION (123)

In this process, the most emphasized noun portion in each simple sentence is extracted from the sentence as a prominent noun portion (refereed to as "prominent NP", hereinafter). "NP" often means "Noun Phrase" in the field of language analysis; however, here, it stands for "Noun Portion" in order to indicate that "NP" may be of arbitrary length, such as in the case of a word, phrase, or clause.

In the case of the Japanese language, the prominent NP is indicated by a "marker" such as a particle. In regard to markers, there are two types: one is an explicit marker only indicating a word or phrase, such as "ni tsuite", "ni kanshite", or "wa", and the other one is an implicit marker indicating a grammatical role as well as the word or phrase, such as "ga", or "o". Information about these markers is previously stored in pre-process dictionary 204 with their priority ranking information, in accordance with selections by a human such as a system manager. In the description below, some "previously stored" variable items also appear, these items also being set according to the selection of human being.

The explicit markers have higher priority than implicit markers. A candidate for the prominent NP is extracted by means of matching the inputted language data with these markers. If the portion indicated by the marker is a deictic expression which does not have any meaning on its own, the portion is not recognized as a candidate. In addition, if plural candidates are extracted from a simple sentence, the candidate having the highest rank in the ranking previously decided is selected as the prominent NP. If plural candidates have the same highest rank, the one which appears first is selected.

Here, an example of the priority ranking is shown separately for each kind of language data. FIG. 5A, 5B and 5C show the examples of the rankings for dialogue, monologue, and text (written language) data, respectively. In the case of monologue data, explicit markers besides "wa" have higher priority than the marker "wa". In the case of text data, explicit markers with the punctuation mark '.' have the highest priority. As explained above, the priority ranking for prominent NPs is most suitably established in accordance with the characteristics of the language data.

§1-4. BLOCK RECOGNITION (124)

In this process, one or more blocks are recognized in the inputted language data. A block is a unit of data concerning a subject, but the subject may extend over more than one block. It corresponds to a paragraph. The block recognition rules necessary for the process are also stored in pre-process dictionary 204. Regarding this process, there are somewhat different procedures for the different kinds of language data; therefore, each procedure is individually explained below.

§1-4-1. In the Case of Dialogue Data

Some rules for block recognition for dialogue data are shown below.

<Block Recognition Rule>
(a) Preservation in a Sentence

A sentence, which is indicated by a punctuation mark such as ".", also indicates preservation of a topic in the sentence; thus, a sentence can be recognized as a block.

(b) Forwarding

Sentence forms such as questions ("desu ka"), requests, or confirmations have a function to forward a present topic to the next simple sentence; thus, the next sentence can be put into the same block as the present simple sentence. FIG. 6 shows some examples of sentence patterns which belong to this category.

(c) Succession

In each case below, the present simple sentence belongs to the block which includes a simple sentence just before the present one. (c-1) No prominent NP has been extracted from the present simple sentence. (c-2) The prominent NP extracted from the present simple sentence is included in a group of prominent NPs extracted from the block including the simple sentence located just before the present one. (c-3) No prominent NP exists in the block to which the simple sentence just prior to the present one belongs. (at the head of the language data)

(d) Preservation by Cue Indicating Area

A group of simple sentences belonging to a cue indicating area (explained below) belongs to the same block.

(e) Beginning

In all other cases, a new block begins from the present sentence.

Now, the cue indicating area deciding process will be explained. Here, the "cue indicating area" (referred to as "indicating area", hereinbelow) is an area in which a cue indicator, that is, a cue word or phrase (referred to as an "indicator", hereinbelow) such as "mazu <first>", "tsugi ni <next>" is lengthened by language phenomena such as hesitation, repetition, and the like. The indicator explicitly indicates the start of a new topic expansion.

In the process, indicators are previously classified into three types, i. e., a nest start type, a topic change type, and a nest end type, as shown in FIG. 7 and are registered in the indicator dictionary stored in pre-process dictionary 204 for the detection of those which are included in the dialogue data.

Figure 8:
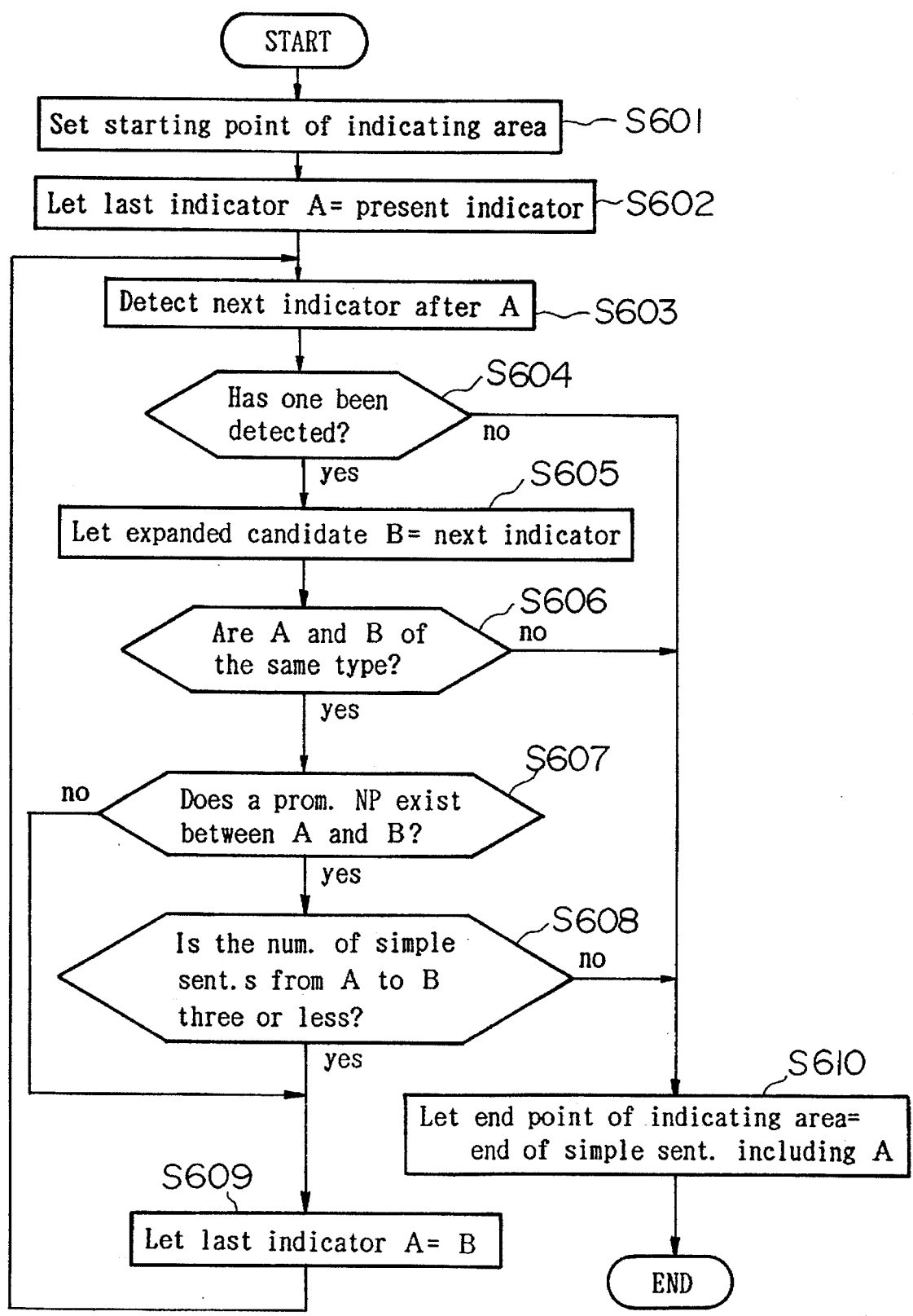
FIG. 8 is a flow chart explaining an example of the indicating area detection process.

FIG. 8 is a flow chart explaining an example of the indicating area detection process.

First, the beginning of the simple sentence including the present (noticed) indicator is recognized as the starting point of an indicating area (see step S601). Next, variable A which stores the character string of the last indicator in the present indicating area, is made to represent the present indicator (see step S602).

Next, a detection procedure is performed for the next indicator after variable A (see step S603), after which it is judged whether or not the next indicator has been detected (see step S604). If no indicator has been detected, then the end of the simple sentence including variable A is admitted as the end point of the indicating area (see step S610) and the process ends. On the other hand, if an indicator has been detected, variable B, which stores the character string of the next candidate which may be added to the indicating area, is made to represent the detected indicator (see step S605).

Next, it is judged whether or not variables A and B belong to the same type as shown in FIG. 7 (see step S606). If judged "no", then the process jumps to step S610, and the end of the simple sentence including variable A is admitted as the end point of the indicating area.

If judged "yes" in step S606, then it is judged whether or not any prominent NP exists between variables A and B (see step S607). If it is judged "yes", then further judged whether or not the number of simple sentences existing in the area from the point corresponding to variables A to the point corresponding to B is ⌈three or less⌋ (see step S608). Here, the amount ⌈three or less⌋ of simple sentences has been decided beforehand in accordance with the type of dialogue data. If judged "no", the process jumps to step S610 and the end of the single sentence including variable A is admitted as the end point of the indicating area. In contrast, if judged "yes", the content of variable A is set equal to that of variable B (see step S609) and the process returns to step S603 to repeat the same process.

If there is no prominent NP between variables A and B in step S607, the content of variable A is set equal to that of variable B in step S609 and the process also returns to step S603.

§1-4-2. In the Case of Monologue Data

Some rules for block recognition of monologue data are shown below.

<Block Recognition Rule>
(a) Preservation in a Sentence

Same as the above case (1).

(b) Succession

If the topic is explicitly continued from the former sentence by a topic continuing expression such as "ni yorimasuto <reportedly>", "shikashi <but>", "kore ni taishi te <to the contrary>", "kore wa <this is>", "kono kekka <as a result>", etc., the present simple sentence belongs to the same block including the simple sentence just before it.

(c) Beginning

In all other cases, a new block begins from the present sentence.

§1-4-3. In the Case of Text (Written Language) Data

Figures 9, 10:
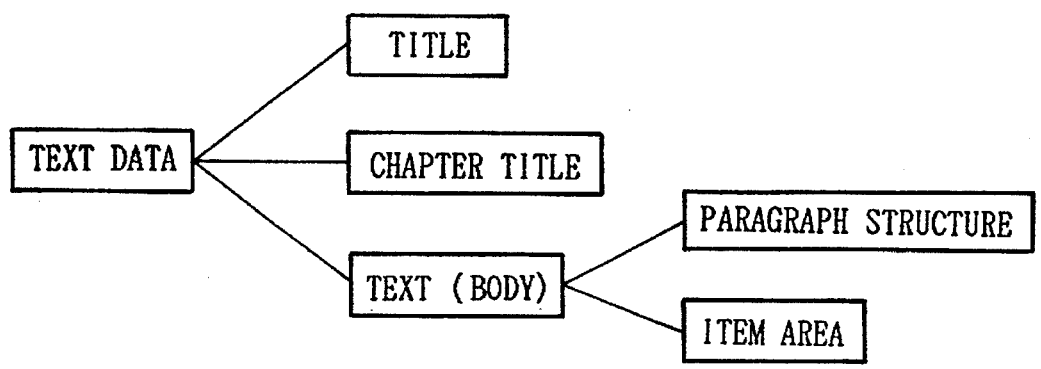
FIG. 9 shows an example of the logic structure of text data.
FIG. 10 shows an example of rules for determining item areas.

As shown in FIG. 9, the logic structure of text data generally has a 'title', a 'chapter title', and a 'text (body)'. The logic structure of the text (body) further has paragraph structure and item area, which may partly overlap or form an inclusive relation.

The blocks in text are normally given as paragraphs; thus, no block recognition process is needed. In addition, the title or chapter titles are also given in general. However, item areas are not normally given; thus, a process to decide such areas is needed.

FIG. 10 shows an example of rules for deciding item areas, which are suitable for the text data of newspaper, etc. Some item areas are detected by matching the input text data with item markers supplied in the rule.

Here, indicators are "marks" for items such as (1), (2) . . . . If an indicator is detected by the matching process, the indicator is recognized as the starting point of an item area, and of the following two alternatives, (i) the next punctuation mark '.' or (ii) the point at which the next similar indicator appears, the one appearing first is recognized as the end point of the area.

The kinds of indicators included in the rules can be appropriately selected in accordance with the characteristics of the intended text data.

§2~§3. GLOBAL EXPANSION PROCESS~LOCAL EXPANSION PROCESS

Based on the results of the former process stored in language data memory 290, global expansion and local expansion processes are conducted one by one. The main flow of both processes is in comparable. However, only the result just before the present process is needed for the input of each of the processes included in the global expansion process; in contrast, the result Just before the present process and the result of the corresponding process in the global expansion process are needed for deciding the topic structure in the local expansion process.

That is, both the result of block recognition 124 and the result of decision process 131 for the topic introducing regions in the global expansion process are referred for the input of decision process 141 for the topic introducing regions in the local expansion process. Similarly, as the input of decision process 142 for the topic portions in local expansion process 140, the result of decision process 141 for the topic introducing regions and the result of decision process 132 for the topic portions in global expansion process 130 are referred. Similarly, for the input of decision process 143 for the topic level and scope in local expansion process 140, the result of decision process 142 for the topic portions and the result of decision process 133 for the topic level and scope in global expansion process 130 are referred.

In FIG. 3, global expansion processor 230 for conducting the process 130 includes three decision processors 231–233 for the topic introduction regions, topic portions, and topic level and scope, respectively. The global expansion processor 230 conducts each process according to procedures stored in global expansion process memory 207 with reference to rule 206 via global expansion rule manager 205. Local expansion processor 240 for conducting the process 140 also includes three decision processors 241–243 for the topic introduction regions, topic portions, and topic level and scope, respectively. The local expansion processor 240 also conducts each process according to procedures stored in local expansion process memory 207, with reference to rule 206 via local expansion rule manager 205. According to these three kinds of processes, the topic structures of global and local expansion are decided and the results are stored in global expansion result memory 301 and local expansion result memory 302 respectively.

The following explained processes are influenced by the differences between each type of language data found in the above-explained block recognition process; thus, the explanation is also separated by type.

§2. GLOBAL EXPANSION PROCESS (130)
§2-1. Decision of Topic Introducing Region

In global expansion in which topics are explicitly expanded by indicators and the like, one or more topic introducing regions (referred to as "topic Intro. region", hereinbelow), in each of which a topic is indicated and presented, are decided.

§2-1-1. In the Case of Dialogue Data

Figure 11:
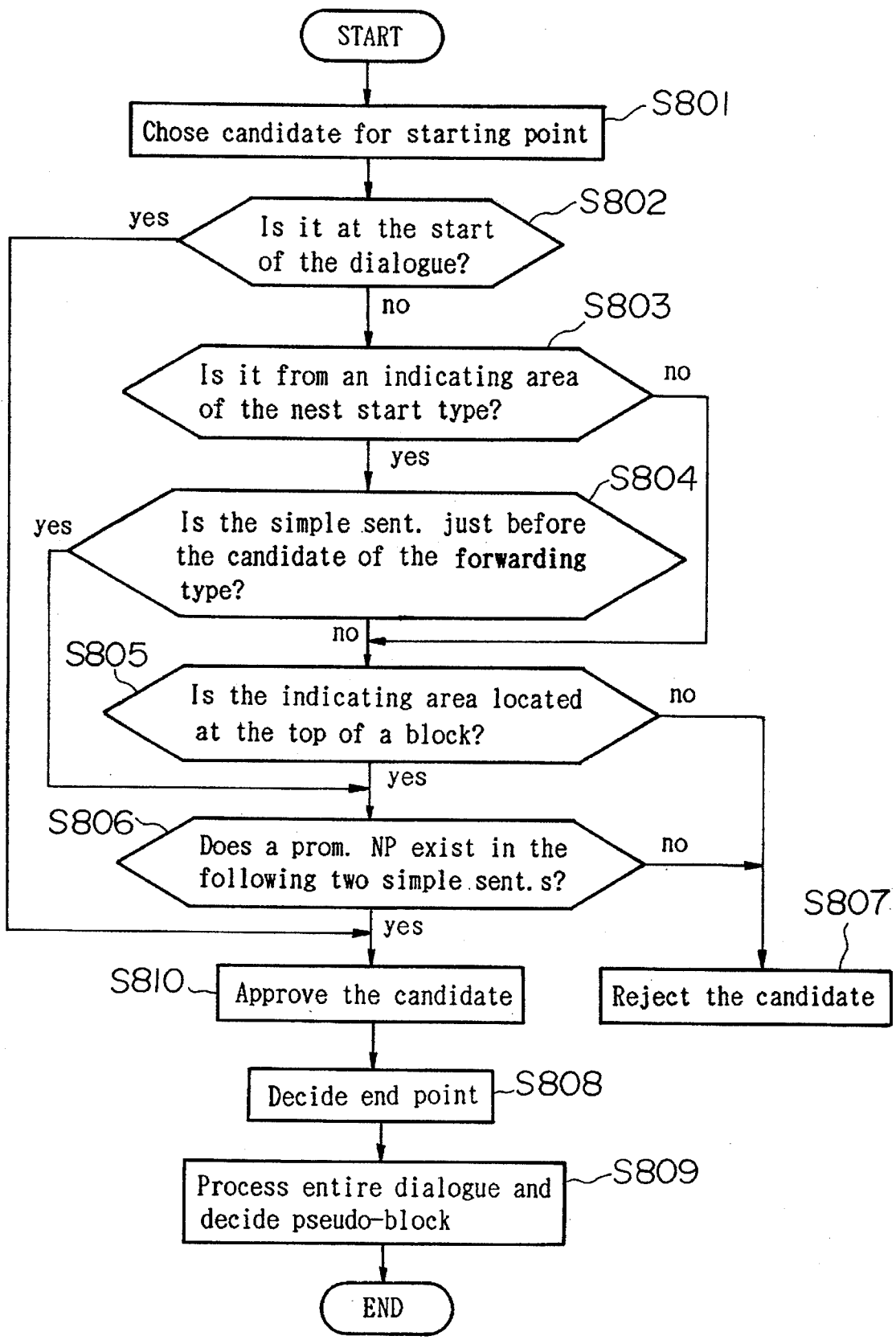
FIG. 11 a flow chart explaining the process for the decision of topic intro. regions in the global expansion process in the case of dialogue data.

FIG. 11 is a flow chart explaining the process for dialogue data.

First, the starting point of the dialogue or the top of the (noticed) indicating area is taken as a candidate for the starting point of the topic intro. region (see step S801).

Next, it is judged whether or not the present candidate corresponds to the beginning part of the dialogue. If judged "yes", the candidate is approved as the starting point, while if judged "no", the following three confirmation processes, whether or not the present candidate originates in an indicating area of the nest start type (see step S803), whether or not the simple sentence just before the candidate belongs to the "forwarding" type of Item (b) described in <Block Recognition Rule> in §1-4-1 (see step S804), and whether or not the indicating area exists at the head of the block (see step S803), are conducted.

If in step S803, the present candidate is judged to be originated in an indicating area of the nest start type, then the next step in the process is step S804. If it is judged that the simple sentence just before the candidate is not the "for-warding" type in step S804, the next step is S805. On the other hand, if judged as "no" in step S803, then the step in the process jumps to step S805.

Next, if judged that the indicating area exists at the head of the block, then it is further judged whether or not any prominent NP is presented in two simple sentences after the indicating area (see step S806). If judged "yes", the step in the process jumps to step S810 and the candidate is admitted as the starting point.

On the other hand, if judged that the indicating area does not exist at the head of the block in step S805, then the candidate is rejected (see step S807).

If the simple sentence just before the candidate is admitted as a forwarding type in step S804, the next processed step is S806 whereby it is examined whether any prominent NP is presented in the two simple sentences after the indicating area. If there is no prominent NP, then the candidate is similarly rejected (see step S807), while if any prominent NP is presented, then the process jumps to step S810 and the candidate is admitted as the starting point of the topic intro. region. In addition, the range ⌈two simple sentences⌋ in step S806 has been previously decided according to the characteristics of the language data to be analyzed, and it can be changed.

When the starting point of the topic intro. region has been determined as explained above, the next process is to determine the end point of the region as the end of the simple sentence which is located two simple sentences after the indicating area. This amount ⌈two simple sentences⌋ has also been previously decided according to the characteristics of the language data.

Then, the above explained procedure is conducted for the entire dialogue and the remaining area which was not recognized as the topic intro. region in each block is admitted as a "pseudo-block" (see step S809), and the process ends.

§2-1-2. In the Case of Monologue Data

Figure 12:
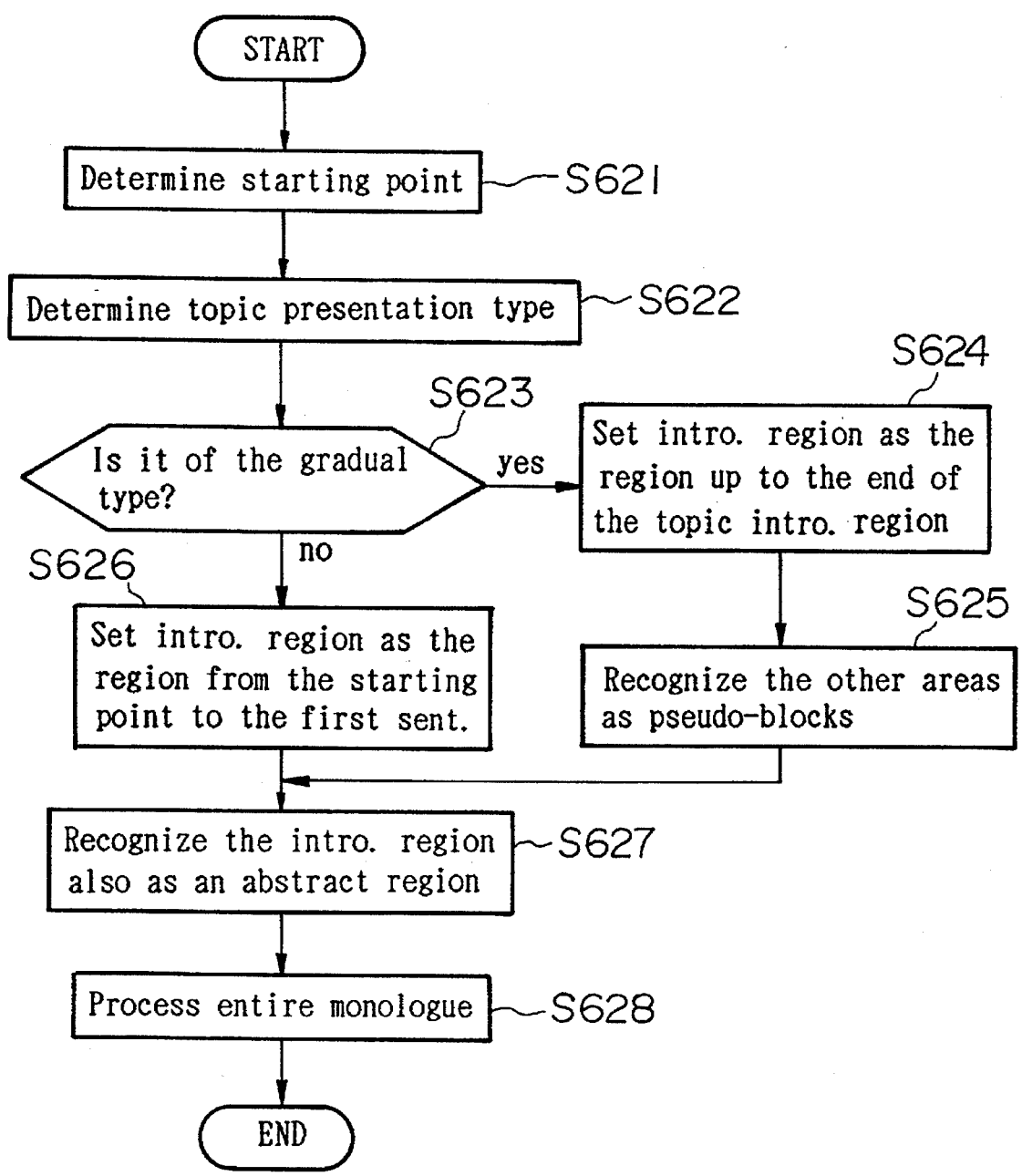
FIG. 12 is a flow chart explaining the process for the decision of topic intro. regions in the global expansion process in the case of monologue data.

FIG. 12 is a flow chart explaining the process in the case of monologue data.

First, the beginning of the monologue and the top of the block which includes an indicator are taken as candidates for the starting point of the topic intro. region (see step S621). Here, the indicator is one of those shown in FIG. 7.

Next, the determination of the type of topic presentation at the topic intro. region, which will be explained below, is conducted (see step S622).

Subsequently, the process will be branched due to whether or not the type of topic presentation is gradual. In the gradual presentation, topics are introduced little by little. If the type of topic presentation is "gradual", the end point of the topic intro. region has already been determined in the determination process for the type of topic presentation; thus, it is admitted as the end point of the topic intro. region (see step S624). Other areas besides the topic intro. region in the original block are recognized as "pseudo-blocks" (see step S625).

On the other hand, if the type of topic presentation is not gradual, that is, if the type is "lump", introducing a topic all at once, then the region from the starting point of the topic intro. region to its first sentence is admitted as the topic intro. region (see step S626).

Next, the topic intro. region which has been determined in steps S625, S626 is also recognized as an abstract region (see step S627). The chain of above-mentioned processes (steps) is conducted for the entire monologue data (see step S628), then the process ends.

Here, the decision process for the topic presentation type will be explained below with reference to the flow chart of FIG. 13.

Figures 13, 14:
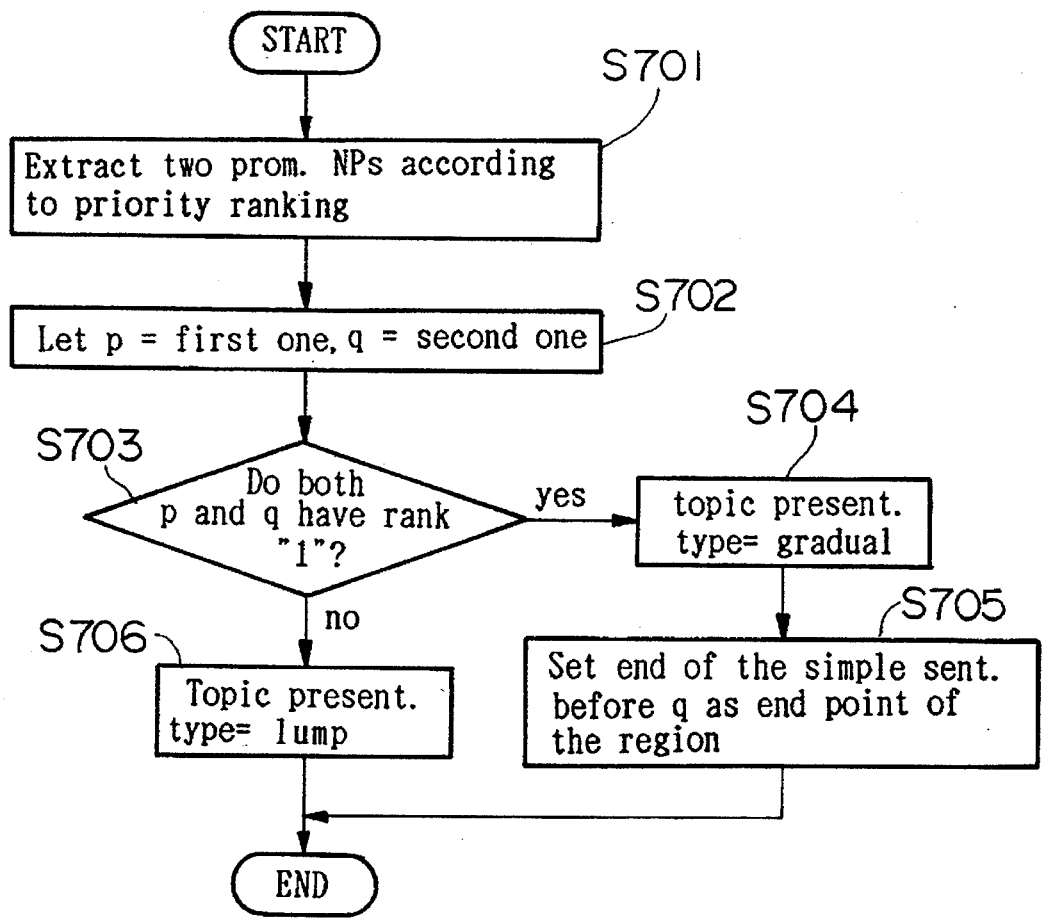
FIG. 13 is a flow chart explaining the decision process for the topic presentation type.
FIG. 14 shows an example of the priority ranking for topic candidates in the global expansion.

First, the two prominent NPs having the highest priority are extracted from the first sentence of the topic intro. region in accordance with the priority ranking for topic candidates in global expansion shown in FIG. 14 (see step S701). Then the first appearing NP is called "p", while the next appearing NP is called "q" (see step S702). FIG. 14 shows the rule by which some prominent NPs each of which may be recognized as a "topic" and their ranks related to the priority are registered. This rule has been prepared in advance.

Next, it is judged whether or not both p and q have rank "1" in the priority ranking (see step S703). If judged "yes", that is, if both of them correspond to one of the following three cases, (i) included in a title, (ii) including a proper noun, or (iii) indicated by an explicit marker, as shown in FIG. 14, then the type of topic presentation of the topic intro. region is approved as a gradual type (see step S704), and subsequently, the end of the simple sentence located before the simple sentence including "q" is admitted as the end point of the topic intro. region (see step S705).

On the other hand, if at least one of p and q has a rank lower than "1", that is, if ⌈at least one of them is indicated by an implicit marker⌋, or ⌈only one of them is listed in the priority ranking⌋, then the type of topic presentation is admitted as "lump" (see step S706). Then the process ends.

§2-1-3. In the Case of Text Data

Figure 15:
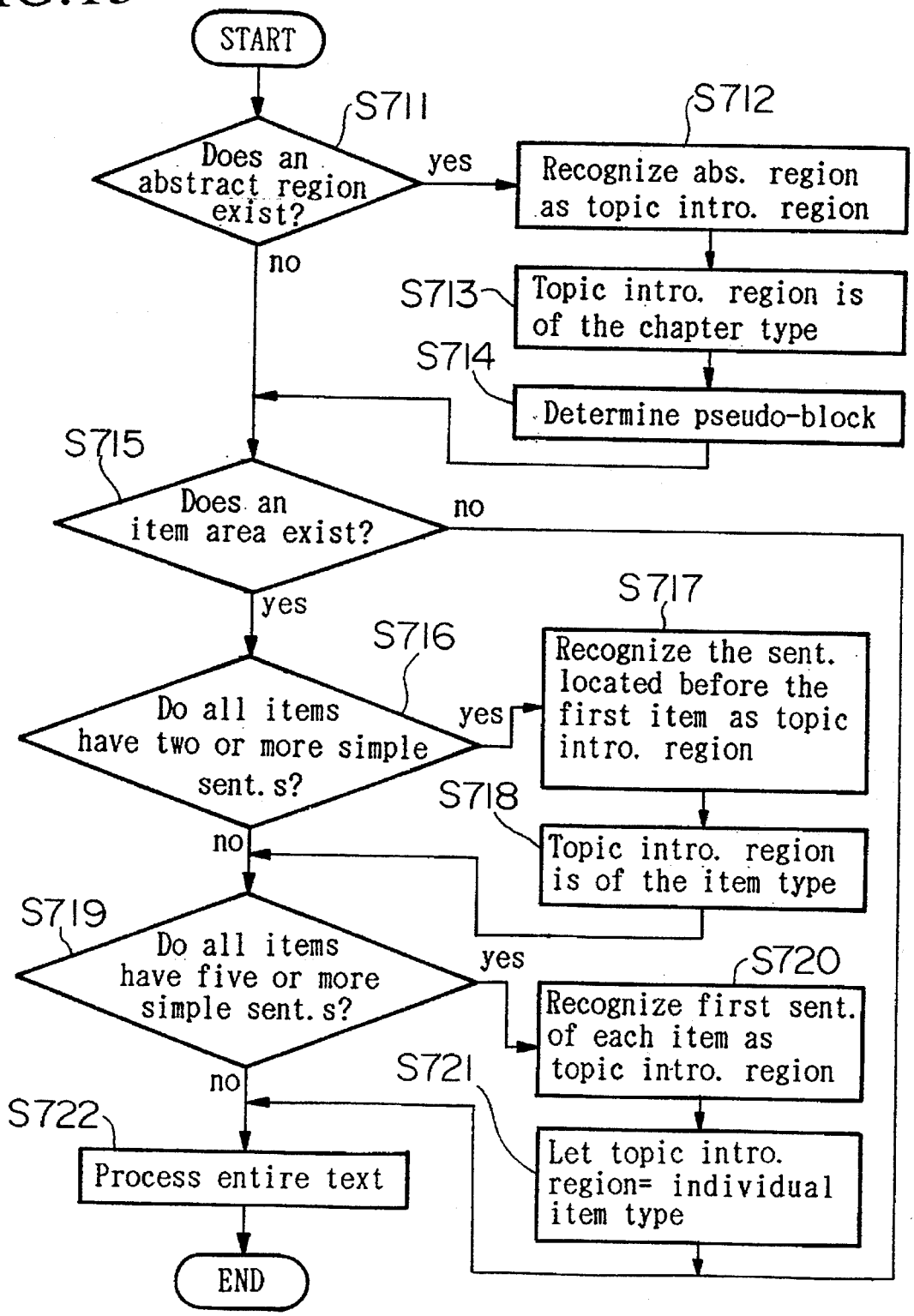
FIG. 15 is a flow chart explaining the process for the decision of topic intro. regions in the global expansion process in the case of text data.

For text data, in global expansion in which topics are explicitly expanded by a unit such as a chapter or a clause, topic intro. regions and their types are similarly determined as explained below. FIG. 15 is a flow chart explaining the process.

First, it is examined whether or not an abstract region exists in the text (see step S711). The decision process for the abstract region will be explained later. If any abstract regions exist in the text, the areas corresponding to all detected abstract regions are decided as topic intro. regions (see step S712). and their types are admitted as "chapter types" (see step S713), and the areas which have not been decided as abstract regions in the paragraph including the abstract region are recognized as "pseudo-paragraphs" (see step S714).

Next, regardless of whether or not any abstract regions exist, it is examined whether or not any item areas exist in the text data (see step S715). If there is no item area, the decision process ends here. If any item area exists, then it is examined whether or not there are two or more simple sentences for each item of the item area (see step S716). If judged "yes", the sentence just before the sentence which includes the first item is decided as a topic intro. region (see step S717), and the type of region is admitted as an "item type" (see step S718). Here, the amount ⌈two⌋ simple sentences has been decided beforehand in accordance with the type of text data.

In addition, if there is an item area, regardless of whether or not there are two or more simple sentences in each item, it is examined whether or not there are five or more simple sentences for each item of the item area (see step S719). If judged "yes", the first sentence of each item is decided as a topic intro. region (see step S720), and the type of the region is admitted as an "individual item type" (see step S721). In the next step S722, if another item area including less than five simple sentences is included in the text data, then the entire text is similarly processed and the process ends (see step S722). The amount ⌈five⌋ simple sentences can be changed according to circumstances.

Hereinbelow, the decision process for the abstract region will be explained with reference to FIG. 16.

First, it is judged whether or not a portion which is not included in any chapter exists at the head of the text for any reason, for example, ⌈a sentence begins between the title and a chapter⌋ (see step S821). If judged "yes", the first sentence of the text is admitted as an abstract region (see step S822). Next, the starting point of a chapter or clause is recognized (see step S824), then the first sentence of the chapter or clause is admitted as an abstract region (see step S824). Then, the entire text data are similarly processed and the process ends.

§2-2. Decision of Topic Portion

For the determined topic intro. regions, it is recognized what kinds of topics are presented.

§2-2-1. In the Case of Dialogue Data

Figure 17:
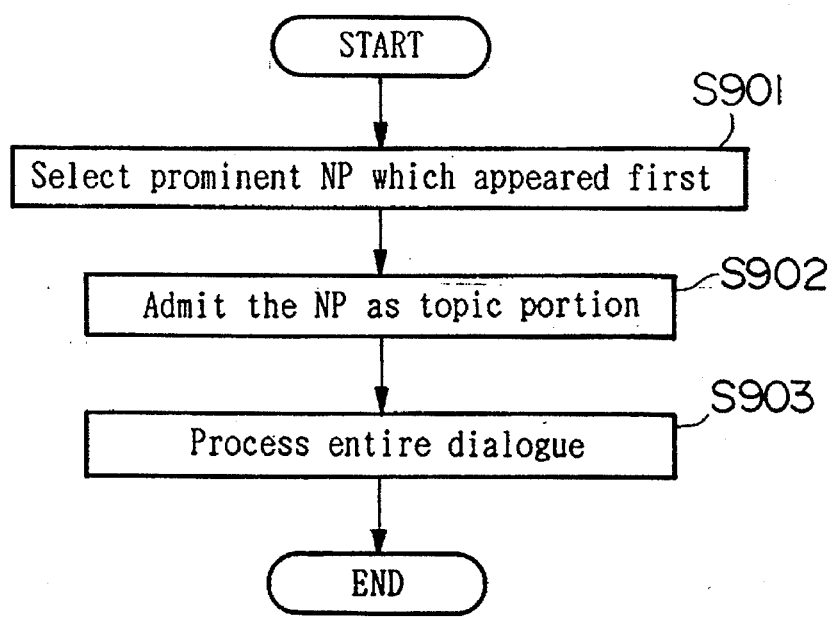
FIG. 17 is a flow chart explaining the process for the decision of topic portions in the global expansion process in the case of dialogue data.

FIG. 17 shows an example of the process flow in the case of dialogue data.

First, the prominent NP which appears first is selected in each topic intro. region (see step S901) and the NP is admitted as a topic portion (i. e., a word, a phrase, or a clause corresponding to a topic) (see step S909). Then the process ends.

§2-2-2. In the Case of Monologue Data

Figure 18:
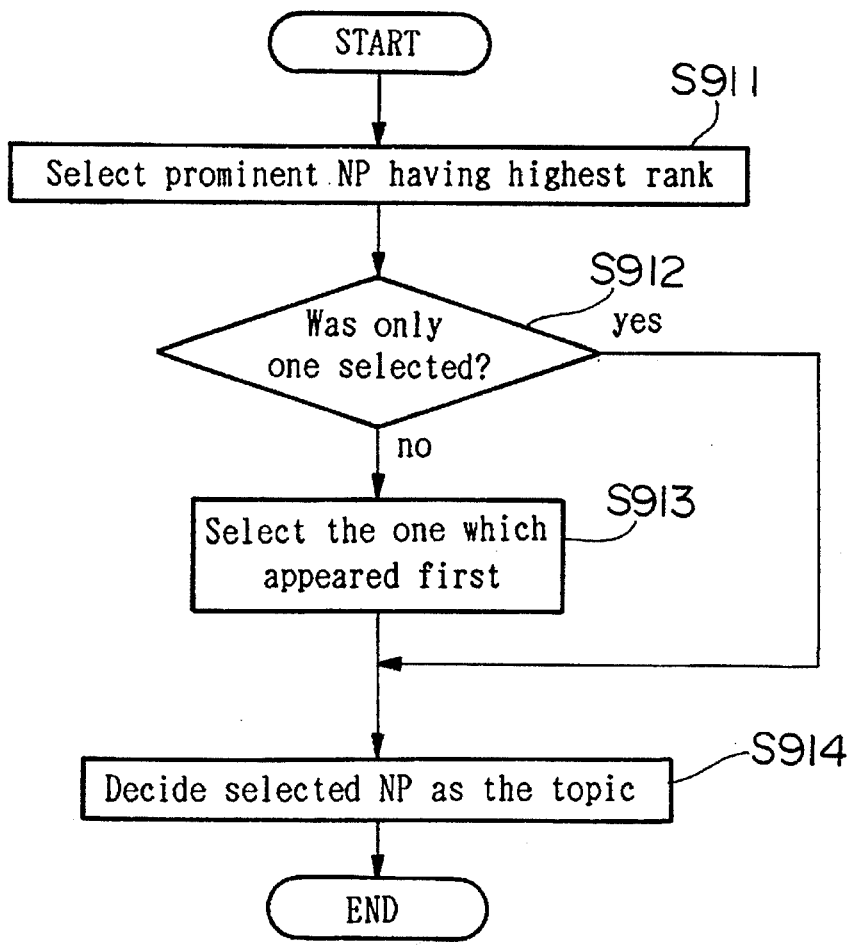
FIG. 18 is a flow chart explaining the process for the decision of topic portions in the global expansion process in the case of monologue data.

FIG. 18 shows an example of the process flow in the case of monologue data.

First, the prominent NP having the highest rank in accordance with "the priority ranking" as shown in FIG. 14 is extracted from each topic intro. region (see step S911) and it is judged whether or not only one prominent NP has been extracted (see step S912). If judged "yes", the NP is admitted as a topic portion (see step S914). In contrast, if plural prominent NPs have been extracted, the first appearing one is selected (see step S913) and this one is recognized as a topic portion.

§2-2-3. In the Case of Text Data

Figure 19:
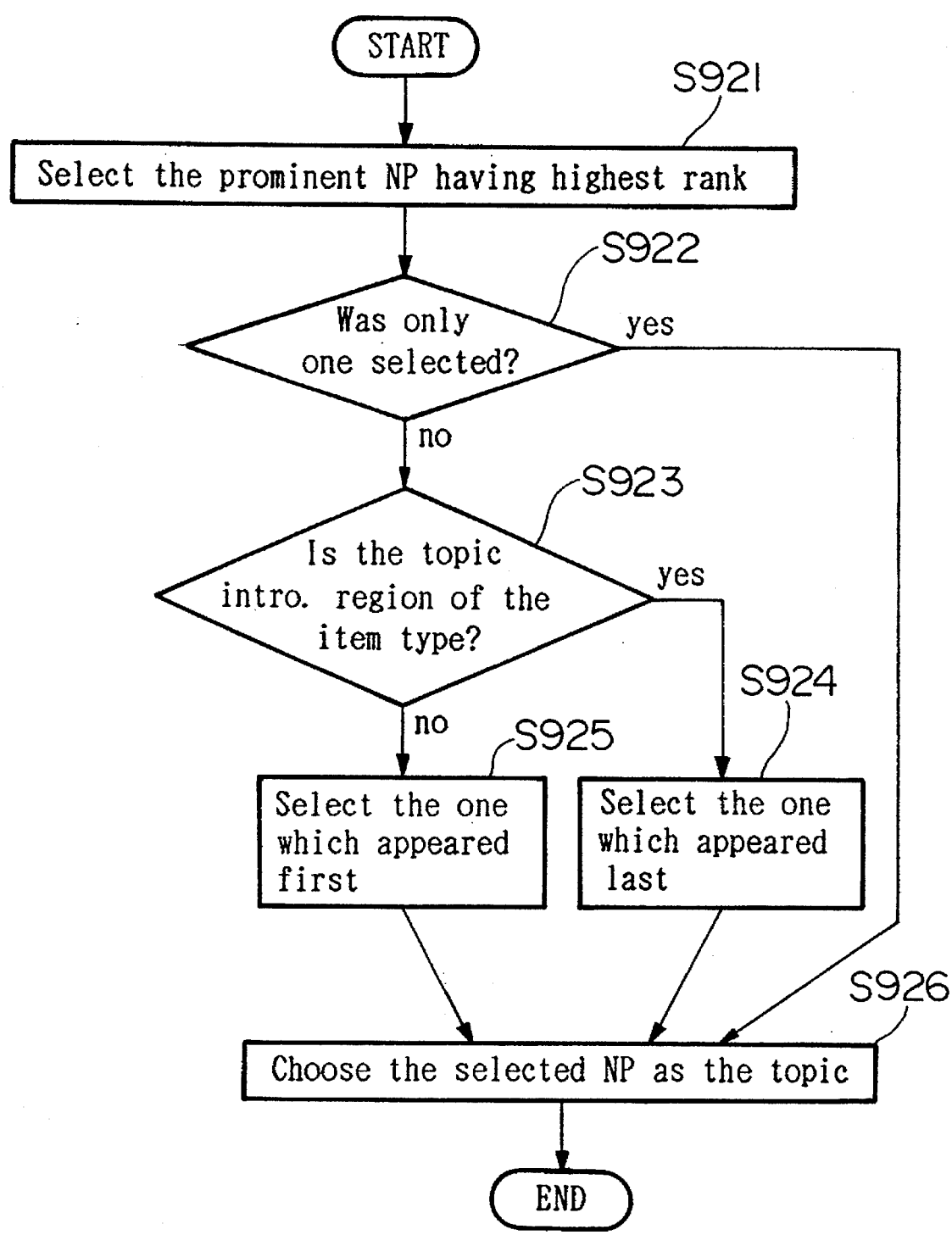
FIG. 19 is a flow chart explaining the process for the decision of topic portions in the global expansion process in the case of text data.

FIG. 19 shows an example of the process flow in the case of text data.

First, the prominent NP which has the highest rank in accordance with "the priority ranking" as shown in FIG. 20 is extracted from each topic intro. region (see step S921) and it is judged whether or not only one prominent NP has been extracted (see step S922). If judged "yes", the NP is admitted as a topic portion (see step S926). In contrast, if plural prominent NPs have been extracted, it is examined whether or not the type of the noticed topic intro. region is an item type (see step S923). If judged "yes", the last appearing one is selected (see step S924) and this one is recognized as a topic portion. If plural prominent NPs have been extracted and the topic intro. region is of a type other than the "item type", the first appearing one is selected (see step S925) and this one is recognized as a topic portion. Then the process ends.

§2-3. Decision of Topic Level and Scope

For the admitted topic (portion), the topic level and scope are decided. In the nest structure of the topics, the most outside level is admitted as "1", then the level increases by "1" for each subsequent nesting step.

§2-3-1. In the Case of Dialogue Data

The following is an example of rules for applying the level to each topic.

<Rule for Applying Levels in Global Expansion>

First, the level of the first topic in the dialogue is set equal to "1".

Second, in regard to the change of topic levels due to indicators in the topic intro. regions, the level increases or decreases in accordance with the change pattern from the last indicator to the present indicator. The rule for increase or decrease is shown in FIG. 21.

In the figure, if the present indicator is a nest start type, the level increases by "1" regardless of the type of the last indicator. On the other hand, if the present indicator is a topic change type or a nest end type, and the last one is a nest start type or a topic change type, then the level does not change. In addition, if the present indicator is a topic change type or a nest end type, and the last one is a nest end type, the level decreases by one. Furthermore, if no last indicator exists, that is, if the last topic intro. region originates at the beginning of the dialogue, then the last indicator is assumed as a nest start type and the above rule is applied.

Next, an example of rules for setting the topic scope is described.

<Rule for Setting Topic Scope in Global Expansion>

With the present topic to be processed as A and its level as m, the top of the topic Intro. region which includes A is recognized as the starting point of the topic scope, and of the following two alternatives, (i) the point immediately before a topic which has a level m or less starts or (ii) the end of dialogue, the one appearing first is recognized as the end point of the topic scope.

§2-3-2. In the Case of Monologue Data

The above-described rules for applying the level and scope for each topic in global expansion can be applied to this case if the word "dialogue" in the rules is substituted by "monologue".

§2-3-3. In the Case of Text Data

FIG. 22 shows an example of rules for applying the level for each topic in the case of text data and the following explains them in detail.

<Rule for Applying Levels in Global Expansion>

First, the level of the first topic of the text data is set equal to "1".

Second, with regard to the topic in the topic intro. region of a chapter type, the level increases or decreases in accordance with the change pattern of the chapters, etc. As shown in FIG. 22, if the change belongs to a pattern with the direction to the same level, such as "from a section to a section", the level does not change. On the other hand, if the change belongs to a pattern with a direction towards more detail, such as "from a chapter to a section", the level increases by "1". Furthermore, if the change belongs to a pattern with a direction towards more abstract, such as "from a section to a chapter", the level decreases by "1".

Third, with regard to the topic in the topic intro. region of an individual item type, the level increases or decreases in accordance with the appearing order of the items. For the topic of the first item in the item area, the level increases by "1". For the topic of each subsequent item, the level does not change.

Fourth, with regard to the topic in the topic intro. region of an item type, the level increases by one.

Figure 23:
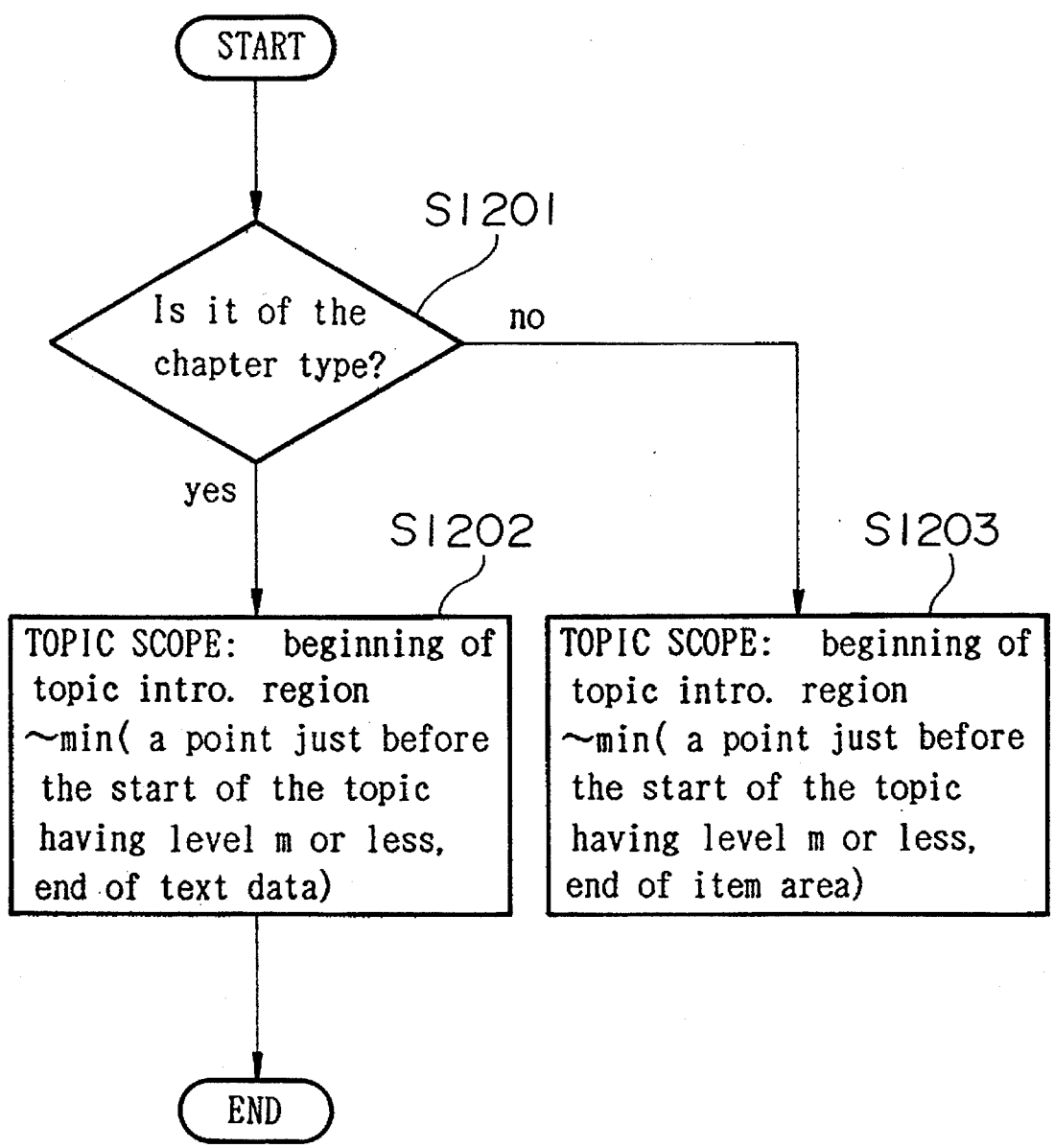
FIG. 23 shows an example of the process flow for setting the topic scope in the case of text data.

FIG. 23 shows an example of the process flow for setting the topic scope in the case of the text data.

First, with the present topic as A and its level as m, it is examined whether or not the topic originates in a topic intro. region of a chapter type (see step S1201). If judged "yes", the top of the topic intro. region which includes A is recognized as the starting point of the topic scope, and of the following two alternatives, (i) the point immediately before a topic which has a level m or less starts, or (ii) the end of text data, the one appearing first is recognized as the end point of the topic scope (see step S1201).

On the other hand, if the topic originates in a topic intro. region of another type, i. e., of an individual item type or an item type, the top of the topic intro. region which includes A is recognized as the starting point of the topic scope, and of the following two alternatives, (i) the point immediately before a topic which has a level m or less starts, or (ii) the end of the item area, the one appearing first is recognized as the end point of the topic scope (see step S1203).

§3. LOCAL EXPANSION PROCESS (140)

§3-1. Decision of Topic Introducing Region

In local expansion in which topics are expanded inside the global expansion, zero or more topic intro. regions are similarly determined.

§3-1-1. In the Case of Dialogue Data

Figure 24:
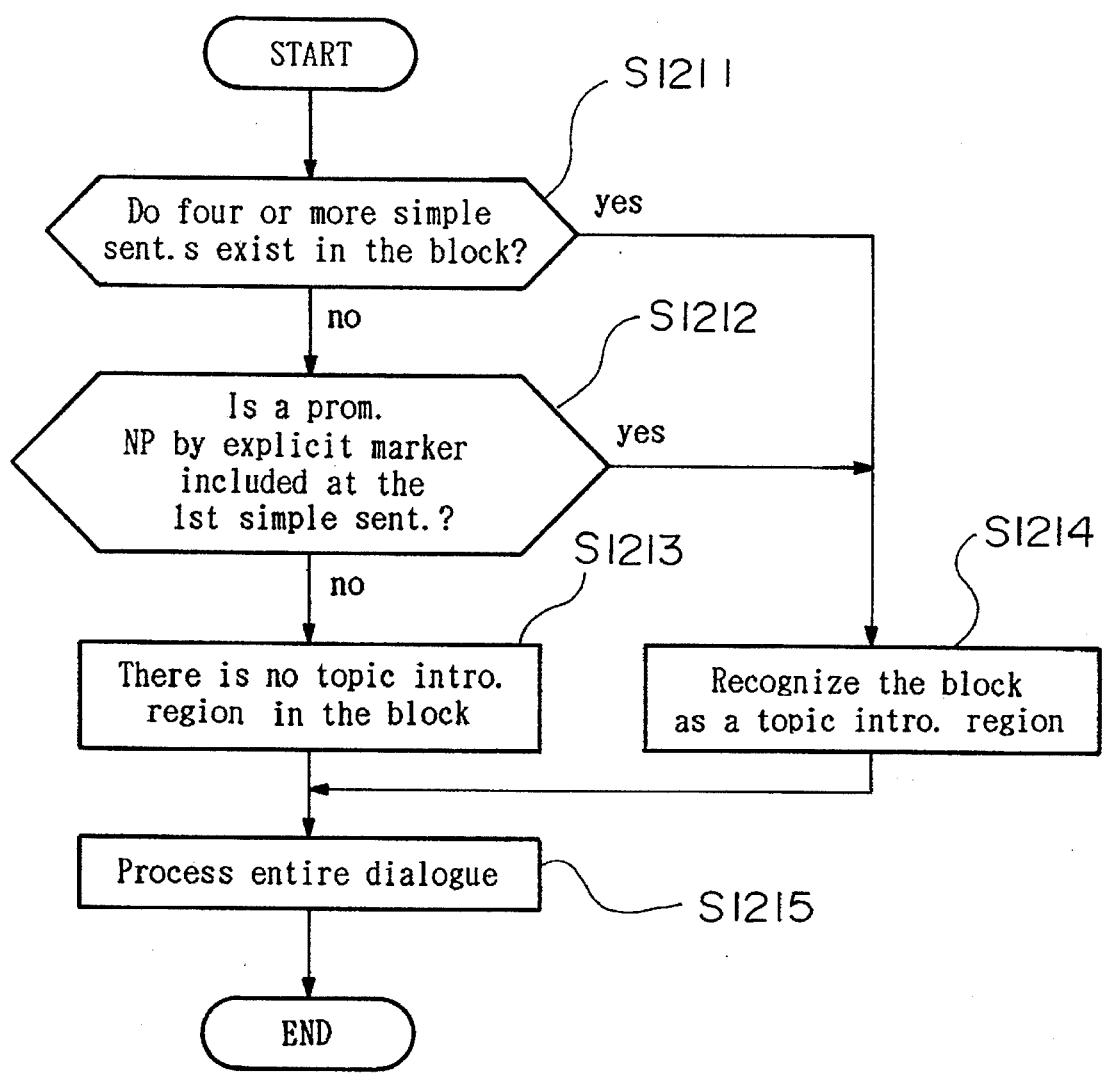
FIG. 24 is a flow chart explaining the process for the decision of topic intro. regions in the local expansion process in the case of dialogue data.

FIG. 24 is a flow chart explaining the process as related to dialogue data.

Here, the following objects, i. e., each block which does not include any topic intro. region in the global expansion and each pseudo-block in such a topic intro. region are processed. First, it is judged whether or not the number of simple sentences in the above block is four or more (see step S1211). If judged "yes", the present block is recognized as a topic intro. region. Here, the value ⌈four⌋ of simple sentences is an appropriate value set by humans in accordance with the characteristics of the dialogue data.

On the other hand, if the number of simple sentences is three or less, it is further examined whether or not any prominent NP marked by an explicit marker exists in the first simple sentence of the block (see step S1212). If judged "yes", the present block is recognized as a topic intro. region (see step S1214), while if judged "no", it is recognized that there is no topic intro. region in the block (see step S1213). Then, the process ends.

§3-1-2. In the Case of Monologue Data

Figure 25:
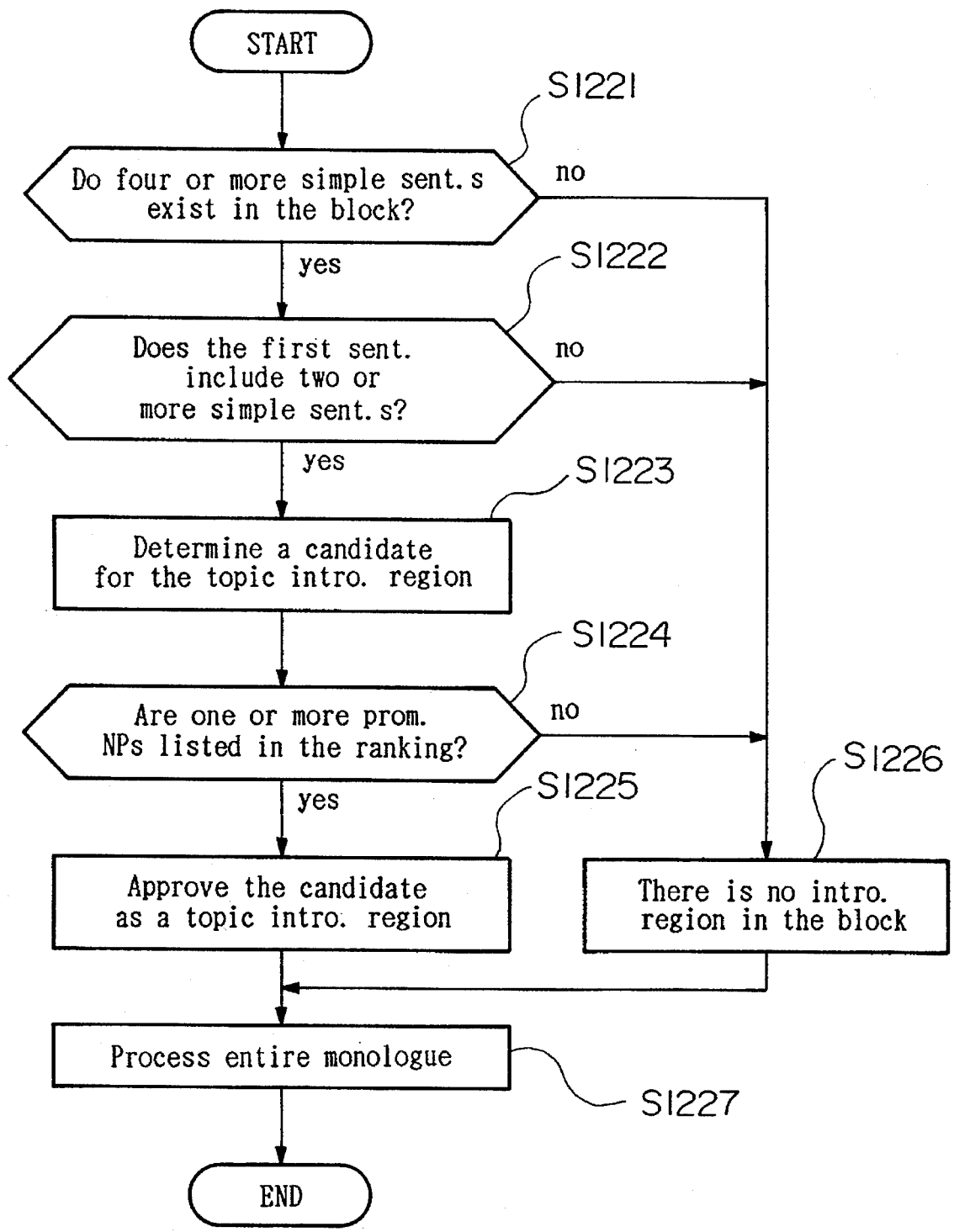
FIG. 25 is a flow chart explaining the process for the decision of topic intro. regions in the local expansion process in the case of monologue data.

FIG. 25 is a flow chart explaining the process as related to monologue data.

Here, the following objects, i. e., each block which does not include any topic intro. region in the global expansion and each pseudo-block in such a topic intro. region are processed. First, it is judged whether or not the number of simple sentences in the block is four or more (see step S1221). If judged "yes", then it is further judged whether or not the first sentence in the block includes two or more simple sentences (see step S1222). If also judged "yes", a candidate for a topic intro. region is chosen from the block (see step S1223). Here, the starting point of the candidate is set at the top of the block, and the end point of the candidate is set at the one appearing first of the following two alternatives, (i) the end of the first sentence of the block or (ii) the end of the fourth simple sentence from the end of the monologue.

If the number of simple sentences included in the block is less than four, or, the first sentence of the block includes only one simple sentence, then it is recognized that there is no topic intro. region in the block (see step S1226). Here, the amount ⌈four⌋ or ⌈two⌋ of simple sentences is decided beforehand by a human in accordance with the characteristics of the monologue.

If a candidate for a topic intro. region has been chosen, it is examined whether or not any prominent NP ranked in the priority ranking (shown in FIG. 26, as an example) exists in the candidate (see step S1224). If one or more such prominent NPs exist, the candidate is admitted as a topic intro. region (see step S1225). If no such prominent NP exists, the candidate is rejected and it is recognized that there is no topic intro. region in the block (see step S1226). Then, the above-mentioned process is conducted for the entire monologue (see step S1227), and the process ends.

§3-1-3. In the Case of Text Data

Figure 27:
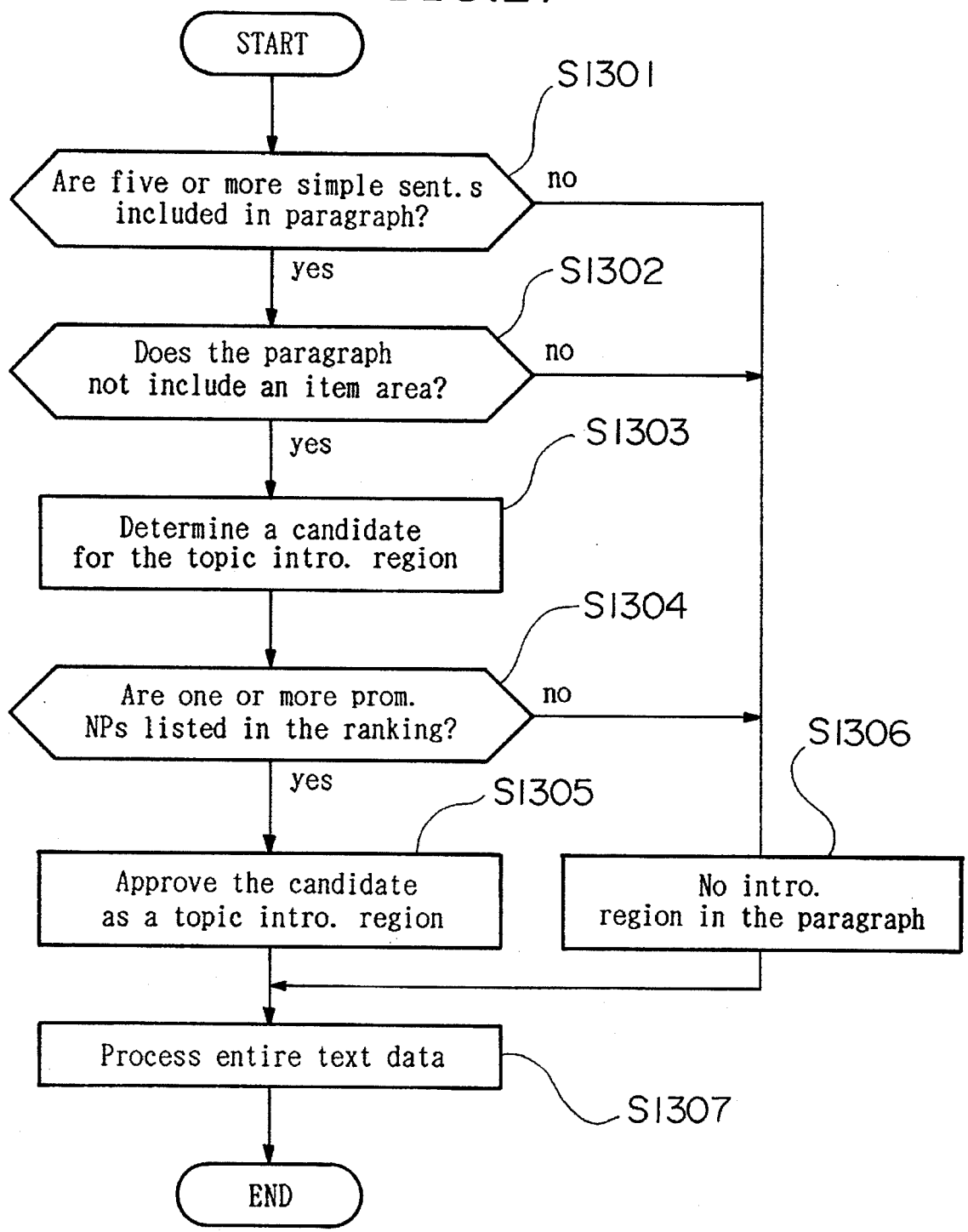
FIG. 27 is a flow chart explaining the process for the decision of topic intro. regions in the local expansion process in the ease of text data.

FIG. 27 is a flow chart explaining the process related to the text data.

First, for each paragraph or pseudo-paragraph recognized in the global expansion process, it is judged whether or not the number of simple sentences included in the paragraph is five or more and whether or not the paragraph lacks any item area (see steps S1301 and S1302). If judged "no" in each step, then it is recognized that there is no topic intro. region in the paragraph (see step S1306) and the process ends. On the other hand, if judged "yes" in each step, the following region is chosen as a candidate for a topic intro. region. That is, with the top of the paragraph (or pseudo-paragraph) as the starting point, of the following two alternatives, (i) the end of the eighth simple sentence, or (ii) the end of the second sentence from the end of the paragraph (or pseudo-paragraph), the one appearing first is chosen (see step S1303). Here, the amount ⌈eighth⌋ simple sentence and the condition such as ⌈the end of the second sentence from the end of the paragraph⌋ have been previously decided by a human in accordance with the characteristics of the text data.

Next, it is examined whether or not any prominent NPs ranked in the priority ranking (shown in FIG. 28, as an example) exist in the candidate (see step S1304). If one or more such prominent NP exist, the candidate is admitted as a topic intro. region (see step S1305). If the above-mentioned conditions are not satisfied, it is recognized that there is no topic intro. region in the paragraph (or pseudo-paragraph) (see step S1306). Then, the above-mentioned process is conducted for the entire monologue (see step S1227), and the process ends.

§3-2. Decision of Topic Portion

For the decided topic intro. regions in the local expansion, it is recognized what kinds of topics are presented.

§3-2-1. In the Case of Dialogue Data

Figure 29:
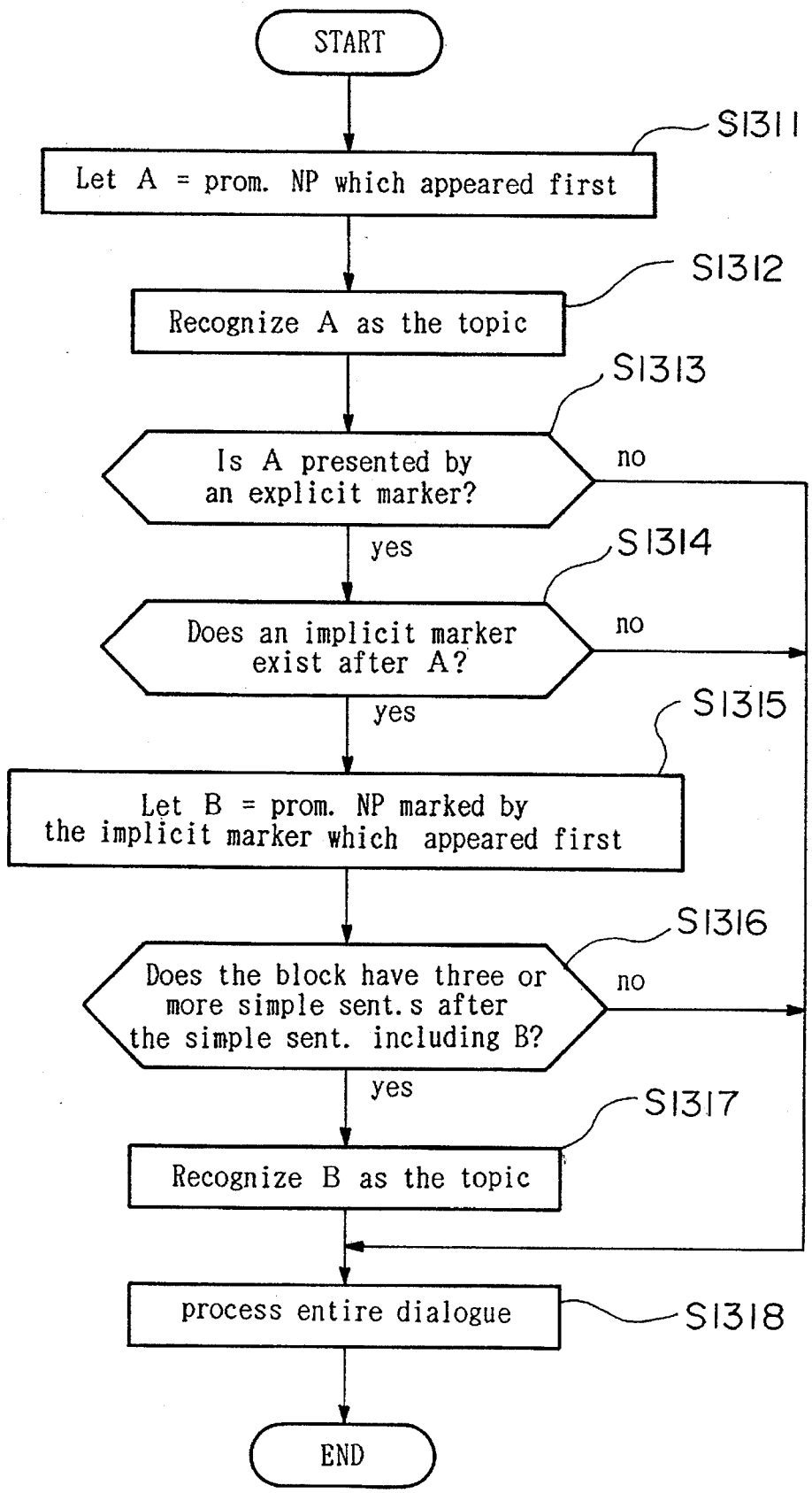
FIG. 29 is a flow chart explaining the process for the decision of topic portions in the local expansion process in the case of dialogue data.

FIG. 29 shows an example of the process flow in the case of dialogue data.

First, the prominent NP which appears first is selected (see step S1311) and the NP is admitted as a topic portion (here, assumed as "A") (see step S909).

Then it is examined whether or not the topic portion A is marked by an explicit marker (see step S1313) and whether or not any prominent NP marked by an implicit marker exists after A in the topic intro. region (see step S1314). If judged "yes" in each step, then, the first appearing NP marked by an implicit marker is admitted as "B" (see step S1315). Subsequently, it is examined whether or not the block has three or more simple sentences after the simple sentence including B (see step S1316). If judged "yes", B is recognized as a topic portion (see step S1317). Then the process ends. Here, the amount ⌈three⌋ of simple sentences has been previously chosen in accordance with the characteristics of the dialogue data.

§3-2-2. In the Case of Monologue Data

Figure 30:
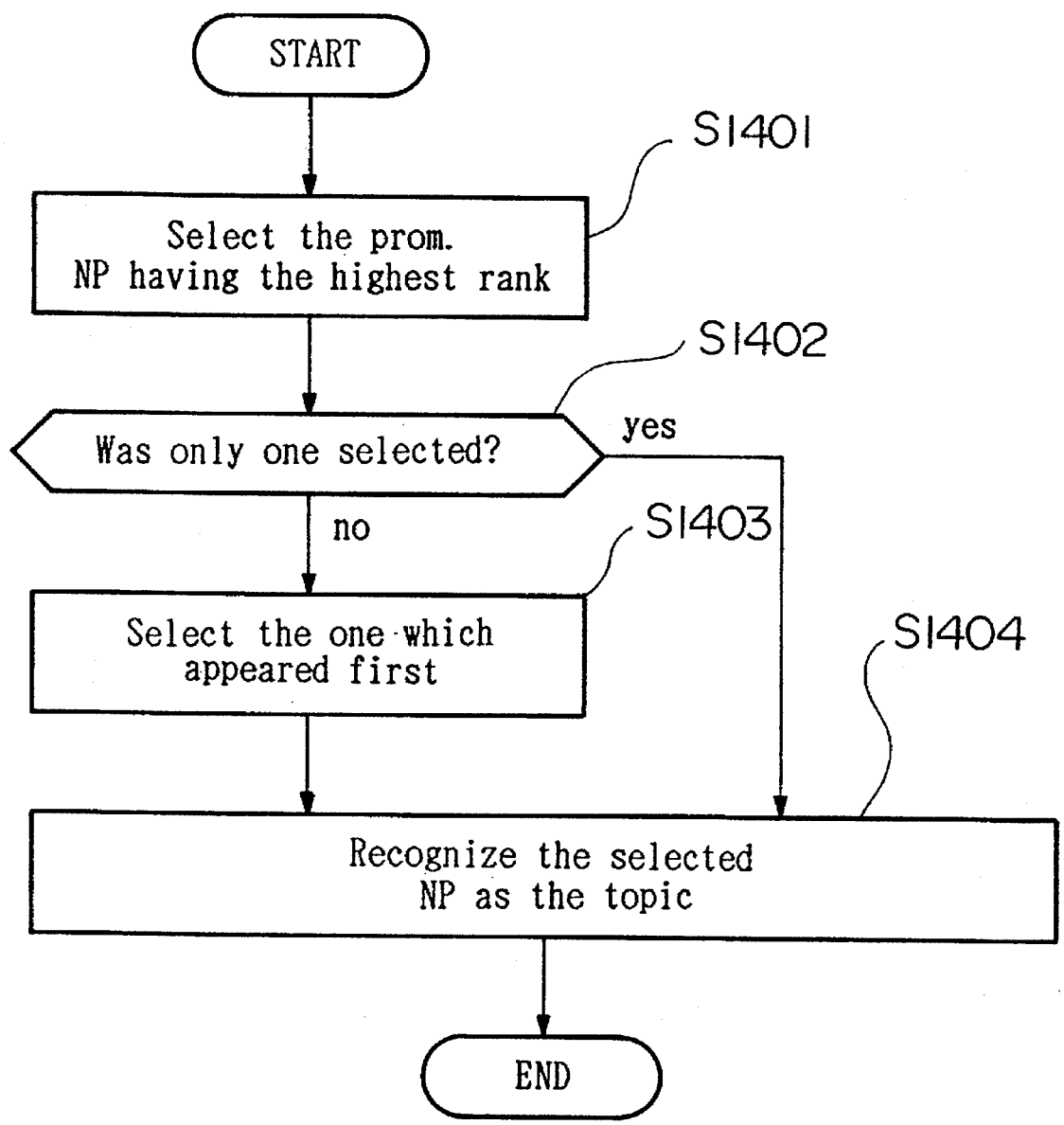
FIG. 30 is a flow chart explaining the process for the decision of topic portions in the local expansion process in the case of monologue data.

FIG. 30 shows an example of the process flow in the case of monologue data.

First, the prominent NPs having the highest rank based on the priority ranking as shown in FIG. 26 are extracted (see step S1401). Next, it is judged whether or not only one was extracted. If judged "yes", the prominent NP is recognized as a topic portion (see step S1404). On the other hand, if plural NPs were extracted, then the one appearing first is chosen (see step S1403) to be recognized as a topic (see step S1404). Then the process ends.

§3-2-3. In the Case of Text Data

Besides using the priority ranking as shown in FIG. 28, the above-mentioned process in the case of monologue data is applied in this case as well.

§3-3. Decision of Topic Level and Scope (143)

For the admitted topic (portion), the topic level and scope are decided.

§3-3-1. In the Case of Dialogue Data

Figure 31:
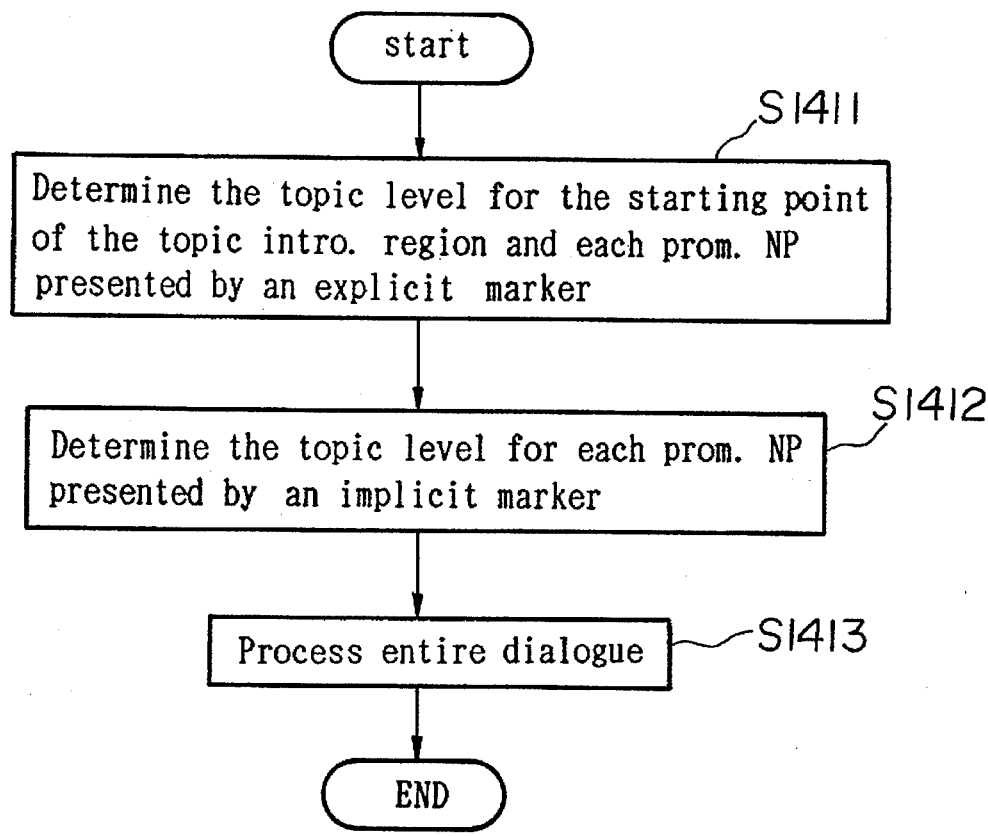
FIG. 31 is a flow chart explaining the process for the decision of topic level and scope In the local expansion process in these of dialogue data.

FIG. 31 shows an example of the process flow in the case of dialogue data.

First, with the starting point of the topic intro. region as level "0", the level of the prominent NP marked by an explicit marker in the local expansion is set equal to "1" (see step S1411). Next, the level of the prominent NP marked by an implicit marker in the local expansion is set in a manner such that, of the following two alternatives, (i) the starting point of the topic intro. region in the global expansion, or (ii) the prominent NP marked by an explicit marker, the one immediately before the prominent NP to be processed is chosen and ⌈the level of the chosen one +1⌋ is admitted as the level of the prominent NP (see step S1412). Then the entire dialogue is processed, and the process ends.

Next, an example of a rule for setting the topic scope will be shown.

<Rule for Setting Topic Scope in Local Expansion>

With the present topic as A and its level as m, the top of the topic intro. region which includes A is recognized as the starting point of the topic scope of A, and of the following three alternatives, (i) the point immediately before the next topic which has a level m or less in the local expansion starts, (ii) the point immediately before a topic intro. region in the global expansion starts, or (iii) the end of the dialogue, the one appearing first is recognized as the end point of the topic scope.

§3-3-2. In the Case of Monologue Data

Figure 32:
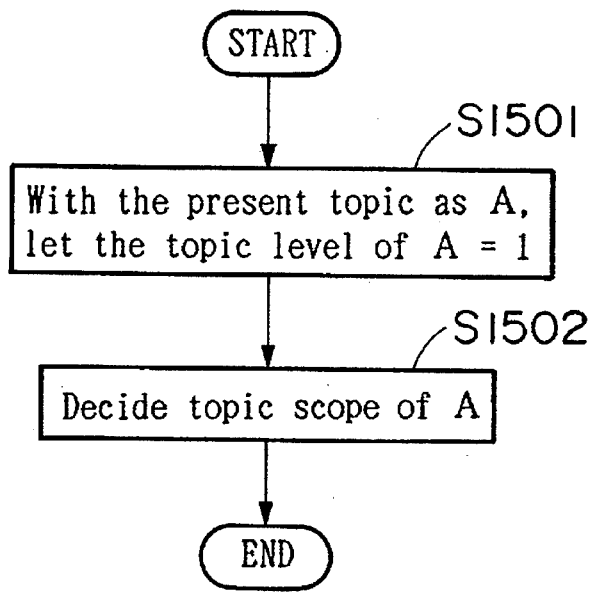
FIG. 32 is a flow chart explaining the process for the decision of topic level and scope in the local expansion process in the case of monologue data.

FIG. 32 shows an example of the process flow in the case of monologue data.

First, with the present noticed topic (portion) as A, the topic level of A is set equal to "1" (see step S1501). Next, the top of the topic intro. region to which A belongs is recognized as a starting point of the topic scope of A. In addition, of the following three alternatives, (i) the point immediately before a topic appears after A in the local expansion, (ii) the point immediately before a topic intro. region in the global expansion starts, or (iii) the end of the monologue, the one appearing first is recognized as the end point of the topic scope (see step S1502). Then the process ends.

§3-3-3. In the Case of Text Data

When the word "monologue" is substituted by "text data" in the above process for the monologue data, the process can be applied to this case.

§4. UNIFICATION PROCESS (150)

Based on the results of the former processes stored in global expansion result memory 301 and local expansion result memory 302, a final topic structure, i. e., a skimming structure, is determined. The process is conducted by unification processor 212 according to procedures stored in unification process memory 211, referring to unification rules 214 via unification process rule manager 213. The result is stored in unified structure memory 303 and is shown by display 215. This process is similar for each kind of the language data and will be explained below with reference to FIG. 33.

First, it is judged whether or not the present topics originates in the global expansion (see step S1601). If judged "yes", no level correction is conducted (see step S1603) and the topic structures are unified (see step S1604). The result of the unification process will be shown with a practical example.

On the other hand, for the topics which originate in the local expansion, the levels of the topics are corrected so as to unify the topic structures (see step S1604). The correction is conducted in a manner such that the maximum value of the related topic levels in the global expansion is added to corresponding topic levels in the local expansion. The final topic structure is obtained after the unification.

Now, some concrete examples in connection with the above-mentioned processes will be shown by using practical language data. Here, the Hepburnian system of Romaji is used for the explanation; however, it should be mentioned that normal Japanese sentences with chinese characters and hiragana are input in the practical case.

<Concrete Example 1: Dialogue Data>

FIGS. 34A and 34B show an example of Japanese dialogue and FIGS. 34C and 34D are their English translations. Here, words in "()" in FIGS. 34C and 34D are not explicitly written in the Japanese version but are implied. FIGS. 35A and 35B show the result of the simple sentence division process applied to the dialogue. In FIGS. 35A and 35B, each mark "/" shows the dividing point between two simple sentences.

Next, from each divided simple sentence, the prominent NP or NPs are extracted by means of the markers shown in FIG. 5A. The result of this process is shown in FIGS. 36A and 36B. Here, the extracted prominent NPs are indicated by underlines and utterance No. is added for the explanation.

For example, from the simple sentence of utterance No. 1, the prominent NP, "Kaisha A no tsuushin saabisu <company A's communication services>" marked by an explicit marker "wa" is extracted. In contrast, in the simple sentences of utterance No. 2 and No. 3, there is no explicit or implicit marker; thus, no prominent NP is extracted from the simple sentences. In addition, in the first simple sentence of utterance No. 19, there are two implicit markers "ga" and "o"; however, the word marked by "ga" belongs to a deictic expression such as "hito <people>", therefore the prominent NP, "bangoo-annai <directory assistance>", marked by "o" is extracted from the simple sentence.

Next, the block recognition is conducted. According to item (c-1) of <Block Recognition Rule> shown in §1-4-1, the area from utterance No. 1 to No. 3 belongs to the same block. Here, this block is supposed as block 1a. Moreover, the simple sentence of utterance No. 4 also belongs to block 1a in accordance with item (b) of the <Block Recognition Rule> because "ka" in utterance No. 3 indicates a question. Similarly, the first simple sentences of utterance No. 5 and 6 also belong to block 1a in accordance with item (c-1) of the rule, and the second simple sentence of utterance No. 5 also belongs to block 1a in accordance with item (b) of the rule because "ne" in utterance No. 4 indicates a confirmation. On the other hand, according to item (e) of the rule, the second simple sentence of utterance No. 6 does not belong to block 1a; thus, a new block begins. Based on a similar process, blocks 1b~1f are recognized as shown in FIGS. 37A and 37B.

Next, indicators in the global expansion are detected. In the dialogue, two types of indicators can be found, i. e., "mazu <first (for the purpose of retaining conversational flow, translated as "well" in FIG. 34C)>" of a nest start type in the simple sentence of utterance No. 4, "tsugi ni <for the purpose of retaining conversational flow, translated as "also" or "yes, and" in FIG. 34D)>" of a topic change type in the simple sentences of utterance No. 10 and 20. Regarding "mazu" of utterance No. 4, it has a different type than the next indicator "tsugi ni"; thus, the indicating area is set equal to the simple sentence of utterance No. 1. Regarding "Tsugi ni" of utterance No. 10, it has the same type as the next indicator "tsugi ni"; however, there are some prominent NPs and four or more simple sentences between the two indicators. Therefore, the indicating area is set equal to only the simple sentence of utterance No. 10. Then, regarding "Tsugi ni" of utterance No. 20, there is no indicator after this; thus, the indicating area is set equal to the simple sentence of utterance No. 20.

Next, in accordance with the flow chart shown in FIG. 11, the simple sentence of utterance No. 1 which is the beginning of the dialogue, the simple sentences of utterance No. 4, 10, and 20 each of which is at the beginning of each indicating area, are chosen as candidates for the beginnings of topic intro. regions. Among those four candidates, the simple sentence of utterance No. 1 is admitted as the starting part of an topic intro. region without any other condition and the end point of the intro. region is set equal to the end of the simple sentence of utterance No. 3.

On the other hand, the simple sentence of utterance No. 4 satisfies the condition that any prominent NP exists in two simple sentences after the indicating area of a nest start type; thus, this candidate is also admitted as the starting part of the topic intro. region and the end of it is set as the second simple sentence of utterance No. 5.

Next, the simple sentence of utterance No. 10 originates in an indicating area of a topic change type, the indicating area exists at the top of the block, and a prominent NP exists in the two simple sentences after the indicating area; thus, this candidate is also admitted as the starting part of a topic intro. region and the end of it is set as the second simple sentence of utterance No. 12.

Lastly, the simple sentence of utterance No. 20 originates in an indicating area of a topic change type; however, the area is not located at the top of the block. Therefore, this candidate is rejected.

Next, regarding block 1a, the simple sentence of utterance No. 6 which is not included in any topic intro. region is recognized as a pseudo-block, and regarding block 1c, the simple sentences of utterance No. 13 and 14 are similarly recognized as pseudo-blocks.

FIGS. 38A and 38B show the result determined in the decision process for the topic intro. region in the global expansion. As shown in the figures, three topic intro. regions, G11, G12, and G13 have been admitted.

Next, for each admitted region, the first appearing prominent NP is admitted as a topic portion. For the region beginning from utterance No. 1, the prominent NP, "kaisha A no tsuushin saabisu <company A's communication services>", is admitted as a topic portion. Similarly, the prominent NPs, "samazama na shinki saabisu <a lot of new services>", in the region beginning from utterance No. 4 and "juurai kara no saabisu <old services>", in the region beginning from utterance No. 10, are also admitted as topic portions, respectively.

Then, according to <Rule for Applying Levels in Global Expansion> shown in §2-3-1, the level of the first topic of the dialogue, i. e., "kaisha A no tsuushin saabisu" is set equal to "1". In the block in which the next topic "samazama na shinki saabisu" is presented, an indicator, "mazu", of a nest start type exists; thus, the level of this topic is set equal to "2", which is obtained by adding "1" to the above set level "1" according to the rules shown In FIG. 21. In the block in which the next (third) topic, "juurai kara no saabisu" is presented, an indicator, "tsugi ni", of a topic change type exists and the last indicator was "mazu" of a nest start type; thus the level of this topic is set equal to "2", similar to the last one, according to the rules.

Figure 39:
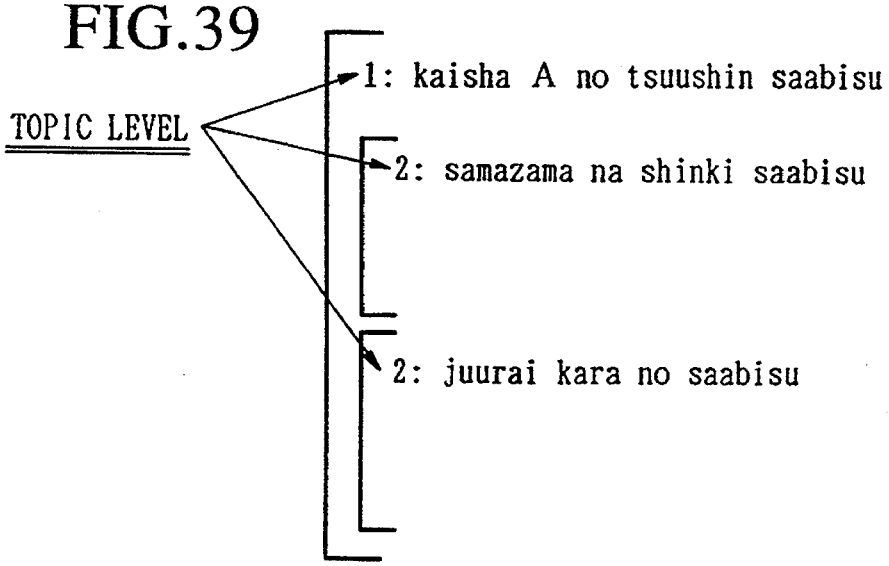
FIG. 39 shows the topic structure of the Japanese dialogue data in the global expansion.

Next, the scope of each topic is determined in accordance with <Rule for Setting Topic Scope in Global Expansion> shown in §2-3-1. The topic scope of "kaisha A no tsuushin saabisu" is determined as being from the beginning of the dialogue to its end, the topic scope of "samazama na shinki saabisu" is determined as being from the simple sentence of utterance No. 4 to utterance No. 9, and the topic scope of "juurai kara no saabisu" is determined as being from the simple sentence of utterance No. 10 to the end of the dialogue. The result of these determinations is shown in FIG. 39 as a simplified model.

Next, according to the flow chart shown in FIG. 24, some topic intro. regions in the local expansion are determined. Here, the objects of this process are the pseudo-blocks included in blocks 1a and 1c, and the whole blocks 1b, 1d, 1e, and 1f.

Regarding the pseudo-blocks in blocks 1a and 1c, and blocks 1d and 1f, each block has three or less simple sentences from the first prominent NP and there is no prominent Np marked by an explicit marker in the block; thus, it is recognized that these blocks have no topic intro. region.

Regarding block 1b, the block has four or more simple sentences from the second simple sentence of utterance No. 6; thus, block 1b is admitted as a topic intro. region. Regarding block 1e, a prominent NP, "bangoo-annai no yuuyooka <the introduction of the toll on directory assistance>", marked by an explicit marker "wa" exists in the block; thus, this is also admitted as a topic intro. region.

Therefore, two topic intro. regions, L11 and L12, have been recognized as shown in FIGS. 40A and 40B.

Next, according to the flow chart shown in FIG. 29, the topic portions of these regions are determined.

First, the first appearing prominent NP in block 1b is "saabisu A <service A>" in the second simple sentence of utterance No. 6; thus, this is admitted as a topic portion. In addition, "saabisu A" is indicated by an implicit marker; therefore, there is no other topic portion in the topic intro. region.

Next, the first appearing prominent NP in block 1e is "bangoo-annai no yuuyooka <the introduction of the toll on directory assistance>" in the simple sentence of utterance No. 17; thus, this is admitted as a topic portion. In addition, this topic portion is indicated by an explicit marker, "wa"; however, there is no implicit marker after it in this block. Therefore, there is no other topic portion in the topic intro. region, either.

Next, "saabisu A" of utterance No. 6 is marked by an explicit marker; however, the topic level of the topic intro. region in the global expansion immediately before "saabisu A" is "0", thus, the level of "saabisu A" is set equal to "1" according to the rule shown in FIG. 31. On the other hand, "bangoo-annai no yuuyooka" of utterance No. 17 is marked by an explicit marker; thus, its level is set equal to "1"

Figure 41:
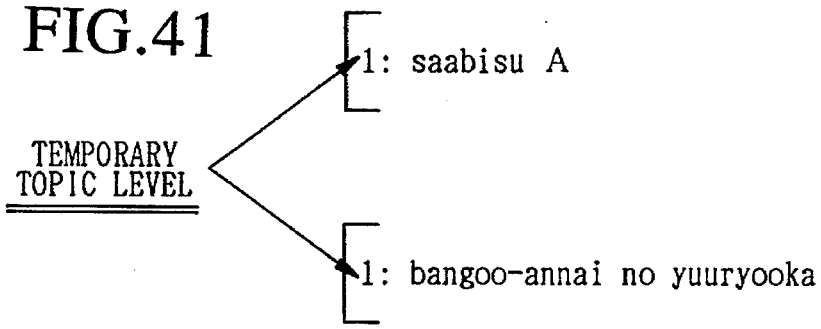
FIG. 41 shows the topic structure of the Japanese dialogue data in the local expansion.

Next, the topic level of each topic is determined in accordance with <Rule for Setting Topic Scope in Local Expansion> shown in §3-3-1. Here, the topic scope of "saabisu A" is determined as being from the second simple sentence of utterance No. 6 to the end of utterance No. 9, and the topic scope of "bangoo-annai no yuuyooka" is determined as being from utterance No. 17 to the end of the dialogue. The result of these determinations is shown in FIG. 41, in a form of a simplified model.

Figure 33:
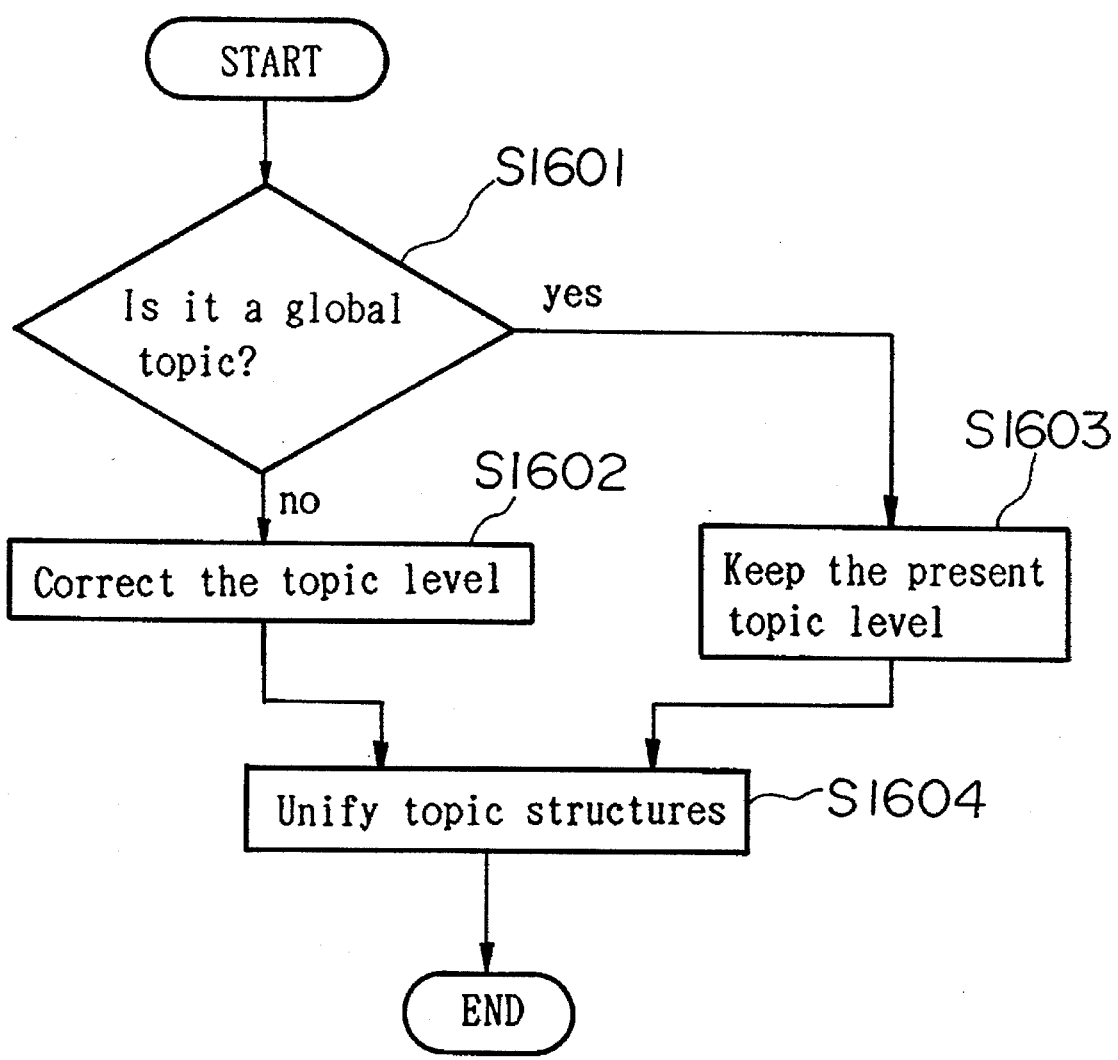
FIG. 33 is a flow chart explaining the unification process.
Figure 42:
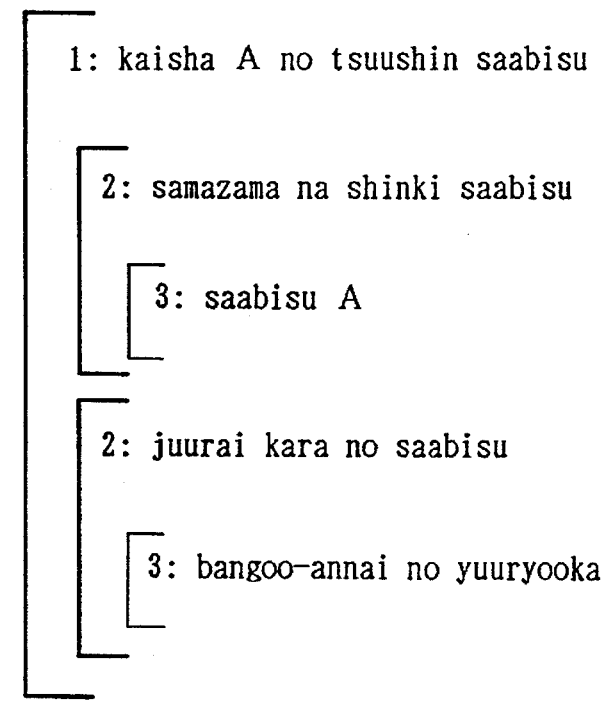
FIG. 42 shows the unified topic structure of the Japanese dialogue data.

Next, according to the flow chart shown in FIG. 33, the topic levels in the local expansion are corrected so as to unify the topics. The obtained topic (or skimming) structure is shown in FIG. 42.

<Concrete Example 2: Monologue Data>

FIGS. 43A and 43B show an example of Japanese monologue data and FIGS. 43C and 43D are their English translations. Here, words in "()" in FIGS. 43C and 43D are not explicitly written in the Japanese version but are implied; words in "[]" appear in the Japanese version but may be omitted from the English in order to improve the fluency of language. FIGS. 44A and 44B show the result of the simple sentence division process applied to the monologue.

Next, from each divided simple sentence, prominent NPs are extracted by means of the markers shown in FIG. 5B. The result of this process is shown in FIGS. 45A and 45B. Here, the extracted prominent NPs are indicated by underlines and the simple sentence No. is added for clarification, such as (1-1), (1-2) . . . .

For example, from the simple sentence (1-1), the prominent NP, "Kaisha A no tsuushin saabisu <company A's communication services>" marked by a explicit marker "wa" is extracted. In contrast, in the simple sentence (1-2), there is an implicit marker "o"; however, the word marked by this marker is a deictic expression "sorera <them>". Therefore, no prominent NP is extracted from the simple sentence. In addition, in the simple sentence (3-1), there are "saabisu A <service A>" marked by explicit marker "wa" and "kyoogoo-tasha <our competitors>" marked by implicit marker "ni". Among of these, explicit marker "wa" has higher rank than implicit marker "ni"; thus, "saabisu A" is extracted as a prominent NP.

Next, the result of the block recognition for the monologue is shown in FIGS. 46A and 46B. Here, the sentence No. such as (1), (2) . . . is added for the explanation. According to item (a) of <Block Recognition Rule> shown in §1-4-2, the simple sentences of each sentence from (1) to (7) belong to the same block. Moreover, according to item (b) of the rule, the sentences (5) and (6) belong to the same block by reason of a topic continuing expression "kore wa <this is (omitted from the English in FIG. 43D)>".

Next, topic intro. regions in the global expansion are determined.

First, according to the process shown in FIG. 12, the top of each block 2a, 2b, and 2e is recognized as the starting point of a topic intro. region in step S621.

Next, for each topic intro. region, the decision process for the type of topic presentation is conducted. Regarding the process in which the two highest-ranking prominent NPs are extracted from the first sentence from the starting point of each topic intro. region, only one prominent NP "kaisha A no tsuushin saabisu" is extracted from block 2a; thus, this intro. region is of a lump type. Next, from the region which begins from block 2b, "samazama na shinki saabisu <various new services>" and "saabisu A ya saabisu B, saabisu C nado <service A, service B, and service C>" are detected. Here, "samazama na shinki saabisu" has the rank "2" in priority; thus, this region is also of a lump type. In addition, from the region which begins from block 2e, only "juurai kara no saabisu <the old services>" is extracted; thus, this region is also of a lump type.

As shown above, every topic intro. region in the monologue data is of a lump type; thus, according to the process shown in FIG. 12, the first sentence from the starting point of the topic intro. region is admitted as a topic intro. region. As a result, topic intro. regions G21, G22, and G23 have been recognized as shown in FIGS. 47A and 47B. In addition, the recognized topic intro. regions are also recognized as abstract regions.

Next, the decision process for the topic portion in the global expansion is conducted. In the three recognized regions, first, "kaisha A no tsuushin saabisu <company A's communication services>" in block 2a satisfies a condition in the priority ranking "1" shown in FIG. 14; thus, it is admitted as a candidate for a topic portion in accordance with the flow chart shown in FIG. 18. No other candidate is chosen from the topic intro. region included in block 2a; thus, "kaisha A no tsuushin saabisu" is admitted as a topic portion in the topic intro. region. Similarly, as a topic portion of the topic intro. region included in block 2b, "samazama na shinki saabisu <various new services>" is extracted, and as a topic potion of the topic intro. region included in block 2e, "juurai kara no saabisu <the old services>" is extracted.

Then, according to the similar rule shown in the case of dialogue, the level and scope of each topic is determined. Here, the level of the first topic, "kaisha A no tsuushin saabisu", is set equal to "1". In the block in which the next topic "samazama na shinki saabisu" is presented, an indicator, "mazu <first>", of a nest start type exists; thus, the level of this topic is set equal to "2", which is obtained by adding "1" to the last level. In the block in which the next (third) topic, "juurai kara no saabisu <the old services>" is presented, the indicator, "tsugi ni <next>", of a topic change type exists and the last indicator was "mazu" of a nest start type; thus, the level of this topic is set equal to "2", the same as the last topic.

Next, the scope of each topic is also determined in accordance with the similar rule shown in the case of dialogue. The topic scope of "kaisha A no tsuushin saabisu" is determined as being from the beginning of the monologue to its end, the topic scope of "samazama na shinki saabisu" is determined as the region from block 2b to 2d, and the topic scope of "juurai kara no saabisu" is determined as the region of both blocks 2e and 2f. The result of these determinations is the same as in the case of dialogue, as shown in FIG. 39.

Next, according to the flow chart shown in FIG. 25, some topic intro. regions in the local expansion are determined. Here, the object blocks are blocks 2c, 2d, and 2f.

Regarding block 2d, this block does not satisfy the condition that ⌈the number of simple sentences in the block is four or more⌋; thus, it is recognized that there is no topic intro. region in the block.

Regarding blocks 2c and 2f, both blocks satisfy the above condition, that is, ⌈the number of simple sentences in the block is four or more⌋ and another condition that ⌈the first sentence in the block has two or more simple sentences⌋. Therefore, from each block, a candidate for a topic intro. region is extracted in a manner such that the starting point is set as the top of the block, and the end point is set as the first appearing of the following two alternatives, (i) the end of the first sentence of the block or (ii) the end of the fourth simple sentence from the end of the monologue. In each candidate, one or more prominent NPs listed in the priority ranking shown in FIG. 26 are included; thus, each candidate is admitted as a topic intro. region. Accordingly, in the local expansion, two topic intro. regions, L21 and L22, have been determined as shown in FIGS. 48A and 48B.

Next, "saabisu A <service A>" has the rank "2" in the priority ranking shown in FIG. 26 because it includes a proper noun; thus, according to the process shown in FIG. 30, it is chosen as a candidate for a topic portion.

Here, with the assumption that no prominent NP with in the expression of a question which has higher rank than "saabisu A" exists in the region, if any other prominent NP of the rank "2" is detected, the first appearing "saabisu A" is chosen. Therefore, "saabisu A" is admitted as a topic portion. Similarly, "bangoo-annai no yuuyooka <the introduction of a toll on directory assistance>" in the block 2f is admitted as a topic portion.

Next, according to the process shown in FIG. 32, the topic level of every topic is assumed as "1". In addition, the topic scope of each topic is determined according to the similar rule in the case of dialogue. Here, the topic scope of "saabisu A" is determined as the area of blocks 2c and 2d, and the topic scope of "bangoo-annai no yuuyooka" is determined as block 2f. The result of these determination is the same as the result in the case of dialogue, as shown in FIG. 41.

Lastly, similar to the case of dialogue, the topic levels in the local expansion are corrected so as to unify the topics. The obtained topic structure is also the same as the result shown in FIG. 42.

<Concrete Example 3: Text Data>

FIGS. 49A and 49B show an example of Japanese text data and FIGS. 49C and 49D are their English translations. The caution for the English translation is the same as those in the other cases. FIGS. 50A and 50B show the result of the simple sentence division process applied to the text data. Next, from each divided simple sentence, prominent NPs are extracted by means of the markers shown in FIG. 5C. The result of this process is shown in FIGS. 51A and 51B.

For example, from the simple sentence (1-1), the prominent NP, "Kaisha A no tsuushin saabisu <company A's communication services>" marked by an explicit marker "wa" is extracted. In contrast, in the simple sentence (1-2), there is an implicit marker "o"; however, the word marked by this marker is a deictic expression "sorera <they>". Therefore, no prominent NP is extracted from the simple sentences. In addition, in the simple sentence (3-1), there are "saabisu A <service A>" marked by explicit marker "wa" and "kyoogoo-tasha <our competitors>" marked by implicit marker "ni". Among these, explicit marker "wa" has a higher rank than implicit marker "ni"; thus, "saabisu A <service A>" is chosen as a prominent NP.

Figure 52A:
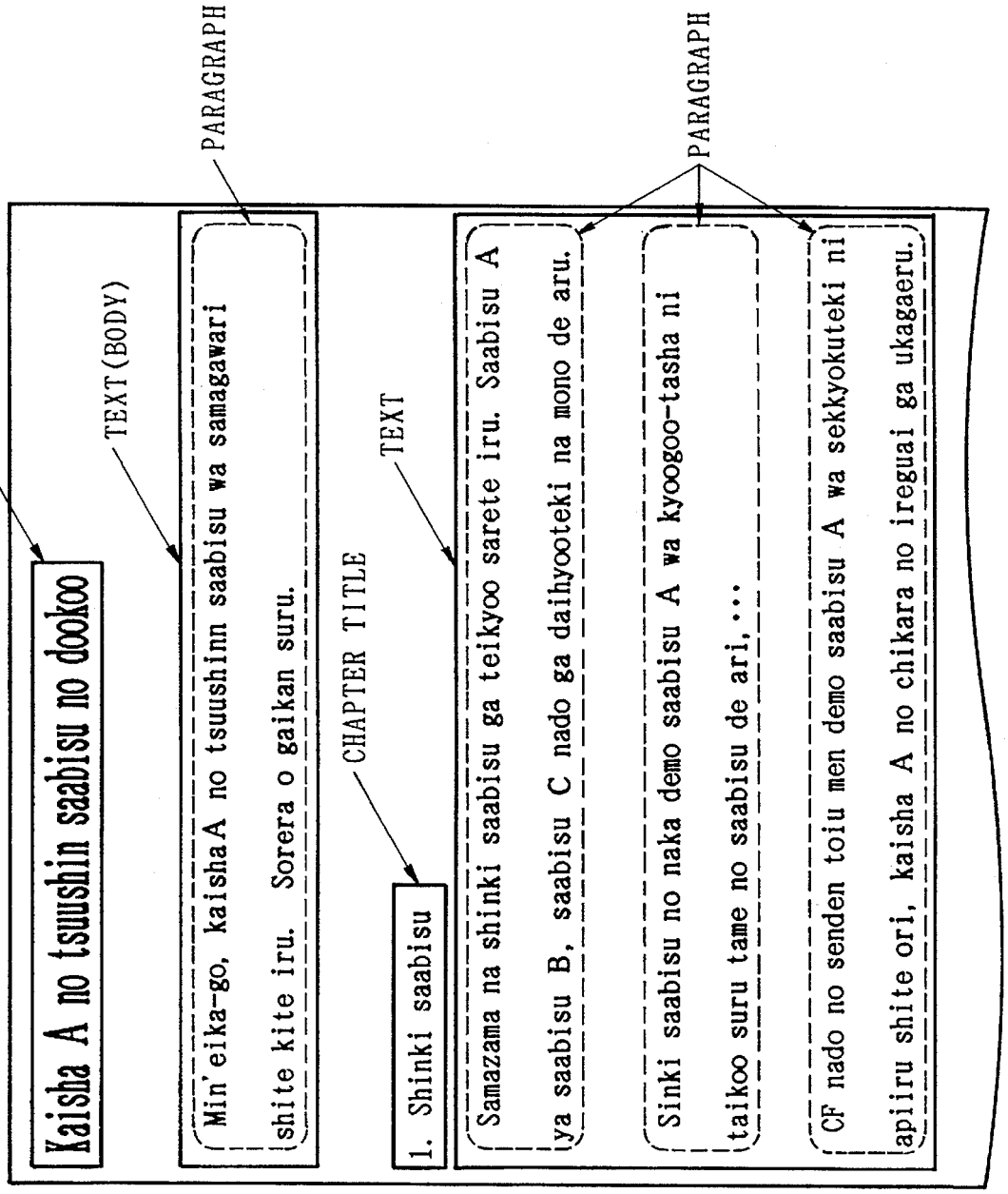
FIGS. 52A and 52B show the results of the block division process applied to the Japanese text data.
Figure 52:
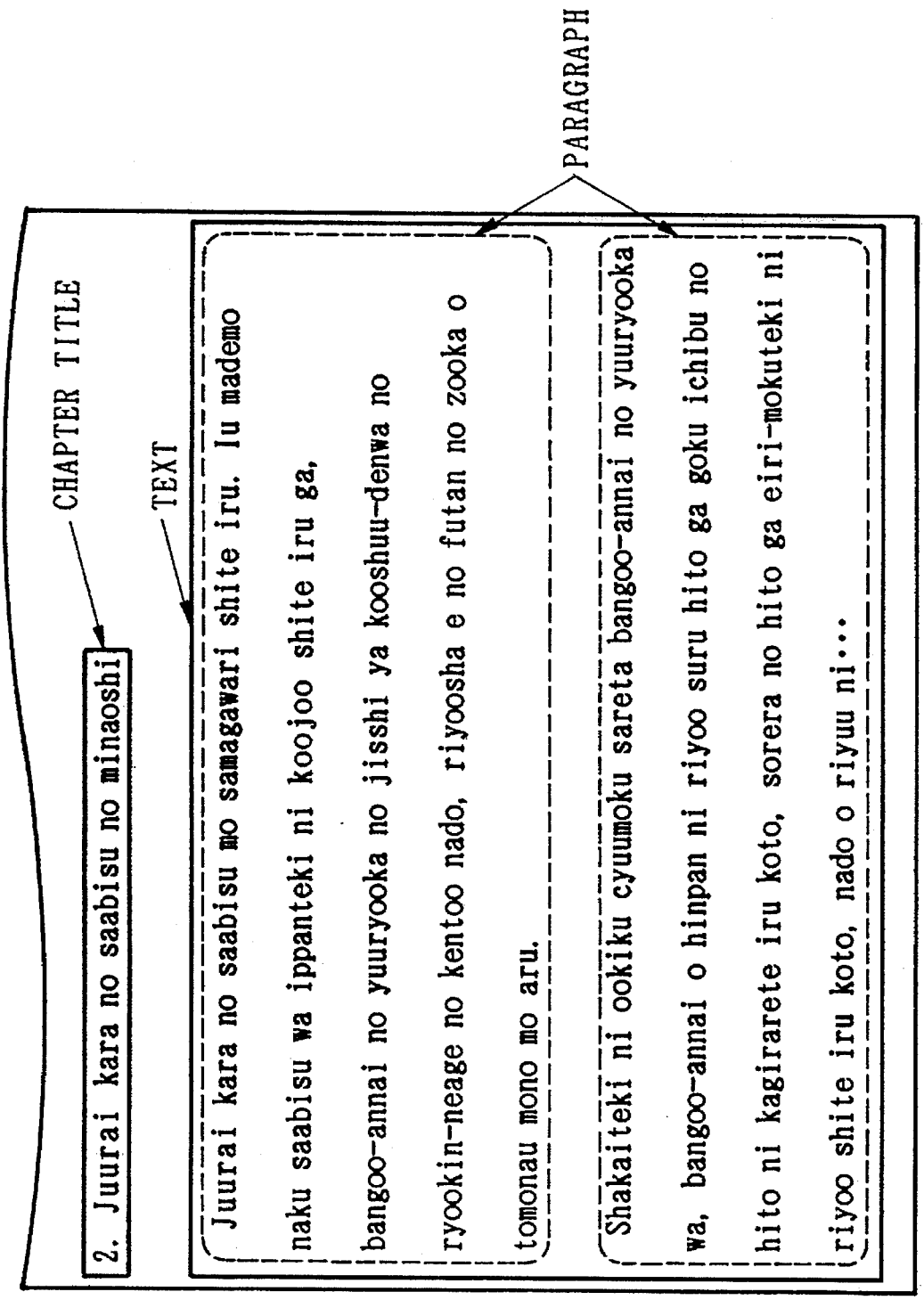

Next, FIGS. 52A and 52B. show the logic structure recognized for the text data. In the present data, there is no item area, and other elements of logic structure, such as chapters, chapter titles, texts, paragraphs, have been recognized. Normally, these structure elements besides the item area are already given by tags and the like, so that the above-recognized structure has also been already given.

Next, topic intro. regions in the global expansion are determined.

Figure 16:
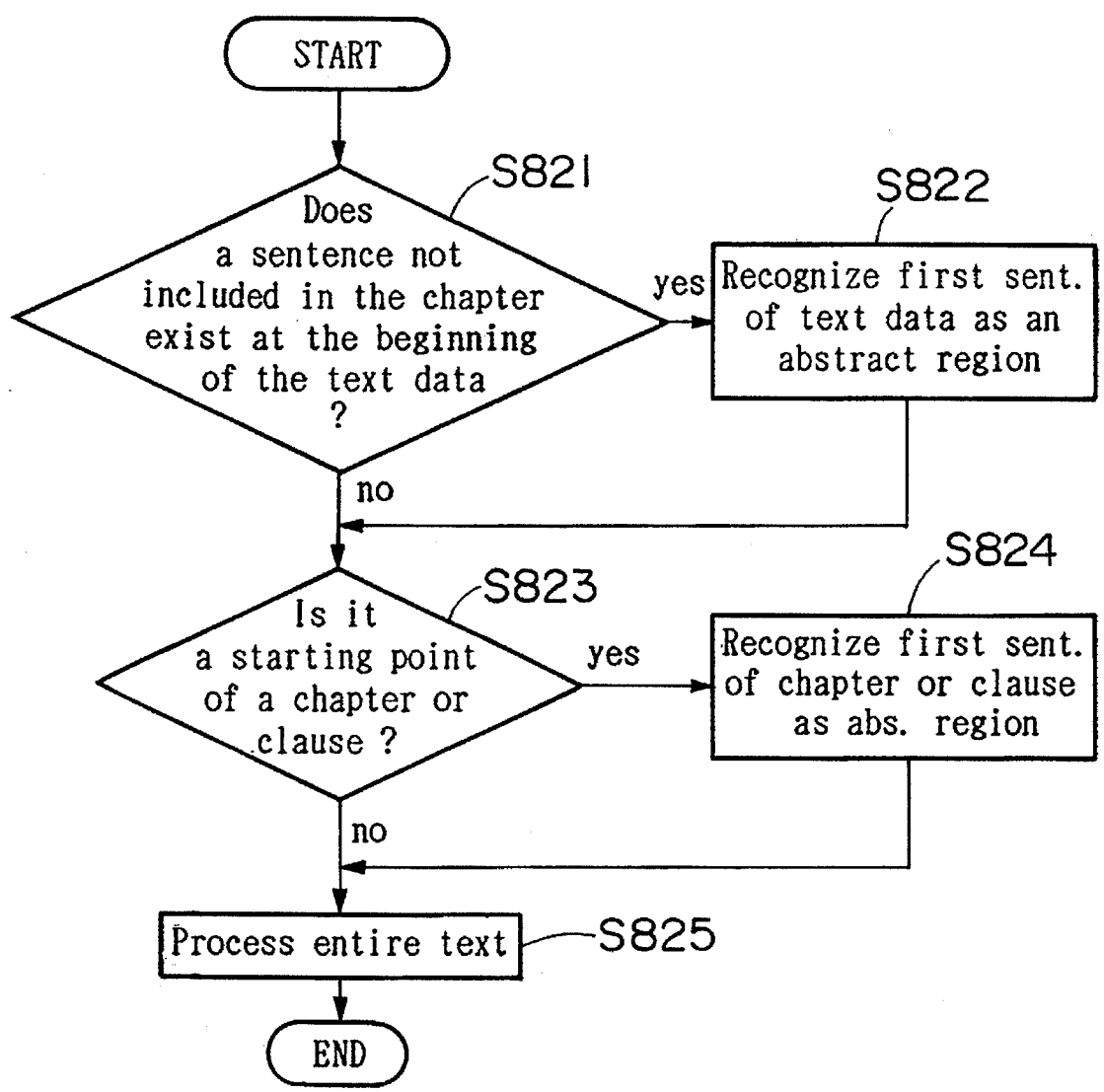
FIG. 16 is a flow chart explaining the decision process for the abstract region.

First, according to the decision process for the abstract regions shown in FIG. 16, the first sentence of paragraph 3a shown in FIG. 53A satisfies the condition that ⌈there is a sentence which is not included in a chapter at the beginning of the text⌋; thus, this sentence is recognized as an abstract region. In addition, any first sentence of a chapter or clause is recognized as an abstract region; therefore, the first sentences of paragraphs 3b and 3e are both recognized as abstract regions.

Then, according to the process shown in FIG. 15, the recognized abstract regions also correspond to topic intro. regions; thus, their type is recognized as the chapter type. In addition, in each paragraph which includes a topic intro. region, the area other than the intro. region is recognized as a pseudo-paragraph. There is no item area in the present text data, so that the process for determining the topic intro. regions ends here.

Next, for the determined three topic intro. regions, G31, G32, G33, shown in FIGS. 53A and 53B, topic portions are recognized. First, "kaisha A no tsuushin saabisu <company A's communication services>" in paragraph 3a satisfies the condition [a] in the priority ranking shown in FIG. 20; thus, it is admitted as a candidate for a topic portion in accordance with the flow chart shown in FIG. 19. No other candidate is chosen from the topic intro. region included in paragraph 3a; thus, this candidate is admitted as a topic portion in the topic intro. region. Similarly, as a topic portion of the topic intro. region included in paragraph 3b, "samazama na shinki saabisu <various new services>" is extracted, and as a topic portion of the topic intro. region included in paragraph 3e, "juurai kara no saabisu <the old services>" is extracted.

Then, according to the rules shown in FIG. 22, the level and scope of each topic is determined. Here, the level of the first topic, "kaisha A no tsuushin saabisu <company A's communication services>", is set equal to "1". The next topic "samazama na shinki saabisu <various new services>" is a topic in the topic intro. region of a chapter type and has a change pattern with a direction towards more detail; thus, the level of this topic is set equal to "2", which is obtained by adding "1" to the last level. The next (third) topic, "juurai kara no saabisu <the old services>" is also a topic in the topic intro. region of a chapter type but has a change pattern with a direction to the same level such as "chapter to chapter"; thus, the level of this topic is set equal to "2", the same of the last topic.

Next, the scope of each topic is also determined by the parts related to the chapter type in the process shown in FIG. 23. Here, the topic scope of "kaisha A no tsuushin saabisu" is determined as being from the beginning of the text data to the end of it, the topic scope of "samazama na shinki saabisu" is determined as being the region from paragraph 3b to 3d, and the topic scope of "juurai kara no saabisu" is determined as being the region of both blocks 3e and 3f. The result of these determinations is the same as in the case of dialogue, as shown in FIG. 39.

Next, according to the flow chart shown in FIG. 27, some topic intro. regions in the local expansion are determined. Here, the pseudo-paragraph 3A shown in FIG. 54 has less than five simple sentences; thus, it is recognized that there is no topic intro. region. in the paragraph. Similarly, it is recognized that both pseudo-paragraphs 3B and 3E, and paragraph 3d, have no topic intro. region.

On the other hand, paragraph 3c has five or more simple sentences and has no item area. Moreover, "saabisu A <service A>" in paragraph 3c satisfies the condition ⌈prominent NP including proper noun⌋; thus, the top of the paragraph 3c is recognized as a starting point of a topic intro. region. Then, the first appearing of ⌈the end of the eighth simple sentence in paragraph 3c⌋ and ⌈the end of the second sentence from the end of the paragraph⌋ is recognized as the end point of the topic intro. region. Similarly, a topic intro. region is recognized in paragraph 3f. Therefore, two topic intro. regions, L31 and L32, are recognized in the local expansion, as shown in FIGS. 54A and 54B.

Next, the topic portion for each recognized topic intro. region is determined.

First, "saabisu A" in paragraph 3c has the rank "2" in the priority ranking shown in FIG. 28; thus, it is chosen as a candidate for a topic portion. Here, with the assumption that no prominent NP which has higher rank than "saabisu A in the region", if any other prominent NP of the rank "2" were detected, the first appearing "saabisu A" would be chosen. Therefore, "saabisu A" is admitted as a topic portion. Similarly, "bangoo-annai no yuuyooka <the introduction of a toll on directory assistance>" in paragraph 3f is admitted as a topic portion.

Next, according to the similar rules (see FIG. 32) in the case of monologue data, the topic level of every topic is assumed as "1". In addition, the topic scope of each topic is determined according to the similar rules in the case of monologue. Here, the topic scope of "saabisu A" is determined as the area of paragraphs 3c and 3d, and the topic scope of "bangoo-annai no yuuyooka" is determined as paragraph 3f. The result of these determinations is the same as the result in the case of dialogue (or monologue), as shown in FIG. 41.

Lastly, similar to the above cases, the topic levels in the local expansion are corrected so as to unify the topics. The obtained topic structure is also the same as the result shown in FIG. 42.

[Second Embodiment]

In the method explained in the first embodiment, topic portions are determined without taking account of the relationships between topics included in the recognized topic structure. In this case, the topic portions of two topics, which have a parent-child relationship (i. e., a relationship between two topics whose levels differ by "1" and which have a direct nest relation) or an adjacent relationship, may be duplicate. Accordingly, there are problems in that the accuracy of the topic structure recognition may be low or the output topic structure is difficult to understand when people use the output as an index, a table of contents, or a structure for skimming.

For example, when the method of Embodiment 1 is applied to other monologue data as shown in FIGS. 55A and 55B (FIGS. 55C and 55D are their English translations), the output structure, that is, the index of contents shown in FIG. 56 is automatically output. In the index, two "chapter titles", [1.1.1] and [1.1.2], are identical, i. e., "kan'igata keitaidenwa <simplified cellular telephones>". Therefore, there occurs a sense of confusion for humans and it is difficult to understand the abstracts of the data, that is, what kind of topics exist and where the topics are written.

Figure 57:
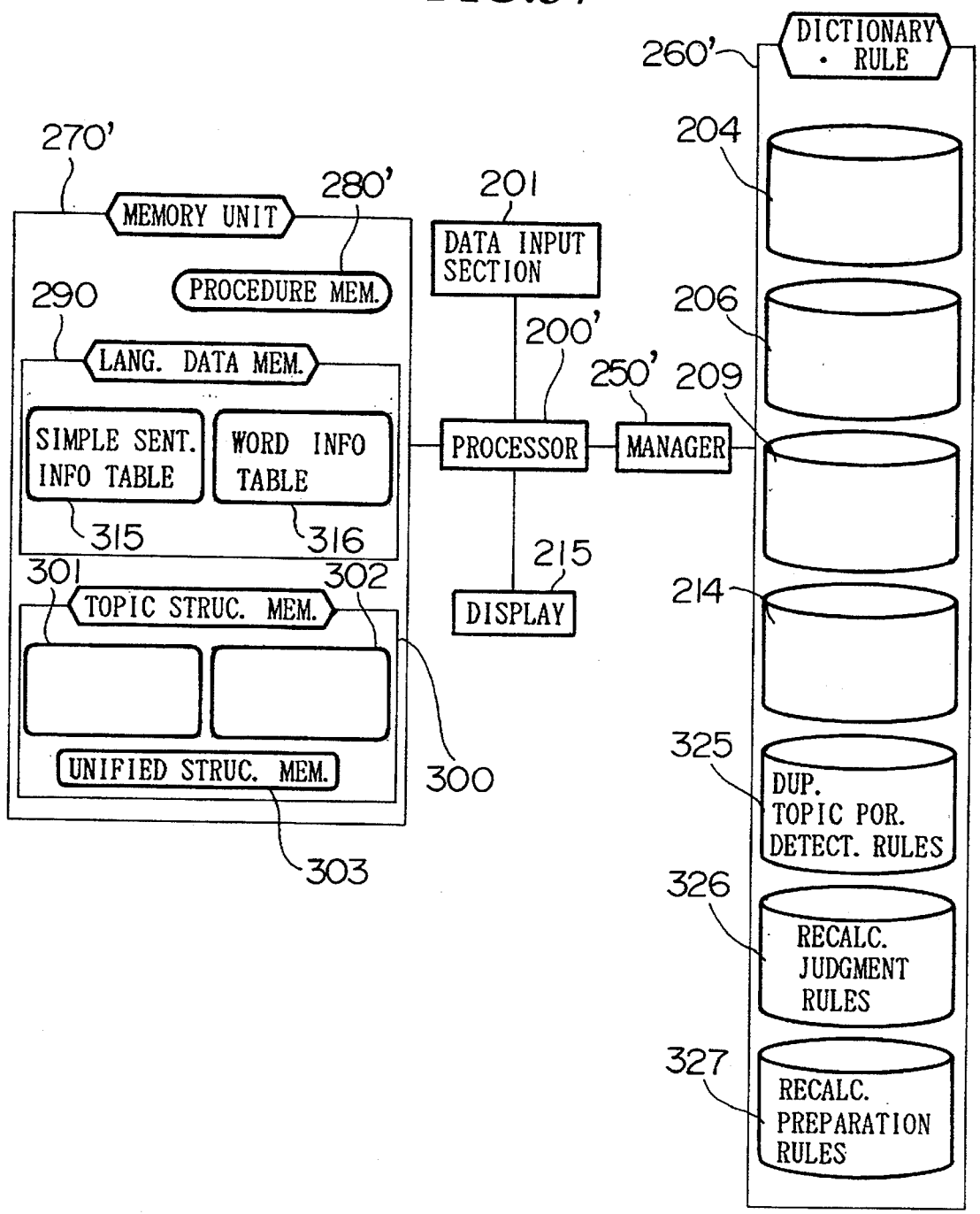
FIG. 57 is a block diagram of a topic structure recognizing apparatus in the second embodiment.

FIG. 57 is a block diagram of an improved topic structure recognizing apparatus according to the present invention which solves the above problem.

This apparatus is different from the last apparatus shown in FIG. 2 on the following points. In FIG. 57, parts which are identical to those shown in FIG. 2 are given identical reference numbers, and parts which are partially expanded but have similar functions are given identical numbers with apostrophes.

In the present apparatus, processor 200' performs the duplicated topic portion detection process, the recalculation judgment process, and the recalculation preparation process, which will be explained later, according to procedures stored in procedure memory 280' via manager 250'. Here, "duplicated topic portion" indicates one of two topic portions in the topic structure resulting from the unification of global and local expansions, the two topics satisfying one of the following two conditions, CONDITION (1): They have a parent-child relationship and the rows of words (or word sequences) of the two topic portions are the same.

CONDITION (2): They have the same topic level and their topic portions are also the same in the row of words, and there is no other topic between them having the same level or a level smaller than theirs by "1".

Language data memory 290 comprises simple sentence information table 315 which stores information about each simple sentence and word information table 316 which stores information about each word. In practice, these tables are also included in the apparatus in the first embodiment.

Dictionary-rule section 260' further comprises duplicated topic portion detecting rules 325 for detecting a duplicated topic portion, recalculation judgment rules 326 for judging whether or not the recalculation should be conducted, and recalculation preparation rules 327 for preparing for the recalculation.

The unified structure memory 303 is identical to that in Embodiment 1; however, it will be explained in more detail for explaining the features of the present process. In the unified structure memory 303 in which a final topic structure is stored, information about each topic, which includes the topic No, the simple sentence No. of the simple sentence in which the topic portion corresponding to the topic appeared, the topic level, and the simple sentence numbers of the start and end of the topic scope, is stored.

Here, the "topic No." indicates the order of the topic in the language data in the form of serial numbers starting from "0". On the other hand, the "simple sentence No." indicates the order of the simple sentence in the language data in the form of serial numbers starting from "0".

Figures 58, 61:
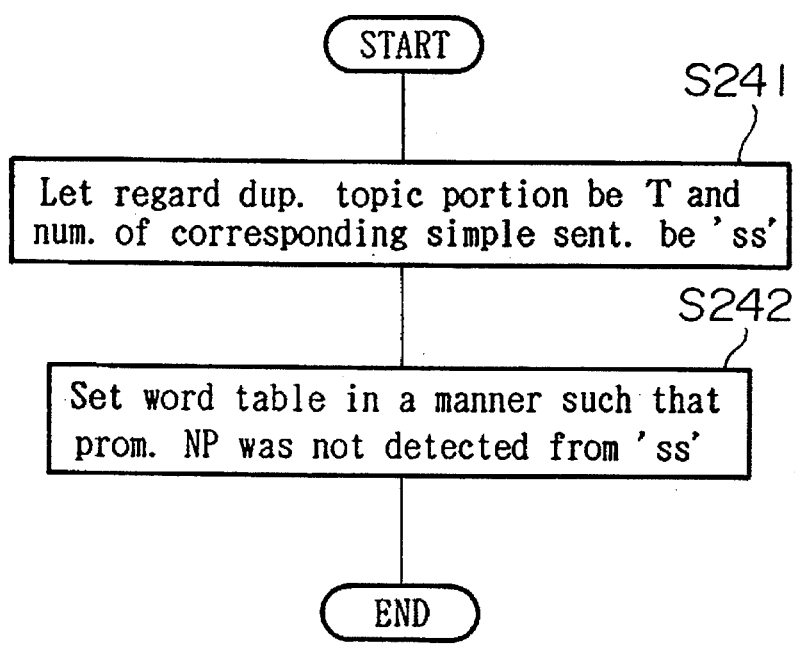
FIG. 58 shows an internal structure of the unified structure memory of the apparatus.
FIG. 61 is a flow chart explaining the process for the recalculation preparation.

An example of the contents of unified structure memory 303 is shown in FIG. 58. In the figure, for example, the topic portion corresponding to topic No. 0 is the prominent NP in the simple sentence No. 1, and its topic level is "1" and its topic scope spreads from simple sentence No. 0 to simple sentence No. 23.

Next, simple sentence information table 315 and word information table 316 in language data memory 290 will be explained with reference to FIG. 59.

In word information table 316, information related to the row of words and the part of speech of each word obtained by the morphological analysis is stored. Here, "Word No." indicates the order of the word in the language data in the form of serial numbers starting from "0".

In simple sentence information table 315, information relating to the word numbers of the first and last words in each simple sentence divided by the simple sentence division process, and the prominent NP which is most emphasized in each simple sentence, are stored. In the figure, ⌈TYPE⌋ indicates the type of the prominent NP, that is, explicit or implicit.

In FIG. 59, the relationship between the word No. in each field in simple sentence information table 315 and the corresponding word stored in word information table 315 is indicated with the use of an arrow. For example, the simple sentence of No. 1 corresponds to the range from word No. 0 to word No. 15 and has a prominent NP formed by words No. 2~5.

Hereinbelow, the procedure for topic structure recognition in the present embodiment will be explained with reference to FIG. 60.

First, the variable TIMES which stores the number of times of recalculation is set equal to "0" (see step S201). Then, similar to the first embodiment, the topic structure pre-process (see step S202), the global expansion process (see step S203), the local expansion process (see step S204), and the unification process (see step S205) are conducted respectively to output a topic structure.

Next, the detection of a duplicated topic portion is conducted (see step S206). This process will be explained later in detail.

Then, the recalculation judgment process which decides whether a recalculation should be executed is conducted (see step S207). First, it is judged whether or not a duplicated topic portion is detected (see step S231). If judged "no", it is recognized that a recalculation is not needed (see step S232), while, if judged "yes", it is judged whether or not the number of times (of recalculation) TIMES is equal to a predetermined maximum number of times T_MAX (see step S233). If judged "yes", the process jumps to step S232 and it is recognized that a recalculation is not needed, while if judged "no", the value of variable TIMES increases by "1" (see step S234) and it is recognized that a recalculation is needed (see step S235).

As explained above, in the recalculation judgment process in step S207, it is judged that a recalculation is needed when a duplicated topic portion is detected and the value of variable TIMES is less than the fixed number T_MAX. In other cases, it is recognized that a recalculation is not needed.

Next, it is examined whether or not it was judged that a recalculation is needed (see step S208); if judged "no", then the process ends. In this case, the topic structure which was obtained in the unification process in step S205 is the final structure.

On the other hand, if it was judged that the recalculation is needed, the recalculation preparation process (which will be explained later) is conducted (see step S209) and the process returns to the topic structure recognizing pre-process in step S202. In this case, the process of extracting prominent NPs and the processes which do not use the information of the extracted prominent NPs are not conducted again, whereas the other processes in the pre-process are conducted again. That is, in FIG. 60, for the morphological analysis (step S221), the simple sentence division process (step S202), and the prominent NP extraction process (step S203), no recalculation is conducted, while, for the block recognition process (step S224), a recalculation is conducted, that is, the process is conducted again. FIG. 61 is a flow chart explaining the recalculation preparation process in step S209. In the process, the simple sentence No. of the simple sentence in which the duplicated topic portion was detected is examined (see step S241), and simple sentence information table 315 is revised to enter the conditions that the prominent NP was not extracted from the simple sentence (see step S142), then the process ends.

<Detection of Duplicated Topic Portion> (step S206)

Figure 62:
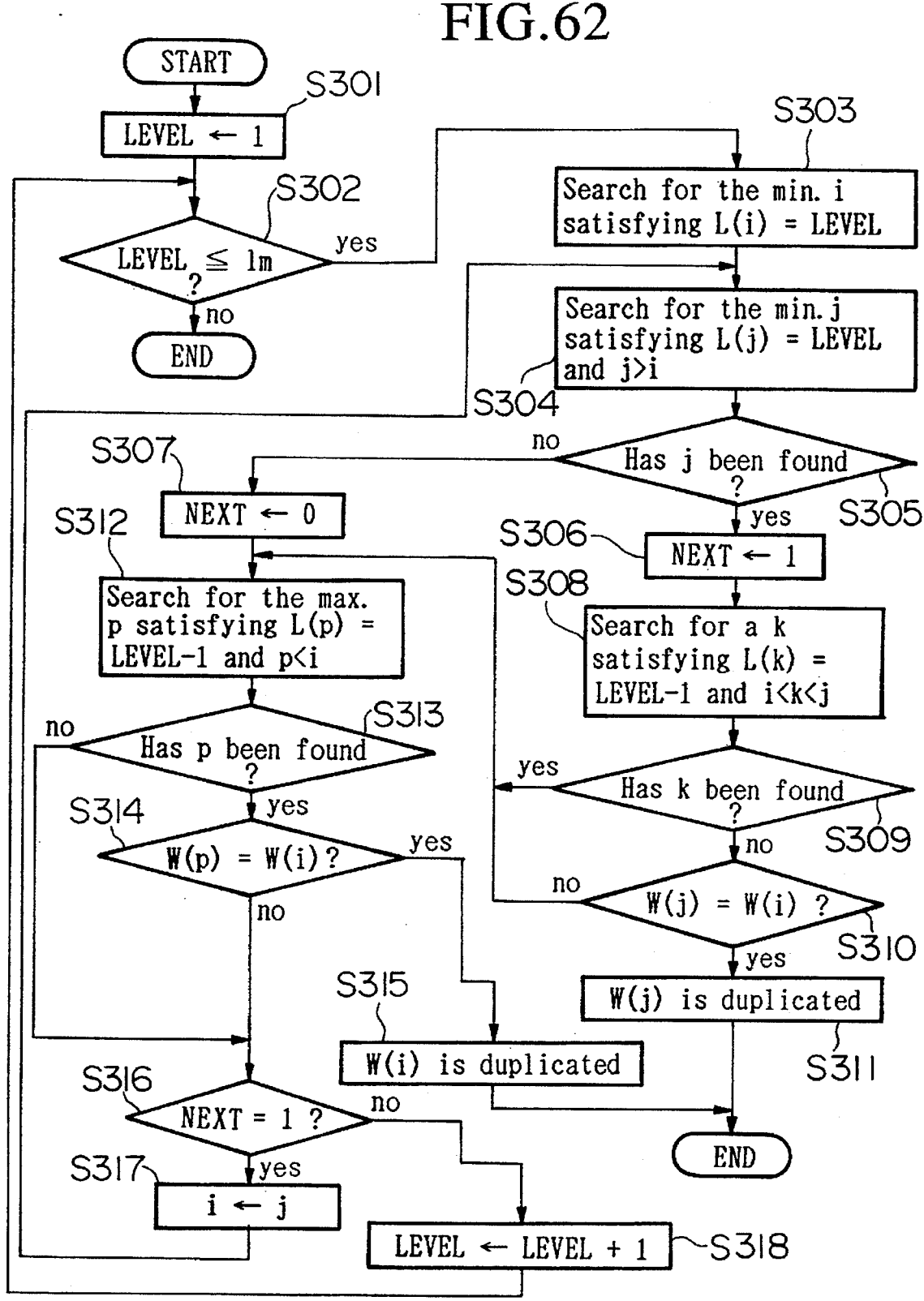
FIG. 62 is a flow chart explaining the process for the duplicated topic portion detecting process.

The practical procedure of the process for detecting the duplicated topic portion will be explained below, with reference to the flow chart shown in FIG. 62. Here, the topic of the "i+1"th topic portion which is stored in unified structure memory 303, that is, having the topic No. "i", is regarded as T(i). For example, T(0) is the first topic. In addition, the topic level of topic T(i) is represented as L(i), and the row of words of topic T(i) is represented as W(i). The maximum value among all topic levels stored in unified structure memory 303, that is, the level of the most deeply nested topic, is regarded as "lm". Here, duplicated topic portions to be detected in the process satisfy one of the above-mentioned conditions (1) or (2).

The process begins with topics which have relatively smaller levels. That is to say, first, the variable LEVEL, which indicates the level of the present-noticed topic, is set equal to "1" (see step S301). Next, it is examined whether or not the value of the variable LEVEL is "lm" or less (see step S302). If judged "no", then the process ends, while if judged "yes", the process jumps to step S303. Here, at the beginning of the process, "lm" is 1 or more because the variable LEVEL was set equal to "1"; thus, in this case, the process jumps to step S303.

In step S303, the minimum number 1 which satisfies ⌈L(i)=LEVEL⌋ is searched for. This means that the first appearing topic among the topics having level "LEVEL" is searched for. Subsequently, the minimum number J which satisfies ⌈L(j)=LEVEL and J>i⌋ is searched for (see step S304). This refers to the topic T(J) whose topic level is equal to "LEVEL" and which is found after topic T(i).

Next, it is judged whether or not such a j was found (see step S305), if judged "yes", the process jumps to step S306 and the variable NEXT is set equal to "1", which indicates that such a j was found. Then the process jumps to step S308. In contrast, if such J is not found in step S305, the process jumps to step S307 and the variable NEXT is set equal to "0", which indicates that such a J was not found. Then the process further jumps to step S312.

In step S308, the number k which satisfies ⌈L(k)= LEVEL-1 and i<k<j⌋ is searched for (see step S304). This means that any topic which exists between topics T(i) and T(j) of level "LEVEL", which topic has level "LEVEL-1", that is, one level smaller than those of T(i) and T(j), is searched for. Then, it is judged whether or not such a k was found (see step S309). If judged "yes", the process jumps to step S312, while if judged "no", it is judged whether or not W(i) is equal to W(j) (see step S310).

The case "W(i)=W(j)" means that ⌈The two topics are the same in the row of words and in the topic level, and there is no topic between them whose level is the same as or less than those of these two topics by "1"⌋; therefore, the row of words W(j) of latter topic T(j) is recognized as a duplicated topic portion (see step S311), and the process ends. In the case "W(i)≠W(j)", the process jumps to step S312.

In step S312, the maximum number p which satisfies ⌈L(p)=LEVEL-1 and p<i⌋ is searched for, meaning that the parent topic T(p) for topic T(i) is searched for. Then, it is judged whether or not such a p was found (see step S313). If judged "yes", it is judged whether or not W(p) is equal to W(i) (see step S314). If judged "yes", it means that ⌈the two topics construct a parent-child relationship and are the same in the row of words⌋; thus, the row of words W(i) of the child topic T(i) is recognized as a duplicated topic portion (see step S315), and the process ends.

On the other hand, if such a p was not found in step S313, or, if "W(p)≠W(i)", then, it is judged whether or not the value of the variable NEXT is "1" (see step S316). If judged "yes", it means that a next topic which has the same level as that of T(j) exists, then i is set equal to j in order to regard topic(j) as topic(i) and to repeat the above process. Then the process returns to step S304. On the other hand, if the variable NEXT is not equal to "1", it means that such a next topic having the same level does not exist, then, the value of the variable LEVEL is increased by "1" in order to examine topics of the next level (see step S317), and the process returns to step S302.

By conducting the above mentioned process, duplicated topic portions are detected, if they exist.

<Concrete Example>

Here, the present process will be explained with the use of language data, the monologue data shown in FIGS. 55A and 55B.

Figure 60:
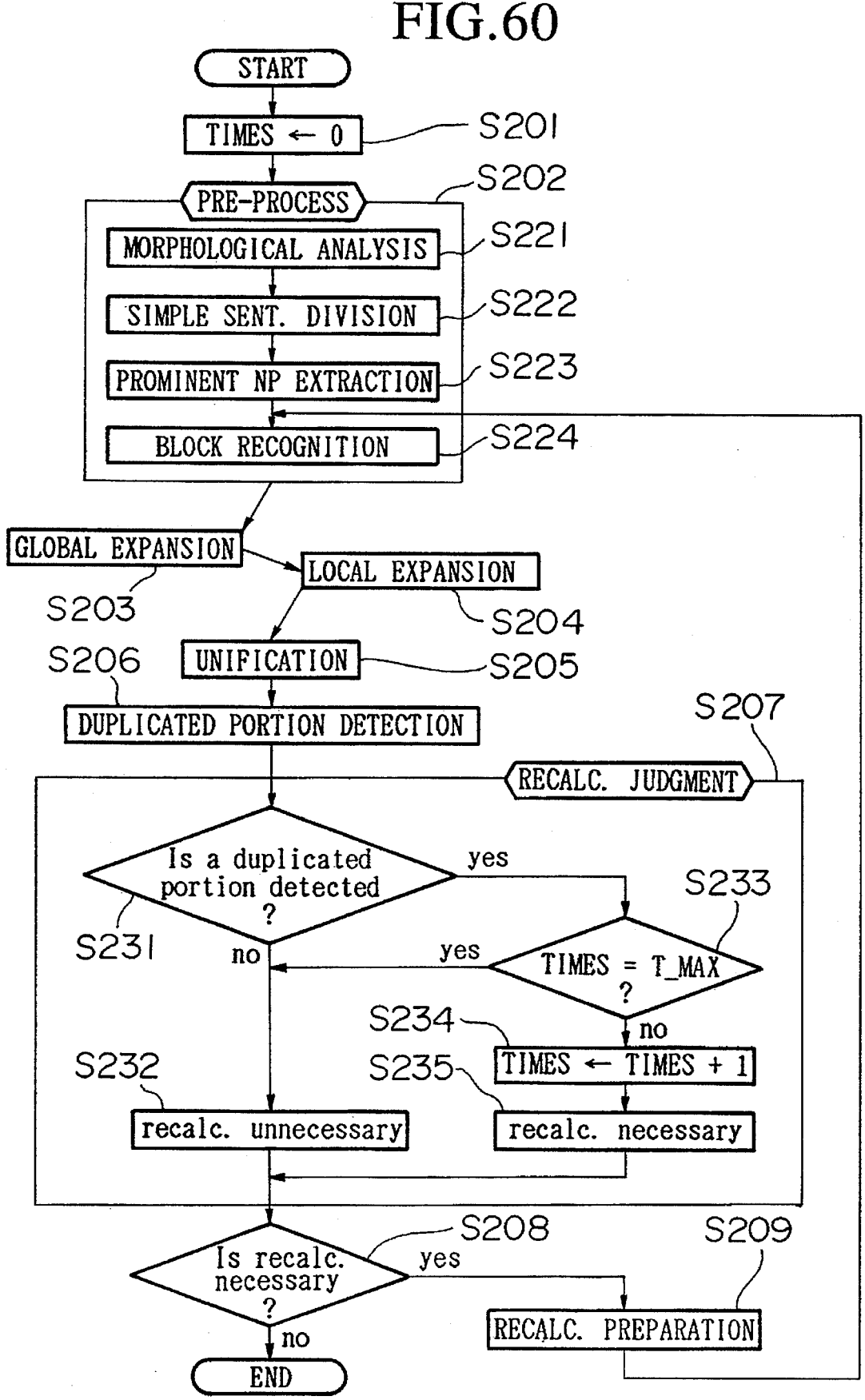
FIG. 60 is a general diagram for explaining the method for recognizing the topic structure based on the present invention, by using the apparatus shown in FIG. 57.

Now, according to the flow chart in FIG. 60, the processes up to the unification process (step S205) have been conducted. At this stage, no recalculation has been executed; thus, the variable TIMES is equal to "0". Also at this stage, the contents of simple sentence information table 315 and word information table 316 are assumed to be the same as those shown in FIG. 59. In addition, the contents of unified structure memory 303, that is, the results of topic structure unification, are assumed to be the same as those shown in FIG. 58. In FIG. 58, information items about six topics "topic No. 0 to topic No. 5" are stored in unified structure memory 303, and it is also assumed that the information corresponds to the index shown in FIG. 56. Moreover, the maximum number of times T_MAX, which is used in the recalculation judgment, has been set equal to "5" beforehand.

Succeeding the unification process, the duplicated topic portion detecting process (shown in FIG. 62) is performed. First, the variable LEVEL is set equal to "1". As shown in FIG. 58, the maximum value "lm" among all topic levels is "3"; thus, the process jumps to step S303. Here, topic level L(0) =1; thus, the number i has been found to be "0".

Then, no other topic having level "1" exists after T(i); thus, the number J was not found in step S304 and the variable NEXT is set equal to "0". Then, the process jumps to step S312. Here, no topic having level "0" exists; thus, the number p was not found and the process jumps to step S316. Here, the value of the variable NEXT is "0"; thus, the variable LEVEL is set equal to "2" in step S317 and the process returns to step S302.

Because ⌈LEVEL≦3 (=2)⌋, the process jumps from step S302 to step S303. Here, ⌈L(1)=2⌋; thus, the number i (=1) is found. Additionally, ⌈(4)=2⌋; thus, the number j (=4) is found and the process jumps to step S306. In step S306, the variable NEXT is set equal to "1".

Then, in the next step S308, a number k which satisfies ⌈L(k)=2-1=1 and 1<k<4⌋ is searched for. Such k is not found; thus, the process jumps to step S310. In this step, it is examined whether or not "W(1) =W(4)". As described above, the topic structure stored in unified structure memory 303 corresponds to those shown in FIG. 56, that is, W(1) is "shinki saabisu <new services>" and W(4) is "juurai kara no saabisu <the old services>". Therefore, the two topics are not the same in the row of words and the process jumps to step S312.

In step S312, ⌈L(0)=1 and 0<1⌋; thus, the number p (=0) is found and the process jumps to step S314. In this step, it is examined whether or not "W(0) =W(1)". They are also not equal; thus, the process jumps to step S316. Here, the value of the variable NEXT is "1"; thus, the process jumps to step S318 and the variable i is equal to "4". Then the process further jumps to step S304.

In step S304, no number J which satisfies the condition was found; thus, the process jumps to step S307 and the variable NEXT is set equal to "0". Then the process further jumps to step S312. Here, ⌈L(0)=1 and 0<4⌋, then the number p (=0) is found and the process jumps to step S314 to examine whether or not ⌈W(4)=W(0)⌋. They are also not equal; thus, the process jumps to step S316. Here, the value of the variable NEXT is "0"; thus, the value of the variable LEVEL increases by "1" (i. e., LEVEL=3), and the process returns to step S302.

Because ⌈LEVEL=3 and lm=3⌋, the process jumps from step S302 to step S303 to search for number i, and i (=2) is found. Then, in the next step S304, j (=3) is found and the process jumps to step S306 to set the variable NEXT equal to "1". Then in step S308, a number k which satisfies ⌈L(k)=2 and 2<k<3⌋ is searched for. Here, such a k is not found; thus, the process jumps to step S310 to examine whether W(2) is equal to W(3).

With reference to FIGS. 58 and 59, the "simple sentence No." of the simple sentence in which the topic portion of topic No. 2 appeared is "4", and in simple sentence information table 315, the prominent NP in the simple sentence No. 4 consists of words of word No.s 44, 45, 46, and 47. Therefore, the row of words W(2) consists of these words. Similarly, W(3) consists of words of word No.s 121, 122, 123, and 124. By referring to word information table 316, it is obvious that both rows of words W(2) and W(3) are equal. Therefore, the process jumps to step S311 and W(3) is recognized as a duplicated topic portion, and the process ends.

As explained above, the topic portion of topic No. 3 in FIG. 58 was detected as a duplicated topic portion. Subsequently, the recalculation Judgment process (step S207) shown in FIG. 60 is performed.

Here, the duplicated topic portion was detected and the number of times (of recalculation) TIMES is "0" and the maximum number of times T_MAX is "5", as described before. Therefore, the variable TIMES increases by "1" and it is judged that a recalculation is needed. Then, the process jumps to the recalculation preparation process shown in FIG. 61. First, the simple sentence No. "ss", in which the duplicated topic portion was detected is studied. According to FIG. 58, duplicated topic portion W(3) is included in the simple sentence No. 10; thus, "ss"=10. Then, the process for realizing the conditions that the prominent NP was not extracted from the simple sentence is conducted. This process is conducted by rewriting the contents of the items corresponding to both the prominent NP and its type in the field corresponding to simple sentence No. ss in word information table 315 as "−1", which indicates that no prominent NP was extracted from the simple sentence. The result of the rewriting is shown in FIG. 63.

After the above preparation, the process returns to the block recognition process (step S224) in the pre-process (step S202), and a recalculation for each process is conducted. The result of the above-explained recalculation for the monologue data shown in FIG. 65, which was performed until it was judged that no recalculation was needed, is shown in FIG. 64. Comparing the present result with the last result shown in FIG. 56, as a chapter title [1.1.2] which was once a duplicated topic portion, "maruchimedia.saabisu <multimedia services>", which is not a duplicated topic portion, has been recognized now. Therefore, a result which is not confusing to humans is obtained.

<Experimental Data>

Now, the results of experiments to evaluate the method for recognizing the topic structure according to the present invention are shown. The evaluation is conducted in a manner such that both recall and precision ratios are calculated by comparing the topic structure recognized by the computing device (i. e., the present apparatus) with the topic structure recognized by humans.

Here, the recall ratio indicates how many elements of the topic structure recognized by humans were also recognized by the computing device, while the precision ratio indicates how many elements of the topic structure recognized by the computing device were also recognized by humans. If the topic structures recognized by both humans and the computing device agree with each other completely, both recall and precision ratios become 100%.

(EXPERIMENT 1) Dialogue Data

Result for 639 sentences (corresponding to 778 simple sentences),

Recall ratio: 60.4%, Precision ratio: 77.3%

(EXPERIMENT 2) Monologue Data

Result for 63 TV news transcripts (corresponding to 3182 simple sentences),

Recall ratio: 62.2%, Precision ratio: 62.6%

(EXPERIMENT 3) Text Data

Result for 50 newspaper articles (corresponding to 2150 simple sentences),

Recall ratio: 61.3%, Precision ratio: 60.2%

[Application to Other Languages]

In the above-explained embodiments, Japanese language data were used, but, the method and apparatus for recognizing the topic structure according to the present invention can be applied to any language, basically. However, language-dependent rules such as those concerning lexical information are needed for the language. Here, in the case of English data, the parts of the process different from those for Japanese data will be explained below.

§E-1. Morphological Analysis

§E-1-1. In the Case of Japanese

In the morphological analysis process, the division of character strings of each sentence into words, and the identification of the part of speech and conjugation of each word and the like are conducted.

The identification of the conjugation is needed because verbs, adjectives, and auxiliary verbs, etc. in Japanese are conjugated according to the words which follow them.

For example, when the verb "hashiru <run>" has the following noun "hito <a man>", it makes "hashiru, hito <a man who runs>". In contrast, when the verb has the following post positional particle "ba <if>" which represents suppositions, the verb is conjugated as "hashire ba".

§E-1-2. In the Case of English

In the case of English, the identification of the part of speech and conjugation and the like are conducted. The division of character strings of the sentence into words is not necessary because in English notation, sentences are divided into words with the insertion of spaces between words.

On the other hand, the identification of conjugation is needed because English verbs are conjugated in accordance with the "tense" or the "aspect".

Morphological analysis techniques for English have been studied in the past and effective methods have been established. The following paper describes an example of such methods: Bernard Merialdo, "Tagging English Text with a Probabilistic Model", Computational Linguistics, Vol. 20, No. 2, pp.155–171".

§E-2. Simple Sentence Division Process

§E-2-1. In the Case of Japanese

It is possible to divide any complicated sentence into simple sentences by referring to the rules shown in FIG. 4. In addition, another method, "syntactic analysis", which has been used in the field of natural language processing, can be used for this process. The syntactic analysis technique and the method for dividing the sentence into simple sentences by using the syntactic analysis will be explained in the following section for English.

§E-2-2. In the Case of English

The results of syntactic analysis can be used in the case of English. In the syntactic analysis technique, the analysis of subjects, predicates, objects and the like is conducted; therefore, a process corresponding to simple sentence division is included.

Figure 65:
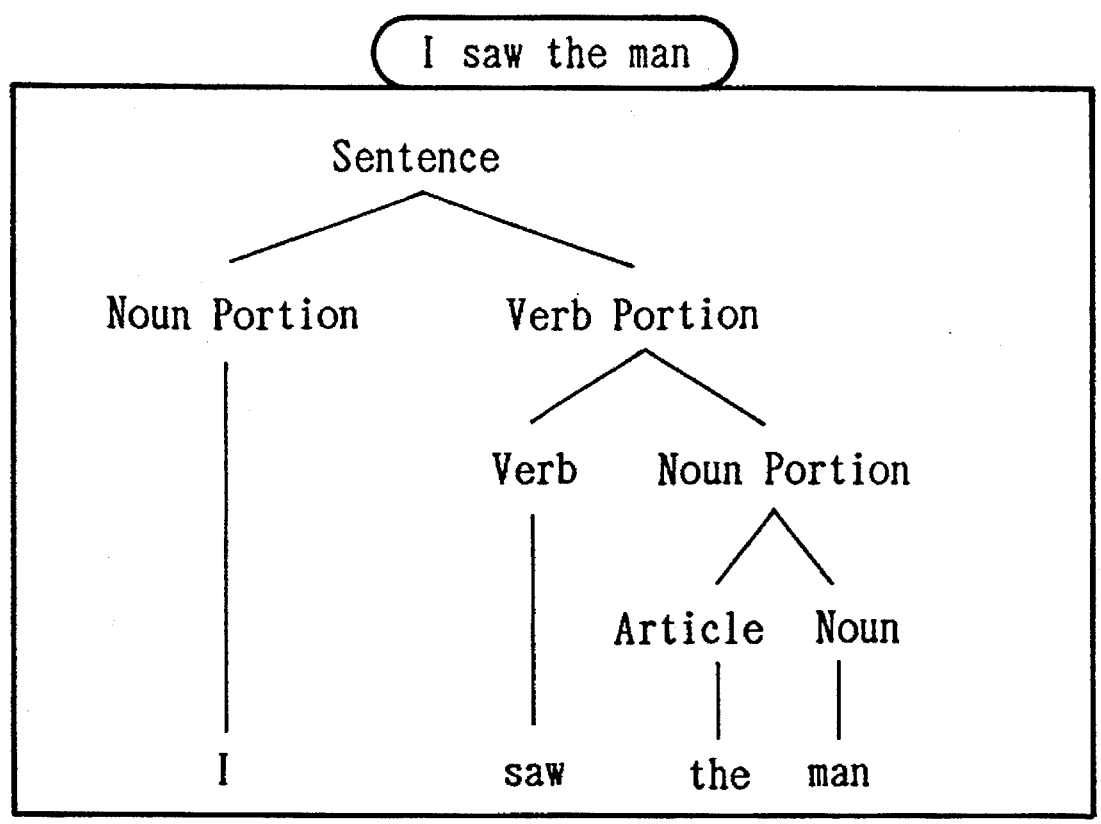
FIG. 65 shows the result of syntactic analysis for an English sentence.

FIG. 65 shows the result of syntactic analysis for sentence "I saw the man". Here, the structure of the sentence is represented as a tree model. The whole sentence consists of a "Noun Portion" and a "Verb Portion". The former "Noun Portion" consists of a word "I", while, the latter "Verb Portion" consists of a verb and another "Noun Portion".

Figure 66:
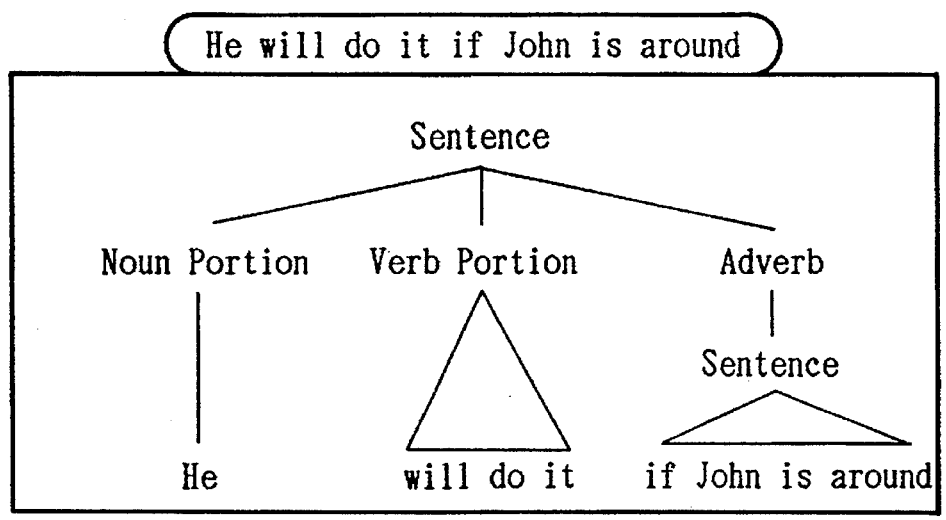
FIG. 66 shows the result of syntactic analysis for another English sentence.

Next, FIG. 66 shows the result of syntactic analysis for the sentence "He will do it if John is around". In the figure, some "tree" structures are abbreviated with the use of "triangles" in order to clearly show the outline structure of the sentence. For example, the part "will do it" is represented in collective form.

In FIG. 66, it is apparent that a smaller sentence "if John is around" is embedded in the full sentence. Such relationships in the sentence are analyzed in the syntactic analysis; thus, the embedded sentence may be extracted to divide the original sentence into simple sentences. That is, the sentence "He will do it if John is around" can be divided into a simple sentence "He will do it" and another simple sentence "if John is around".

Figure 67:
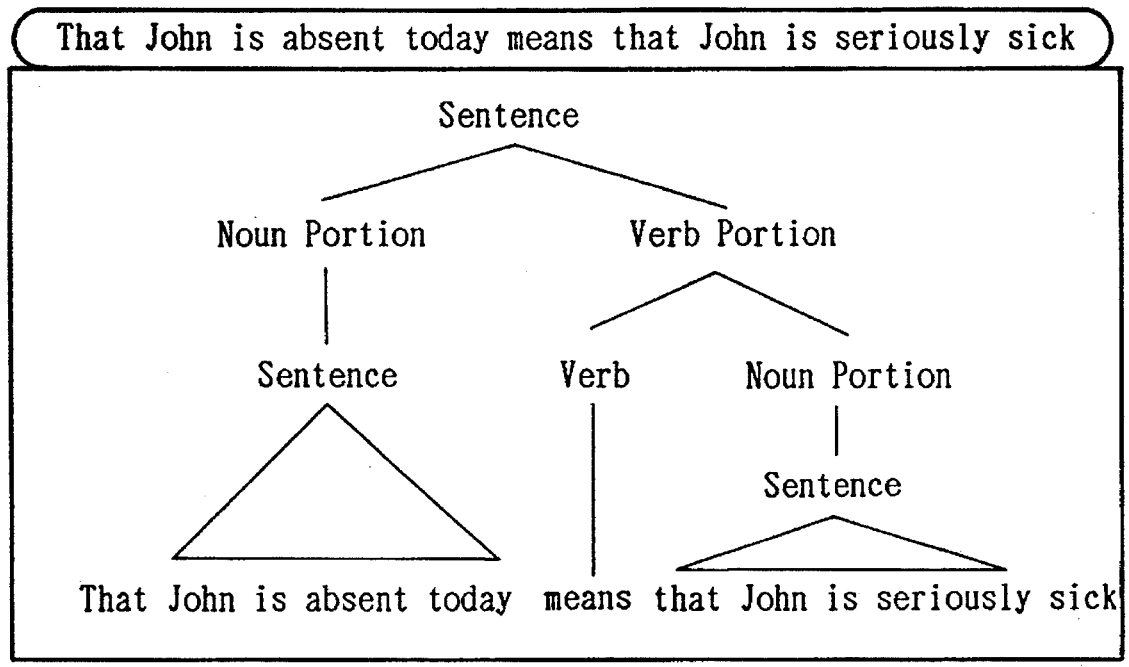
FIG. 67 shows the result of syntactic analysis for another English sentence.

Now, the analysis for the sentence "That John is absent today means that John is seriously sick" is considered (see FIG. 67). In this sentence, there are two embedded sentences; thus, the original sentence is divided into the first simple sentence "That John is absent today", the second simple sentence "0 means 0", and the third simple sentence "that John is seriously sick". Here, "0" indicates that there is no corresponding element.

The following document describes an effective method for syntactic analysis: James Allen, "Part I Syntactic Processing", Natural Language Understanding, pp.24–189, The Benjamin/Cummings Publishing Company, Inc., 1987".

§E-3. The Priority Ranking of Prominent NPs

§E-3-1. In the Case of Japanese

As explained above, priority rankings such as ["Prominent NP marked by an explicit marker" >"Prominent NP marked by an implicit marker" ]are used.

§E-3-2. In the Case of English

In English, some expressions corresponding to explicit markers in Japanese exist. For example, "as regards", "as to", "concerning", "regarding", and "about" are all explicit markers.

In addition, the grammatical function for indicating a subject or an object is indicated not by a particle etc., but by the word order. In an affirmative sentence such as "Tom reads a book", a subject precedes a verb, and objects succeed the verb. Such grammatical functions are determined by syntactic analysis; thus, the result of the analysis can be used.

Moreover, articles which are not found in Japanese exist in English, and the articles influence the priority ranking for prominent NPs. The priority ranking example which also takes account of such articles is shown below.

Rank 1: -A noun portion indicated by an explicit marker which has an indefinite article or has no article Rank 2: (the following three cases)
  A noun portion indicated by an explicit marker which has a definite article
  A subject or object which has an indefinite article or has no article
  A subject or object which has a definite article §E-4. Deictic Expression §E-4-1. In the Case of Japanese An expression which does not have any meaning on its own, for example, a pronoun, or, "koto" or "mono".

§E-4-2. In the Case of English

There are some expressions which correspond to the deictic expression in Japanese, for example, pronouns such as "I", "he", or "she", or, "one" or "something".

§E-5. Forwarding Rule

§E-5-1. In the Case of Japanese

The forwarding rules for block recognition are applied to the sentence patterns shown in FIG. 6.

§E-5-2. In the Case of English

Similar forwarding rules for block recognition are applied to sentence forms such as questions, requests, or confirmations. These are expressed by "moods" such as interrogative sentences or tag questions in English. If the mood has been determined in the syntactic analysis, its result can be used. Even if the mood has not been determined, the sentence can be judged as an interrogative sentence or a tag question if the sentence has a "?" at its end.

§E-6. Others

Basically, English expressions which correspond to the Japanese expressions as shown in the above embodiments can be used. Some examples will be shown below.

The indicators shown in FIG. 7

Topic continuing expressions such as "ni yorimasuto"→reportedly, "shikashi"→but, "kore ni taishi"→to the contrary, "kore wa"→this is, or "kono kekka"→as a result Expressions of questions such as "tazuneru", "tou"→ask, inquire, put a question, etc.

In addition, the parts for detecting duplicated topic portions and recalculation in the topic structure recognition method and apparatus according to the present invention can be directly applied to the English version.

<Concrete Example: English Dialogue Data>

Hereinbelow, a concrete example for English dialogue data in connection with the basic process according to the present invention will be explained.

FIG. 68 shows an example of English dialogue data. FIG. 69 shows the result of the simple sentence division process based on the syntactic analysis. In FIG. 69, each mark "/" shows the division point between two simple sentences. As shown in the figure, the sentence of utterance No. 6 has been divided into two parts in front of "because", while the other sentences have been undivided.

Next, prominent NPs are extracted from each divided simple sentence. The results are shown in FIG. 70. Here, the extracted prominent NPs are indicated by underlining and italic type. For example, no explicit marker, subject, or object exists in the first simple sentence of utterance No. 1 nor in the simple sentences of utterances No. 2 and 4; thus, no prominent NPs has been extracted from these simple sentences. Next, from the second simple sentence of utterance No. 1, "mail delivery" marked by explicit marker "about" is extracted as a prominent NP. In addition, from the simple sentence of utterance No. 3, the object, "an express letter", is extracted. Here, the subject of the simple sentence of utterance No. 3 is a deictic expression "I"; thus, this is not a candidate for a prominent NP.

Next, the determination of the indicator and the indicating area in the global expansion is performed. In the second simple sentence of utterance No. 6 and the simple sentence of utterance No. 9, indicators of a topic change type, "next", are detected. Then, it is examined whether or not these two indicators are of the same type. Here, they are of the same type. However, there is a prominent NP between them and the number of simple sentences from the simple sentence including the former indicator to the simple sentence including the latter indicator is four; thus, they do not belong to the same indicating area.

Next, the block recognition is performed. The result of this recognition is shown in FIG. 71. According to item (c-3) of <Block Recognition Rule> in §1-4-1, the first and the second simple sentences of utterance No. 1 belong to the same block. Next, according to item (c-1) of the rule, the sentence of utterance No. 2 belongs to the same block. On the other hand, according to item (e) of the rule, a new block begins from utterance No. 3. In this block, utterance No. 4 (according to item (c-1) of the rule), utterance No. 5 and the first simple sentence of utterance No. 6 (according to item (b) of the rule), and, the second simple sentence of utterance No. 6 (according to item (a) of the rule) are included. Similarly, utterances No. 7 and 8 comprise another block.

Next, according to the flow chart shown in FIG. 11, the simple sentence of utterance No. 1, which begins the dialogue, and the second simple sentence of utterance No. 6 and the simple sentence of utterance No. 9 which are the starting parts of the indicating areas, are chosen as candidates for starting points of topic intro. regions in the global expansion. Among the three candidates, the simple sentence of utterance No. 1 is admitted as the starting point of a topic intro. region unconditionally, and its end point is set equal to the end of the simple sentence of utterance No. 2. Regarding the second candidate, the second simple sentence of utterance No. 6, its indicator is not of a nest start type and the indicating area does not exist at the beginning of the block; thus, this candidate is rejected. The third candidate, the simple sentence of utterance No. 9, is admitted. The two recognized topic intro. regions in the global expansion, G41 and G42, are shown in FIG. 72. Next, for each topic intro. region, the prominent NP which appears first is recognized as a topic portion. For region G41 beginning from utterance No. 1, "mail delivery" is recognized as a topic portion. Similarly, for region G42 beginning from utterance No. 9, "a postal deposit" is recognized.

Figure 73:
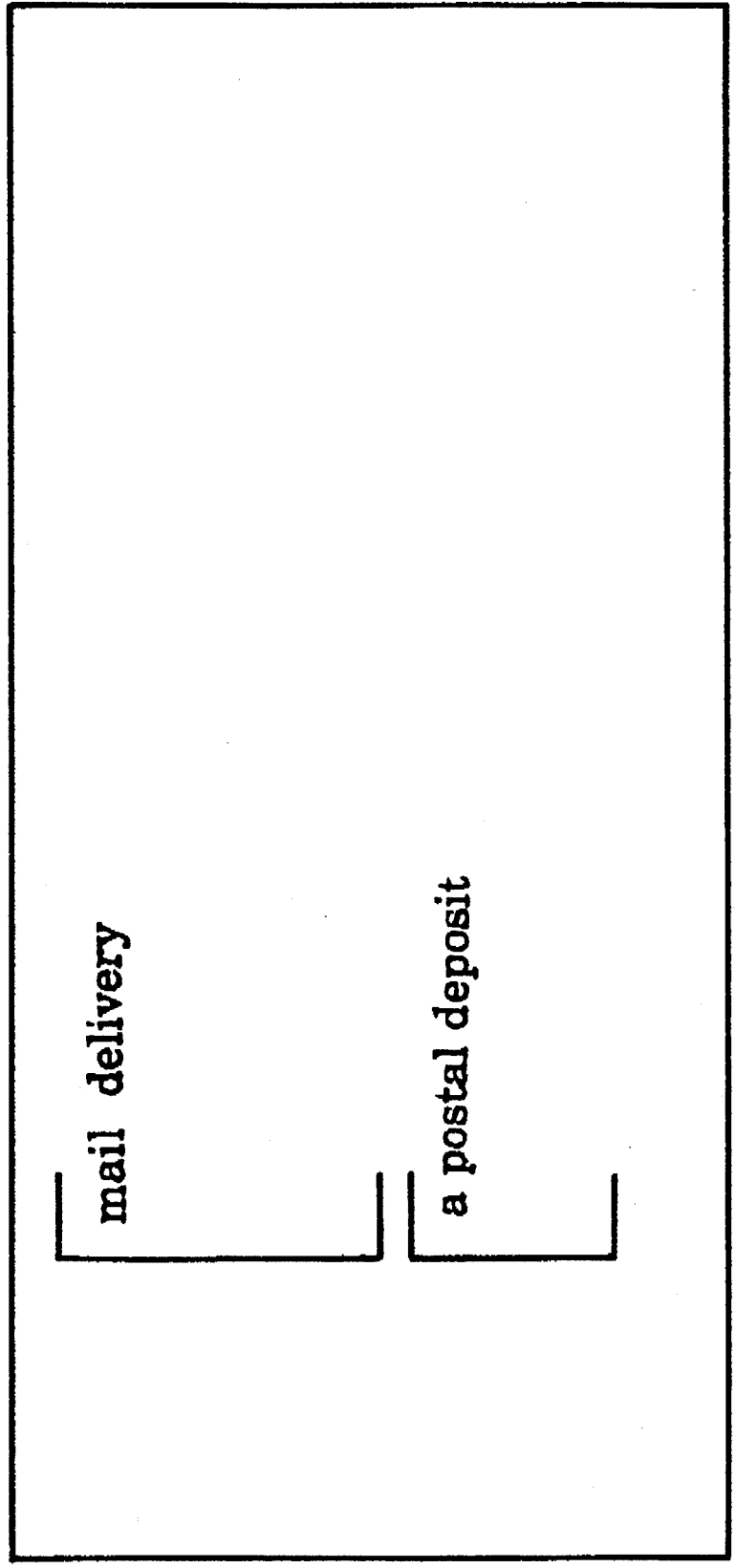
FIG. 73 shows the topic structure of the English dialogue data in the global expansion.

Next, according to <Rule for Applying Levels in Global Expansion> in §2-3-1, the level of the first topic "mail delivery" in the dialogue is set equal to "1". In the block in which the next topic "a postal deposit" is indicated, the indicator "next" of the topic change type is presented and there is no indicator before it; thus, the topic level of this next topic is also equal to 'T'. In addition, the scope of each topic is determined in accordance with <Rule for Setting Topic Scope in Global Expansion> shown in §2-3-1. The scope of the first topic "mail delivery" is determined as being from utterance No. 1 to No. 8, the scope of the next topic "a postal deposit" is determined as being from utterance No. 9 to an appropriate utterance No. (not shown in the figure). The result of the recognition of these topic scopes is shown in FIG. 73, in a form of a simplified model.

Next, by following the flow chart shown in FIG. 24, topic intro. regions in the local expansion are determined. Here, the object blocks are the block existing from utterance No. 3 to No. 6, and the block of utterances No. 7 and No. 8. Regarding the block existing from utterance No. 3 to No. 6, there are four or more simple sentences in the block; thus, this block is admitted as a topic intro. region. In contrast, regarding the block of utterances No. 7 and No. 8, there are only two simple sentences in the block and no prominent NP marked by an explicit marker is included in the first sentence of the block; thus, it is judged that this block is not a topic intro. region. Accordingly, in the local expansion, one topic intro. region, L41, has been determined as shown in FIG. 74.

Next, according to the flow chart shown in FIG. 29, the topic portion of the region L41 is determined. The first appearing prominent NP is "an express letter" in utterance No. 3; thus, it is recognized as the topic portion. This "an express letter" is not marked by an explicit marker; therefore, the process for determining topic portions ends here.

Next, according to the flow chart shown in FIG. 31, the topic level of "an express letter" is determined as "1". Moreover, according to <Rule for Setting Topic Scope in Local Expansion> in §3-3-1, the topic scope of this topic is determined as being from utterance No. 3 to No. 8.

Figure 75:
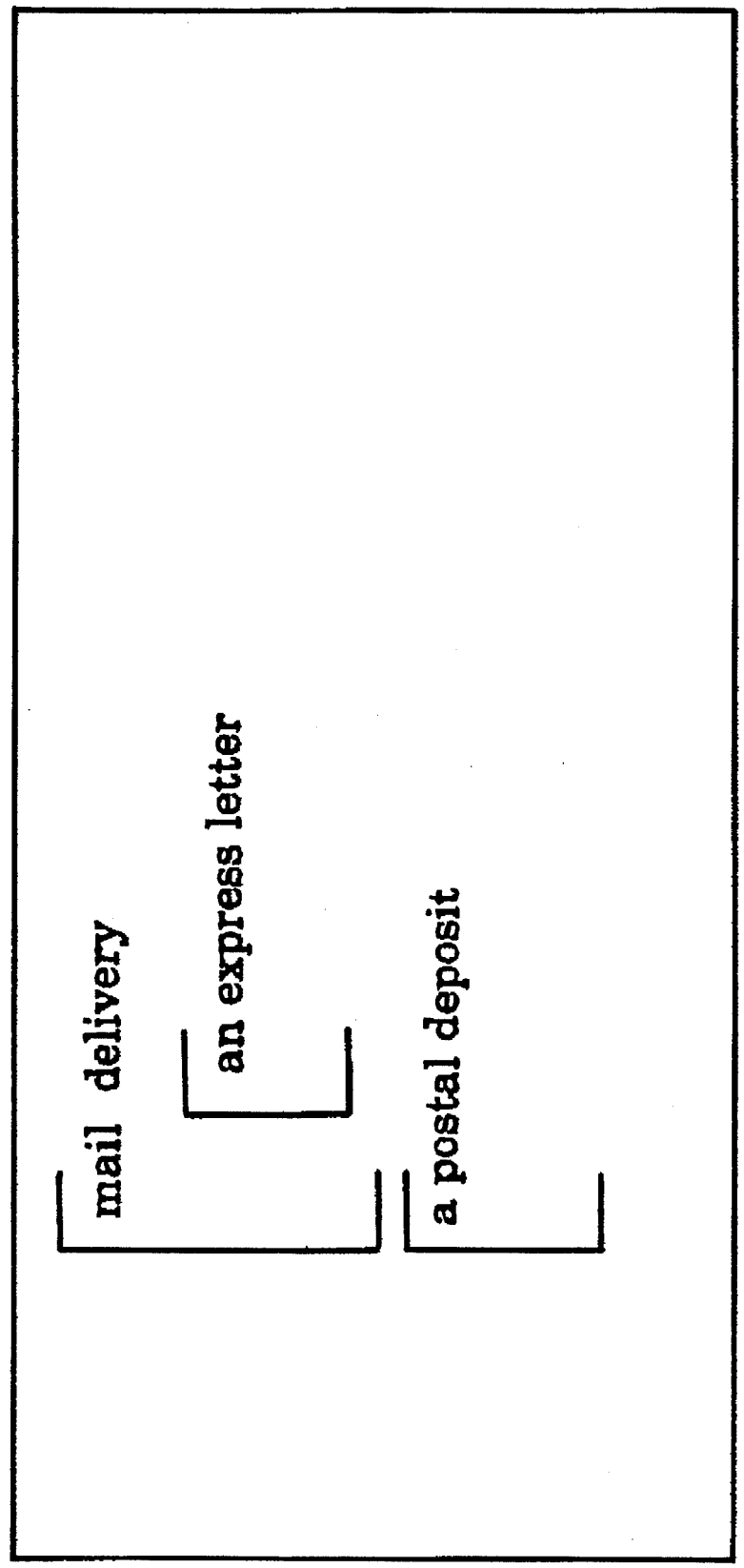
FIG. 75 shows the unified topic structure of the English dialogue data.

Lastly, according to the flow chart shown in FIG. 33, the topic level in the local expansion is corrected so as to unify the topics. The topic structure obtained in the end is shown in FIG. 75.

What is claimed is:

1. A method for recognizing a topic structure of language data, the method comprising steps of:
   (a) dividing the language data into plural simple sentences and extracting a prominent NP (noun portion) from each simple sentence;
   (b) dividing the simple sentences into blocks each of which is a unit of data dealing with a single subject and outputting information about the blocks;
   (c) detecting a starting point of at least one topic and determining a topic introducing region of each topic based on the information about the blocks and the characteristics of the language data;
   (d) choosing a prominent NP which satisfies a predetermined condition from the prominent NPs included in each determined topic intro. region and recognizing the chosen prominent NP as a topic portion of the topic in the topic intro. region;
   (e) determining, based on the topic portion and sentences before and after the topic portion, a topic level indicating a depth of nesting of each topic and a topic scope indicating a region over which the topic continues;
   (f) determining any sub-topic intro. regions in the remaining area in which no topic intro. regions are recognized based on the information about the blocks and the characteristics of the language data;
   (g) choosing a prominent NP which satisfies a predetermined condition from the prominent NPs included in each determined sub-topic intro. region and recognizing the chosen prominent NP as a sub-topic portion of the sub-topic in the sub-topic intro. region;
   (h) determining a temporary topic level indicating a depth of nesting of each sub-topic and a sub-topic scope indicating a region over which the sub-topic continues based on the sub-topic portion and sentences before and after the sub-topic portion; and
   (i) unifying all determined topics and sub-topics as the topics in the language data by revising the temporary topic level of each sub-topic according to the topic level of each topic and outputting these topics and their levels as a topic structure.

2. A method as claimed in claim 1, wherein:
   the grammatical expressions for indicating the prominent NPs are classified into an explicit marker type the only function of which is to indicate a prominent NP and an implicit marker type which has a further grammatical function, and the types of these markers and their priority ranks are registered within pre-set rules, and
   the step of extracting a prominent NP involves extracting candidates for the prominent NP from each simple sentence in the language data, applying a priority rank to each candidate by referring to the rules, and choosing the one with the highest rank among the candidates as the prominent NP in the simple sentence.

3. A method as claimed in claim 1, wherein the step of outputting information about the blocks involves determining the blocks by referring to the extracted prominent NPs.

4. A method as claimed in claim 1, wherein cue indicators, each of which explicitly indicates the start of a new topic expansion, are classified into three types, a nest start type, a topic change type, and a nest end type, and the indicators and their types are pre-registered,
   the method further comprising a step of determining the type of each indicator which appears in the language data in accordance with the contents of the registered data, and obtaining information about each pair of indicators which indicates a topic expansion by referring to the information describing the types of indicators, the prominent NPs which exist between the two indicators, and the number of simple sentences which exist between the two indicators, and wherein:
   the step of outputting information about blocks involves dividing the simple sentences into blocks based on the information about the indicator pairs, and
   the step of determining a topic intro. region involves basing the determination on the information about the indicator pairs and the blocks.

5. A method as claimed in claim 4, wherein:

topic forwarding expressions each of which forwards a present topic to the next simple sentence are pre-registered, and the step of outputting information about the blocks involves dividing the simple sentences into some blocks based on information about any topic forwarding expressions included in the language data, the indicator pairs, the prominent NPs, and sentences which are indicated by periods.

6. A method as claimed in claim 1, wherein:

topic continuing expressions each of which indicates the continuation of a topic are pre-registered, and the step of outputting information about the blocks involves dividing the simple sentences into blocks by referring to information about any topic continuing expressions included in the language data and information about sentences which are indicated by periods.

7. A method as claimed in claim 1, wherein:

the step of determining a topic portion involves choosing the prominent NPs which have the highest rank based on a predetermined priority ranking as candidates for the topic portion and admitting the candidate as the topic portion if only one candidate was chosen, while admitting the candidate which appears first if plural candidates were chosen.

8. A method as claimed in claim 1, wherein:

the step of determining a topic level and a topic scope for each topic involves setting the topic level of the first topic equal to "1" and setting the topic level of the other topics according to predetermined rules, and recognizing the beginning of the topic intro. region to which each topic belongs as the starting point of the topic scope of the topic and recognizing the one appearing first of the following two alternatives, (i) the point immediately before a topic which has the same topic level or less starts, or (ii) the end of the language data, as the end point of the topic scope.

9. A method as claimed in claim 1, wherein:

the language data are in a written language style, the step of determining a topic intro. region involves determining the region based on a logic structure of the language data which includes any chapters, paragraphs, and items, the step of determining a topic portion involves choosing the prominent NPs which have the highest rank based on a predetermined priority ranking as candidates for the topic portion and admitting the candidate as the topic portion if only one candidate was chosen, while if plural candidates were chosen, admitting the candidate which appears last if the topic intro. region is of an item type establishing a topic relating to the entire item, while if the topic intro. region is a type other than the item type, admitting the candidate which appears first, and the step of determining a topic level and a topic scope of each topic involves setting the topic level of the first topic equal to "1" and setting the topic level of the other topics according to predetermined rules, and recognizing the beginning of the topic intro. region to which each topic belongs as the starting point of the topic scope of the topic and recognizing the one appearing first of the following two alternatives, (i) the point immediately before a topic which has the same level or less starts, or (ii) the end of the language data, as the end point of the topic scope if the topic originates in a topic intro. region of a chapter type, while recognizing the one appearing first of the following two alternatives, (i) the point immediately before a topic which has the same level or less starts, or (ii) the end of an item area, as the end point of the topic scope if the topic originates in a topic intro. region of a type other than the chapter type.

10. A method as claimed in claim 1, wherein:

the step of determining a sub-topic intro. region involves determining the region according to information about the blocks, the extracted prominent NPs, and the topic intro. regions.

11. A method as claimed in claim 1, wherein:

the step of determining a sub-topic portion involves choosing the prominent NPs which have the highest rank in a predetermined priority ranking as candidates for the sub-topic portion, and admitting the candidate as the sub-topic portion if only one candidate was chosen, while admitting the candidate which appears first if plural candidates were chosen.

12. A method as claimed in claim 2, wherein:

the step of determining a sub-topic portion involves admitting the prominent NP which appears first as the sub-topic portion, and if the first prominent NP is marked by an explicit marker, and if any second prominent NP marked by an implicit marker exists and the block which includes the second prominent NP contains a predetermined number of simple sentences starting from the simple sentence which includes the second prominent NP, the step also admits the second prominent NP as the sub-topic portion.

13. A method as claimed in claim 12, wherein:

the predetermined number is equal to "4".

14. A method as claimed in claim 2, wherein:

the language data include a title with regard to the entire data, and the step determining a sub-topic intro. region involves determining the region according to information about the blocks, the title, the extracted prominent NPs and their priority ranking as sub-topics, and the topic intro. regions.

15. A method as claimed in claim 2, wherein:

the language data are of a written language style, the step of determining a sub-topic intro. region involves determining the region according to a logic structure of the language data which includes any chapters, paragraphs, and items, information about a title of the entire data and any chapter titles, and information about the blocks, the extracted prominent NPs, and the topic intro. regions.

16. A method as claimed in claim 1, wherein:

the step of determining a temporary topic level and a sub-topic scope of each sub-topic involves setting the temporary topic level of the sub-topic equal to "1" if there is only one detected sub-topic, and if two sub-topics were detected, setting the temporary topic level of the first sub-topic equal to "1" and the temporary topic level of the next sub-topic equal to "2", recognizing the beginning of the sub-topic intro. region to which each sub-topic belongs as the starting point of the sub-topic scope of the sub-topic, and recognizing the one appearing first of the following three alternatives, (i) the point immediately before the next sub-topic which has the same temporary level or less starts, (ii) the point immediately before any topic intro.

region starts, or (iii) the end of the language data, as the end point of the sub-topic scope.

17. A method as claimed in claim 1, wherein:

the step of determining a sub-topic level and a topic scope of each topic involves setting the temporary topic levels of all sub-topics equal to "1", recognizing the beginning of the sub-topic intro. region to which each sub-topic belongs as the starting point of the sub-topic scope of the sub-topic, and recognizing the one appearing first of the following three alternatives, (i) the point immediately before the next sub-topic starts, (ii) the point immediately before any topic intro. region starts, or (iii) the end of the language data, as the end point of the sub-topic scope.

18. A method as claimed in claim 1, wherein:

the step of revising the temporary topic level of the sub-topic involves adding the maximum value of the related topic levels to each temporary topic level.

19. A method as claimed in claim 1, wherein:

the language data are in dialogue form.

20. A method as claimed in claim 1, wherein:

the language data are in monologue form.

21. A method as claimed in claim 1, wherein:

the language data are in Japanese.

22. A method as claimed in claim 1, wherein:

the language data are in English.

23. A method as claimed in claim 1, further comprising steps of (j) detecting whether or not a duplicated topic portion is included in the output topic structure;

(k) judging whether or not a re-extraction of topics of the language data is needed in accordance with the detection of a duplicated topic portion; and (h) performing a pre-process so as not to extract the duplicated topic portion from the language data if it is judged that re-extraction is needed, and repeating the steps from the step (b).

24. A method as claimed in claim 23, wherein:

if (i) the parent topic of topic A and topic B which are included in the topic structure is the same topic C, (ii) topic A and topic B are composed of the same row of words, and (iii) no other topic having parent topic C exists between topic A and topic B, then the step of detecting a duplicated topic portion involves recognizing the one appearing last of topic A and topic B as the duplicated topic portion, and if any two topics having a parent-child relationship are composed of the same row of words, the step further detects the child topic as the duplicated topic portion.

25. A method as claimed in claim 23, wherein:

if the re-extraction is repeated, the step of judging whether or not a re-extraction is needed involves calculating the number of times of re-extraction and if the number of times is equal to a predetermined maximum number, the step judges that no further re-extraction is needed even if a duplicated topic portion was detected.

26. A method as claimed in claim 22, wherein:

the pre-process so as not to extract the duplicated topic portion is conducted such that no prominent NP is extracted from the simple sentence to which the duplicated topic portion belongs.

27. A topic structure recognizing apparatus comprising:

a pre-process memory for storing rules and a dictionary to recognize a unit of data dealing with a single subject in language data;

a global expansion process memory for storing rules for recognizing any topics which extend explicitly in the language data;

a local expansion process memory for storing rules for recognizing any sub-topics which extend implicitly in the global expansion;

a unification process memory for storing a rule for unifying the topics and the sub-topics;

a data input section for inputting the language data;

a pre-processor for dividing the language data into units of data, each unit dealing with a single subject, with reference to the contents of the pre-process memory;

a global expansion processor for recognizing the topics in the language data based on results outputted from the pre-processor with reference to contents of the global expansion process memory;

a local expansion processor for recognizing the sub-topics in the language data based on results outputted from both the pre-processor and the global expansion processor with reference to contents of the local expansion process memory; and a unification processor for integrating the topics and the sub-topics as topics in order to determine a topic structure of the language data with reference to the contents of the unification process memory, and outputting the topic structure.

28. An apparatus according to claim 27, further comprising a display for showing the determined topic structure.

29. An apparatus according to claim 27, wherein:

the pre-process memory includes a dictionary and rules for (i) dividing the language data into plural simple sentences each of which includes only one predicate, (ii) extracting any cue indicators or prominent NPs (noun portions) which can be candidates for topic portions, and (iii) determining the type of each indicator.

30. An apparatus according to claim 27, further comprising a language data memory for storing results outputted from the pre-processor and a unified structure memory for storing results outputted from the unification processor, wherein:

the language data memory includes (i) a word information table in which information including words and their parts of speech in the language data is stored and (ii) a simple sentence information table in which information including any words or prominent NPs in each simple sentence of the language data is stored, and the unified structure memory includes a table for storing information about the simple sentence No. of the simple sentence in which each topic appears, a topic level which indicates the depth of nesting of the topic, and a topic scope over which the topic continues in the language data.

31. An apparatus according to claim 27, further comprising:

a detecting section for detecting whether or not a duplicated topic portion is included in the topic structure output from the unification processor;

a judgment section for judging whether or not a re-extraction is needed in accordance with the result output from the detecting section; and a recalculating section for performing a pre-process so as not to extract the duplicated topic portion from the language data, and once again performing the process for the topic structure recognition.

32. An apparatus according to claim 31, comprising a memory for storing rules for the detecting section to detect a duplicated topic portion, wherein the rules as follows:

regarding any first topic and any later second topic in the topic structure, if all three of the following conditions (a)~(c) are satisfied:
(a) They have the same topic level m which is two or more,
(b) There is no other topic between them having a level m or m−1, and
(c) The rows of words of the two topic portions are the same;

or if all three of the following conditions (d)~(f) are satisfied:
(d) The first topic has a level n and the second topic has a level n+1,
(e) There is no other topic between them having the level n, and
(f) The rows of words of the two topic are the same;

then the second topic is detected as a duplicated topic portion.

33. An apparatus according to claim 31, wherein:

the judgment section has a calculation part which calculates the number of times of re-extraction, and if the number of times is equal to a predetermined maximum number, the judgment section judges that no further re-extraction is needed even if a duplicated topic portion was detected.

34. An apparatus according to claim 31, wherein:

the pre-process performed by the recalculating section is conducted so that no prominent NP is extracted from the simple sentence to which the duplicated topic word belongs, by deleting the contents relating to the prominent NP of the corresponding simple sentence from the information stored in the simple sentence information table.

35. An apparatus according to claim 31, comprising a language data memory for storing results output from the pre-processor and a unified structure memory for storing results output from the unification processor, wherein:

the language data memory includes (i) a word information table in which information including any characters or parts of speech of each word in the language data is stored and (ii) a simple sentence information table in which information including any words or prominent NPs in each simple sentence of the language data is stored, and in the recalculation process in the case in which it is judged that a re-extraction is needed, the process for extracting prominent NPs and any processes in which the prominent NPs are not considered in the pre-process are not repeated.

* * * * *